US012460215B2

(12) United States Patent
Tabor et al.

(10) Patent No.: US 12,460,215 B2
(45) Date of Patent: Nov. 4, 2025

(54) *Bacillus* EXPRESSION SYSTEM

(71) Applicant: WILLIAM MARSH RICE UNIVERSITY, Houston, TX (US)

(72) Inventors: Jeffrey J. Tabor, Houston, TX (US); Sebastian M. Castillo-Hair, Houston, TX (US)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 986 days.

(21) Appl. No.: 17/311,675

(22) PCT Filed: Dec. 6, 2019

(86) PCT No.: PCT/US2019/065080
§ 371 (c)(1),
(2) Date: Jun. 7, 2021

(87) PCT Pub. No.: WO2020/118261
PCT Pub. Date: Jun. 11, 2020

(65) Prior Publication Data
US 2025/0043293 A1   Feb. 6, 2025

Related U.S. Application Data

(60) Provisional application No. 62/776,132, filed on Dec. 6, 2018.

(51) Int. Cl.
*C12N 15/75* (2006.01)
*C12N 1/20* (2006.01)
*C12N 15/63* (2006.01)
*C12R 1/125* (2006.01)

(52) U.S. Cl.
CPC .............. *C12N 15/75* (2013.01); *C12N 1/20* (2013.01); *C12N 15/635* (2013.01); *C12R 2001/125* (2021.05)

(58) Field of Classification Search
CPC ........ C12N 15/75; C12N 1/20; C12N 15/635; C12N 15/72; C12R 2001/125
See application file for complete search history.

(56) References Cited

U.S. PATENT DOCUMENTS

| | | | |
|---|---|---|---|
| 2007/0117112 A1* | 5/2007 | Diener | C12N 9/1247 435/471 |
| 2010/0255561 A1 | 10/2010 | Steinmetz | |
| 2012/0009625 A1* | 1/2012 | Qiao | C07K 14/43563 435/69.7 |
| 2016/0130309 A1* | 5/2016 | Chakraborty | A01N 37/46 536/23.7 |
| 2018/0319870 A1* | 11/2018 | Amin | C12N 9/52 |

FOREIGN PATENT DOCUMENTS

WO    2008139153 A2    11/2008

OTHER PUBLICATIONS

Shimotsu, and Henner. "Construction of a Single-Copy Integration Vector and Its Use in Analysis of Regulation of the Trp Operon of Bacillus Subtilis." Gene, vol. 43, No. 1-2, Jan. 1986, pp. 85-94. DOI.org (Crossref), https://doi.org/10.1016/0378-1119(86)90011-9. (Year: 1986).*
Chary, Vasant K., et al. "Neomycin- and Spectinomycin-Resistance Replacement Vectors for Bacillus Subtilis." FEMS Microbiology Letters, vol. 153, No. 1, Jan. 2006, pp. 135-139. DOI.org (Crossref), https://doi.org/10.1111/j.1574-6968.1997.tb10474.x. (Year: 1997).*
Härtl B, Wehrl W, Wiegert T, Homuth G, Schumann W. Development of a new integration site within the Bacillus subtilis chromosome and construction of compatible expression cassettes. J Bacteriol. Apr. 2001;183(8):2696-9. doi: 10.1128/JB.183.8.2696-2699.2001. (Year: 2001).*
Condon C. RNA processing and degradation in Bacillus subtilis. Microbiol Mol Biol Rev. Jun. 2003;67(2):157-74, table of contents. doi: 10.1128/MMBR.67.2.157-174.2003. (Year: 2003).*
Pfleger, Brian F., et al. "Combinatorial Engineering of Intergenic Regions in Operons Tunes Expression of Multiple Genes." Nature Biotechnology, vol. 24, No. 8, Aug. 2006, pp. 1027-1032. DOI.org (Crossref), https://doi.org/10.1038/nbt1226. (Year: 2006).*
Lou, Chunbo, et al. "Ribozyme-Based Insulator Parts Buffer Synthetic Circuits from Genetic Context." Nature Biotechnology, vol. 30, No. 11, Nov. 2012, pp. 1137-1142. DOI.org (Crossref), https://doi.org/10.1038/nbt.2401. (Year: 2012).*
MoBiTec, "Bacillus subtilis Expression Vectors". 2012 (Year: 2012).*
Cloning Vector pDOW01, Complete Sequence. Apr. 28, 2015. NCBI Nucleotide Database, 814617358, NCBI Nucleotide, http://www.ncbi.nlm.nih.gov/nuccore/KM009065.1. (Year: 2015).*
Kim, L., et al. A xylose-inducible Bacillus subtilis integration vector and its application. Gene, 1996, 181, 71-76.
Conrad, B., et al. A T7 promoter-specific, inducible protein expression system for Bacillus subtilis. Mol. Gen. Genet. MGG, 1996, 250, 230-236.
Chen, P.T., et al., Construction of chromosomally located T7 expression system for production of heterologous secreted proteins in bacillus subtilis. J. Agric. Food Chem., 2010, 58, 5392-5399.
Dubendorf, J.W.; Studier, F.W. Controlling basal expression in an inducible T7 expression system by blocking the target T7 promoter with lac repressor. J. Mol. Biol., 1991, 219, 45-59.
Britton, R.A., et al. Genome-wide Aanalysis of the stationary-phase sigma factor (Sigma-H) regulon of bacillus subtilis. J. Bacteriol., 2002, 184, 4881-4890.

(Continued)

*Primary Examiner* — J. E. Angell
*Assistant Examiner* — Sarah E Allen
(74) *Attorney, Agent, or Firm* — Boulware & Valoir PLLC

(57) ABSTRACT

An inducible promoter expression system based on the T7 RNA Polymerase (T7 RNAP), lactose repressor (Lad), and a chimeric T7lac promoter (PT7lac), which can be integrated as a single copy into the *B. subtilis* genome. In the absence of IPTG, Lad strongly represses T7RNAP and PT7lac, and expression of an exemplary ORF—here superfolder green fluorescent protein (sfGFP) reporter protein—is undetectable by flow cytometry. Addition of IPTG de-represses PT7lac, and simultaneously induces expression of T7RNAP, resulting in very high sfGFP levels.

10 Claims, 23 Drawing Sheets

Specification includes a Sequence Listing.

(56) References Cited

OTHER PUBLICATIONS

Studier, F.W.; Moffatt, B.A. (1986) Use of bacteriophage T7 RNA polymerase to direct selective high-level expression of cloned genes. J. Mol. Biol., 1986, 189, 113-130.

Castillo-Hair, S. M., et al. An engineered B. subtilis inducible promoter system with over 10 000-fold dynamic range. ACS Synthetic Biology, 2019, 8, 1673-1678.

Prindle,A.; Liu, J.; Asally, M.; Ly, S.; Garcia-Ojalvo, J.; Suel, G. M. Ion channels enable electrical communication in bacterial communities. Nature, 2015, 527, 59-63.

Castillo-Hair, S. M.; Sexton, J. T.; Landry, B. P.; Olson, E. J.; Igoshin, O. A.; Tabor, J. J. FlowCal: A user-friendly, open source software tool for automatically converting flow cytometry data from arbitrary to calibrated units. ACS Synth. Biol., 2016, 5, 774-780.

Suel, G. M.; Garci-Ojalvo, J.; Liberman, L. M.; Elowitz, M. B. An excitable gene regulatory circuit induces transient cellular differentiation. Nature, 2006, 440, 545-550.

Haima, P.; Bron, S.; Venema, G. The effect of restriction on shotgun cloning and plasmid stability in Bacillus subtilis Marburg. (1987) Mol. Gen. Genet. 2019, 335-342.

Narula,J., Kuchina,A., Lee,D.D., Fujita,M., Suel, G.M. and Igoshin,O. A. Chromosomal Arrangement of Phosphorelay Genes Couples Sporulation and DNA Replication. Cell, 2015, 162, 328-337.

Westers, L., W et al., Bacillus subtilis as cell factory for pharmaceutical proteins: a biotechnological approach to optimize the host organism. Biochim. Biophys. Acta BBA—Mol. Cell Res., 2004, 1694, 299-310.

Van Dijl, J. & Hecker, M. Bacillus subtilis: from soil bacterium to super-secreting cell factory. Microb. Cell Factories, 2013, 12, 3.

Yansura, D.G. & Henner, D.J. Use of the *Escherichia coli* lac repressor and operator to control gene expression in Bacillus subtilis. Proc. Natl. Acad. Sci., 1984, 81, 439-443.

Bhavsar, A.P., et al. Development and ccharacterization of a xylose-dependent system for expression of cloned genes in bacillus subtilis: conditional complementation of a teichoic acid mutant. Appl Env. Microbiol, 2001, 67, 403-410.

Bongers, R.S., et al. Development and characterization of a subtilin-regulated expression system in bacillus subtilis: strict control of gene expression by addition of subtilin. Appl Env. Microbiol, 2005, 71, 8818-8824.

Toymentseva, A.A., et al. The LIKE system, a novel protein expression toolbox for Bacillus subtilis based on the lial promoter. Microb. Cell Factories, 2012, 11, 143.

Guzman, L.M., et l., Tight regulation, modulation, and high-level expression by vectors containing the arabinose PBAD promoter. J. Bacteriol., 1995, 177, 4121-4130.

Lutz, R.; Bujard, H. Independent and tight regulation of transcriptional units in *Escherichia coli* via the LacR/O, the TetR/O and AraC/l1-12 regulatory Eements. Nucleic Acids Res., 1997, 25, 1203-1210.

Chen, X., Let al., An extraordinary stringent and sensitive lightswitchable gene expression system for bacterial cells. Cell Res., 2016, 10.1038/cr.2016.74.

Locke, J. C. W.; Young, J. W.; Fontes, M.; Jimenez, M. J. H.; Elowitz, M. B. Stochastic pulse regulation in bacterial stress response. Science, 2011, 334, 366-369.

Wu,S.-C.; Wong,S.-L. Engineering of a bacillus subtilis strain with adjustable levels of intracellular biotin for secretory production of functional streptavidin. Appl Env. Microbiol, 2002, 68, 1102-1108.

Quisel, J. D.; Burkholder, W. F.; Grossman, A. D. In Vivo Effects of sporulation kinases on mutant Spo0A proteins in bacillus subtilis. J. Bacteriol., 2001, 183, 6573-6578.

Van Gestel, J.; Weissing, F. J.; Kuipers, O. P.; Kovacs, Á. T. Density of founder cells affects spatial pattern formation and cooperation in bacillus subtilis biofilms. ISME J., 2014, 8, 2069-2079.

Fujita, M.; Losick, R. An investigation into the compartmentalization of the sporulation transcription factor σE in bacillus subtilis. Mol. Microbiol., 2002, 43, 27-38.

Landry, B. P.; Palanki, R.; Dyulgyarov, N.; Hartsough, L. A.; Tabor, J. J. Phosphatase activity tunes two-component system sensor detection threshold. Nat. Commun., 2018, 9, 1433.

Liang, X.; Li, C.; Wang, .; Li. Q. Integrating T7 RNA polymerase and its cognate transcriptional units for a host-independent and stable expression system in single plasmid. ACS Synth. Biol. 2018, 7, 1424-1435.

Glenwright, H.; Pohl, S.; Navarro, F.; Miro, E.; Jimenez, G.; Blanch, A. R.; Harwood, C. R. The identification of intrinsic chloramphenicol and tetracycline resistance genes in members of the bacillus cereus group (sensu lato). Frontiers in Microbiology. 2017, 7, Article 2122.

Alexander, W. A.; Moss, B.; Fuerst, T. R. Regulated expression of foreign genes in vaccinia virus under the control of bacteriophage T7 RNA polymerase and the *Escherichia coli* lac repressor. J. of Virology, 1992, 66, 2934-2942.

\* cited by examiner

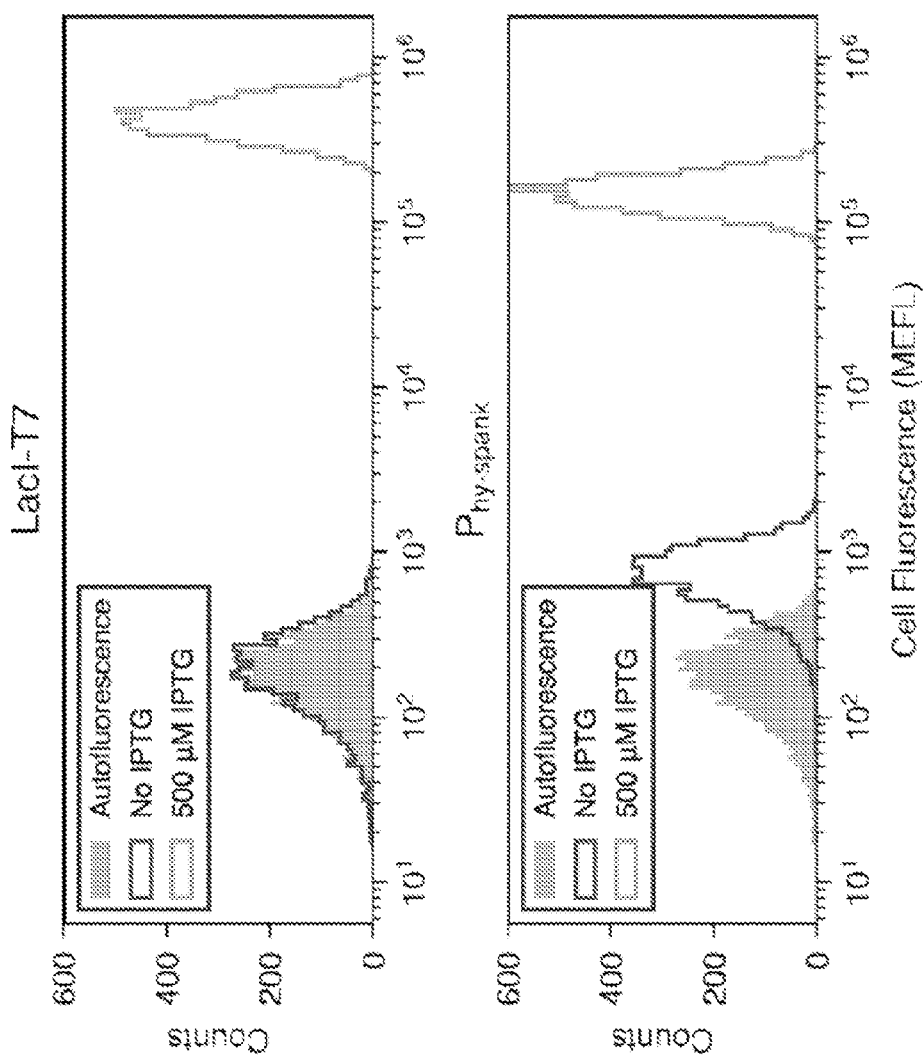
FIGURE 1C-D

FIGURE 2: T7lac promoter (P$_{T7lac}$) and placing of the gene of interest SEQ ID NO 1

TAATACGACTCACTATAGGGGAATTGTGAGCGGATAACAATTCCCCTCTAGAAGCTGTCACCGGATGTGCTTTCCGGTCTGATGAGTCCGTGAGGA
CGAAACAGCCCTCTACAAATAATTTTGTTTAAAAGCTTACATAAGGAGGAACTACT<u>ATG</u>

FIGURE 3: Promoter hyper spank SEQ ID NO 2

GGTAAATGTGAGCACTCACAATTCATTTGCAAAAGTTGTTGACTTTATCTACAAGGTGTGGCATAATGTGTGTAATTGTGAGCGGATAACAATTA
AGCTTAGTCGACA

FIGURE 4. T7 RNAP SEQ ID NO 3

```
MNTINIAKND FSDIELAAIP FNTLADHYGE RLAREQLALE HESYEMGEAR FRKMFERQLK AGEVADNAAA KPLITTLLPK MIARINDWFE EVKAKRGKRP
TAFQFLQEIK PEAVAYITIK TTLACLTSAD NTTVQAVASA IGRAIEDEAR FGRIRDLEAK HFKKNVEEQL NKRVGHVYKK AFMQVVEADM LSKGLLGGEA
WSSWHKEDSI HVGVRCIEML IESTGMVSLH RQNAGVVGQD SETIELAPEY AEAIATRAGA LAGISPMFQP CVVPPKPWTG ITCGGYWANG RRPLALVRTH
SKKALMRYED VYMPEVYKAI NIAQNTAWKI NKKVLAVANV ITKWKHCPVE DIPAIEREEL PMKPEDIDMN PEALTAWKRA AAAVYRKDKA RKSRRISLEF
MLEQANKFAN HKAIWFPYNM DWRGRVYAVS MFNPQGNDMT KGLLTLAKGK
PIGKEGYYWL KIHGANCAGV DKVPFPERIK FIEENHENIM ACAKSPLENT WWAEQDSPFC FLAFCFEYAG VQHHGLSYNC SLPLAFDGSC SGIQHFSAML
RDEVGGRAVN LLPSETVQDI YGIVAKKVNE ILQADAINGT DNEVVTVTDE NTGEISEKVK LGTKALAGQW LAYGVTRSVT KRSVMTLAYG SKEFGFRQQV
LEDTIQPAID SGKGLMFTQP NQAAGYMAKL IWESVSVTVV AAVEAMNWLK SAAKLLAAEV KDKKTGEILR KRCAVHWVTP DGFPVWQEYK KPIQTRLNLM
FLGQFRLQPT INTNKDSEID AHKQESGIAP NFVHSQDGSH LRKTVVWAHE KYGIESFALI HDSFGTIPAD AANLFKAVRE TMVDTYESCD VLADFYDQFA
DQLHESQLDK MPALPAKGNL NLRDILESDF AFA
```

FIGURE 5: PpenP SEQ ID NO 4

CGGTGGAAACGAGGTCATCATTCCTTCCGAAAAAACGGTTGCATTTAAATCTTACATATGTAATACTTTCAAAGACTACATTGTAAGATTTG

FIGURE 6. *LacI-T7-sfgfp*. SEQ ID NO 5

```
TAATACGACTCACTATAGGGGAATTGTGAGCGGATAACAATTCCCCTCTAGAAAGCTTACATAAGGAGGAACTACTATGCGTAAAGGCGAAGAGCT
GTTCACTGGTGTCGTCCCTATTCTGGTTGAACTGGATGTCGATGTGAACGGTCATAAGTTTTCCGTCCGTGGCCAGGGTGAAGGTGACGCAACTAA
TGGTAAACTGACGCTGAAGTTCATCTGTACTACTGGTAAACTGCCGGTACCTTGGCCGACTCTGGTAACGACGCTGACTTATGGTGTTCAGTGCTT
TGCTCGTTATCCGGACCATATGAAGCAGCATATGACTTCTTCAAGTCCGCCATGCCGGAAGGCTATGTGCAGGAACGCACGATTTCCTTAAGGATGA
CGGCACGTACAAAACGCGTGCGGAAGTGAAATTTGAAGGCGATACCCTGGTAAACCGCATTGAGCTGAAAGGCATTGACTTTAAAGAAGACGGCAA
TATCCTGGGCCATAAGCTGGAATACAATTTTAACAGCACACAATGTTTACATCACCGCCGATAAACAAAAATGGCATTAAAGCGAATTTTAAAAT
CGCCACAACGTGGAGGATGGCAGCGTGCAGCTGGCTGATCACTACCAGCAAAACACTCCAATCGGTGATGGTCCTGTTCTGCTGCCAGACAATCA
CTATCTGAGCACCCAAAGCGTTCTGTCTAAAGATCCGAACGAGAAACCGATCATATGTTCTGCTGGAGTTCGTAACCGGCAGCGGCATCACGCA
TGGTATGGATGAACTGTACAAATGATGATAATAATCTAGACCAGGCATCAAATAAAACGAAAGGCTCAGTCGAAAGACTGGGCCTTTCGTTTATC
TGTTGTTTGTCGGTGAACGCTCTCTACTAGAGTCACACTGGCTCACCTTCGGGTGGGCCTTCTGCGTTTATACGTTTCGGTGATGAAGATCTTCC
CGATGATTAATTAATTCAGAACGCTCGGTTGCCGCGATAAACGCTGCCGACAGTTGCCGCCGATAAACAGCCTCCAGTTCTCATCACTACCCCTACTACACTCCCTAAGATGATGATTGCAACGACTGTTGAGCGTCAAC
ATTCATTTTGCAAAAGTTGTTGACTTTATCTACAAGGTGTGGCATAATGTGTGATAATTGTGAGCGGATAACAATTAAGCTTAGTGACAGCTAGCA
CATAAGGAGGAACTACTATGAACATCGCTAAGAACATCGATTAACATGCGCTAAGAACGACTTCTCTGACATTCTCTGACATCGCTAAGAACATCGCTAAGAACATCGCTAAGAACATCGCTGGCTGACC
ATTACGGTGAGCGTTTAGCTGCGAACAGTTGCCCTTGAGCATGGATGGGTGAACGCTCTCCGCAAGATGTTGAGCGTCAAC
TTAAAGCTGGTGAGGTTGCGGATAAACGCTGCCGACAAGCCTGCACTCACAGTCTCATCACTACCCCTAAGATGATTGCAACGACTGTTGAGG
AAGTGAAAGCTAAGCGGCAAGCGCCCGACAGCCTTCCAGTTCCTGCAAGAAATCAAGCCGGAAGCGCAATCGGTCGGGCCATTGAGGACGAGGCTCGCTTCGGTCGTATCC
TGGCTTGCCTAACCAGTGCTGACAATACAACCGTTCAGGCTGTAGCAACCGTTGAGGAACAACTCAACAAGCGCGTAGGCGCGTAGGCGCTAGGCGTCTACAAGAAAGCATTTATGCAAGTTGTCG
GTGACCTTGAAGCTGACACTTCTAAGGGTCTACTCGGTGGCGAGGGCTGCTTCGTGGCCATAAGGAGGAAGACTCTATTCATGTAGGAGTACGCTGCATCGAGA
AGGCTGACATGCTGAATTAACATTGCGCAAAACACCGCATGAACTCTAGCGGTGCGCCAACGTAATCACCAAGTGGAAGCATT
TGCTCATTGAGTGAATGTTAGCTTACACCGCAAATGCTGGCTAGTAGGTCAAGACTCTGAGACTATCGAACTCGAACTCCGCACCTGAATACG
CTGAGGCTATCGCCAACCCGTGCAAGTGCAGGTGCGTCGTCTGCGCTGGCTCCTCTGCGTCCCGATGTTCCAACCTTGCGTAGTTCCTCCACAGTAAGAACCACTGATGCGCTACGAAGACGTTTACATGCCTG
GTGGCTGGCTATTGGGCTAACGGTCGTCGTAACGGTGTAACGTGCCAGGTGCGTCGCGATGCCGAACCATCTCTCCAACAGTAAGAAATCAACAAGAAAGTCCTAGCGGTCGCCAACGTAATCACCAAGTGGAAGCATT
AGTTGTACAAAGCGATTAACATTGCGCAAAACACCGCATGAACTCTAGCGGTGCGCCAACGTAATCACCAAGTGGAAGCATT
GTCCGGTCGAGGACATCCCTGCGATTGAGCGTGCAAGAACTCCGATGAACCGGAAGAACATCGACATCCTGAGCGCTCTCACCGCGTGAAAC
GTGCGCCGCTGCTGTGTACCGCAAGACGCTCGCGCGAACATGGACTGCCTTGAGTTCATCAGCCTTGAGCAAGCCAATAAGTTTGCTAACC
ATAAGGCCATCTGGTTCCCTTACACAATGACTGGGCCGTCGTGTTTACGCTGTTTCAAGCCCGAAGGTAACGATATGACCAAAGGAC
TGCTTACGCTGGCAGATGCGATTCAGGCTAAGGTAACCACGAGAAACATCGGTAAGGAAGTTATGCTACTGGCTGTCGTCGCGGGTGTCGATAAGGTTCCGT
TCCCTGAGCGCATCAAGTTCATTGAGGAAAACCCGCCTAAGCTTCGCTCCACTGGAGAACACTGGACACCACGGCCTATAACTGAGCTATAATGCTGAGCAAGATT
CTCCGTTCTTCCTTGCGTTCTGCTTTGCGCTCTGCTGTTTGAGTACGCTGGGTACAGCACACCATGGCTTGTGGGCTGTCGAGCAAGGTTCCGT
CTTGCTCTCTGGCATCCAGCACTTTCTGCCGATGCTCCGAGATGCTCCGAGATGAGGTAGGTCGCGCGGTTAA
```

FIGURE 6. (cont)

```
CTTGCTTCCTAGTGAAACCGTTCAGGACATCTACGGATTGTTGCTAAGAAAGTCAACGAGATTCTACAAGCAGACGCAATCAATGGGACCGATAA
CGAAGTAGTTACCCGTGACCGATGAGAACACTGGTGAAATCTCTGAGAAAGTCAAGCTGGGCACTAAGGCACTGGCTGGTCAATGGCTGGCTTACGG
TGTTACTCGCAGTGTGACTAAGCGTTCAGTCATGACGCTGGCTTACGGGTCCAAAGAGTTCGGCTTCCGTCAACAAGTGCTGGAAGATACCATTCA
GCCAGCTATTGATTCCGGCAAGGGTCTGATGTTCACTCAGCCGAATCAGGCTGCTGATACATGCGCTAAGCTGTAAGCTGTGATTGGGAATCTGTGAGCGTGAC
GGTGGTAGCTGCGGTTGAAGCAATGAACTGGCTTAAGTCTGCTAAGCTCTGCTGAGGTCAAAGATAAGAAGACTGGAGAGATTCTTCG
GATAGCGTTGCGCTGTGCATTGGGTAACTCCTGATGGTTTCCCTGTGTGCAGGAATACAAGAAGCCTATTCAGACGCGCTTGAACCTGATGTTCCT
CAAGCTCAGTTCCGCTTACAGCCTACCATTAACACCACAAAGATAGCGAGATTGATGCACACAAACAGAGTCTGTATCGCTCCTAACTTTGTACA
CGGTCAGTTCCGCTTACAGCCTACCATTAACACCACAAAGATAGCGAGATTGATGCACACAAACAGAGTCTGTATCGCTCCTAACTTTGTACA
CAGCCAAGACGGTAGCCACCTTCGTAAGACTGTAGTGTGGGCACACGAAGTACGGAATCTTTTGCACTGATTCACGACTCCTTCGGTAC
CATTCCGGCTGACGCTGCAGCTGTTCAAAGCAGTGCGCGAAACATGTGTGACACATATGAGTCTTGTGATGTACTGGCTGATTTCTACGACCA
GTTCGCTGCTGACCAGTGCACGAGTCTCAATTGGACAAAATGCCAGACCTTCCGGCTAAGGTAACTTGAACCTCCGTGACATCTTAGAGTCGGACTT
CGCGTTCGCTAAGCATGCAAGCTAATCGGTGGAAACGAGGTCATCATTCCTTCCGAAAAAACGGTTGCATTTAAATCTTACATATGTAATACT
TTCAAAGACTACATTTGTAAGATTGTTGAGTGTTGAGTGCGCTGAAAGATCGTACGTACCAATTATTGTTCGTGATTGTTCAAGCCATAACACTGTA
GGGATAGTGGAAAGAGTGCTTCATCTGGTTACGATCAATCAAATATTCAAACGGAGGAGACGATTTGATGAAACCAGTAACGTTATACGATGTC
GCAGAGTATGCCGGTTCTCCTTATCAGACCGTTTCCCGTGGTGAACCAGGCCAAACAGTCGTTGCTGATTGGCGTTGCACCTCCAGTCTCGGCCTG
ATGGCGAGCCGTCGAATTACATTGTGTCGCGGCAATCTTCGCGCAACGTCAGTGGCTGATCATTAACTCCGCAGGCGTTGCATGGTGTAGAACGAAGCGGCGTCGAA
CACGCGCCCGTCGCGAAACGGCGGTGCACAATCTTCTCGCGCAACGTCAGTGGCTGATCATTAACTCCGATGACCAGGATGCCATTGCTGTGAA
GCCTGTAAAACGGCGGTGCACTAATGTTCCGGCGTTATTCTTGATGTCTCTGACCAGACACCATCAACAGTATTATTTCTCCCATGAAGACGTACGCGACTG
GCGTGGAGCATCTGGTCGCATTGGGTCACGCTGTGTTAGCGGGAAGCCGACTGGAGTGCCAATGCGGCCAATGGCGCGTCTGCGCTGCTGG
CATAAATATCTCACTCGCAATCGCAAATCAAATTCAGCCGATAGCGGAAGGCCGACTGGAGTGCCAATGGCGCGTTTCAACAAACCATGCAAATGCTG
AATGAGGGCCATCGTTCCCACTGCGATGCTGGTTGCCAACGATCAGATGCGCCAATGGCGCTGGGCGCCATTACCGAGTCCGGCGCTGTCGT
GCGGATATCTCGGTAGTGGATACGACGATACCGAAGACAGCTCATGTTATATCCCGCCGTTAACCACCATCAAACAGATTTTCGCTGCTGGGG
CAAACCAGCGTGGACCGCTTGCTGCAACTCTCTCAGGGCAATCAGCTGTTGCCCGTCACTGGTGAAAGAAAAACCACC
CTGGCGCCCAATACGCCAAACCGCCCTCCCCCGCGTTGGCCGATTCATTAATGCAGCTGGCACGACAGTTTCCCGACTGGACAGTGA
```

FIGURE 7: Compete Vector with sfGFP SEQ ID NO 6

```
GTTCAGCTCAGTGATGATACCTGCGATCCCTCCGCGATTCACGACAGCCGGCACACCGATGTACACGTCATCTGCACCGTATTGCCCGTCCAAATATGT
GCTGACAGTTAATATGCTGTTTCATTATGAAGAATGGCTTTGTAATGCGAGCAAGACTCATCGCAACCCATAATAAGTCGCGCCTTTTTCTC
AATGATATGGTAAGCTGCGTTTTCACATCATCTACAATTGGTCGTCCAGCTCGTTGTTGTACGACATCGTTTTCTCAACGAGTTCACTGACCGG
CACACCGCCGACATTCGCGTGGCCTCCAAACAGGAAGCTCTGTGTCGCCGTGCCGTCTCCGATAATATGCGCCTCTTTTGGCAGGCCGTTTGAGGCGCTGCGCCAAA
GTATTCGCTCAGCATGAAACGGAATCTCGCAGAATCAAGTGTGTGCCGCTTCAAATCACCCGCTCTTTTGCACTAACGATGCCTTTGAAAATCTTCAA
GTAAGTCAGGATATCAACCGGATTGTCGCGACTAAGAAAATGCCGTCAAATCCGCTCGCCATGACTTCACTAACGATCAGCATCCTTGCAGTCTTCATATGT
GTTCTTTTCTACTAATTCAAGGCGTGTCTCCACCAGGTTTTGGTTTGCTCCGGCGCAAATGCAGACAATATCAGCATCCTTGCAGTCTTCATATGT
TCCGTAAGATGTTTTGACCGGTTGTGGCGCAAACGCCTTTCGTGGTTTAAATCCATCACATCGCCCATTGCTTTTCTTTATTTACATCAATGAC
CACAAGCTCATCTGTGATTCCTTGGTTAATTAACGCATAACGCTCCAAATGCTCTTTGTTTGTGAAGTATTCACATTTATATGTCAACACTTCACAAACT
GTTCATCATTAATCATCCTTCCAGGTATGTTTCTTTGATGTCTTTTGTTTGATGGTTCTTCGGTAAGTCCCGTCTAGCCTTGCCCTCAATGG
TTTGCAAGAGAAAAGTTTTGTCTGATTATGAACAAAAAGAAACCATCATTGATGGTTTCTTCGGTAAGTCCCGTCTAGCCTTGCCCTCAATGG
GAAGAGAACCGCTTAAGCCCGAGTCAGTTGGTTGTATCCGGTCGGTCCCCATCATTAGCACGTAATCAAAGCCAGGCTGATTCTGACCGGCACTTGGGCGCTGCCATTA
TTAAAAATCACTTTTGCGTTGGTTGTATCCGGTCGGTCCCCATCATGTTTATAGATATAAGCATTACCTGGCTCCAATGATTCGGATTTTGATAGCCGATGGTTTTG
GATCCGGTCAATTCAATTACTCGGCTCCAATGATTCGGATTTTGATAGCCGATGGTTTTG
GCCGACGCTGGATCTCTTTTAACAAACTGTATTCGATTGAATTGATCTCCATCCTTAAACGCCGTCTACACCTGTTTGTAATTCAAGGAAAACATGAGGCGCTTTGCAATATCA
AATGGATCTCCTTTCCGATTGGTAATCGTCAGTTGATCATTGAAAGATGATCATTGAAAGATGTGTTACACCTGTTTGTAATTCAAGGAAAACATGAGGCGCTTTGCAATATCA
TCTGCACGCAAGGTAATCGTCAGTTGATCATTGAAAGATGTGTTACACCTGTTTGTAATTCAAGGAAAACATGAGGCGCTTTGCAATATCA
TCAGGATAAAGCACAGCTACAGACCTGGCATTGATCGTGCCTGTCAGTTGACCATCGTTTACCATCGTTTGTAATTCTCACTGAACCATGTGAACGCCATGTGAGCCGCCCATGATCATCATCGCTATTGCCAGATGCTGAGCCGCCCATGATCA
CTGCCATCAGGCAATTTGTTGCCGTATTGATAGAGACAGAGGATGAACCTGCAGTTGAAATCTATTGACCGCAGTGATAGCCTGATCTTCAAAT
ATCTGGTTGTTCCATTCGGGTTGTTTGGCTTCGCTATTTGCCTTAAACGATATCACCGCCTAAACGATATCATCATCGCTATCCATGTCGAGATCGAGAATCTCTCCGCCTATGCAAGGGTTTATTGTTTCTAAAATC
AAAGCCACTCCCCGAGCTATCACCGCCTAAACGATATCATCATCGCTATCCATGTCGAGATCGAGAATCTCTCCGCCTATGCAAGGGTTTATTGTTTCTAAAATC
GAACGAAGCTATCACCGCCTAAACGATATCATCATCGCTATCCATGTCGAGATCGAGAATCTCTCCGCCTATGCAAGGGTTTATTGTTTCTAAAATC
TGATTACCAATTAGAATGAATATTCCCAAATATTAAATTAGTTTATATGTTAAATTCATTAGTTCATTCATTCCAAGATAACTACGAACTGCTAACAA
TTTTTTAATCTGTTATTTAAATAGTTGTTAGAAGATTCAGCCACTGCATTCCCGCAATAATCTTTGGTATGATTTTACCCGCTCTCCAAGATAACTACGAACTGCTAACAA
ATTCTCCCTATGTGTTCTAATGGAAGATTCAGCCACTGCATTCCCGCAATAATCTTTGGTATGATTTTACCCGCTCTCCAAGATAACTACGAACTGCTAACAA
CGGCATAAGTTAATATAGAGTTTCATCATCCTGATAATTCCGTATATTCTTTATTTTTCGTTTCAATAAATTCCCATAATAAATCTGAAGAAATCAGAAATCATA
GGAATATCAGTAGTAATTCCCTCAAGTCATAATTCCTCTAAGCTCTTGTTCATAAAGCTCTTGTTCATAAAGCTCTGTTGCTAAAGCATTATGTTAAATCGAATTT
AATTCCTTCTGAATAATAATTGTTAATTCAATATATCGTAAGTTGCTTTATCCTCCTATTTTTTTGAAATAGG
TCTTGCTGAATAATAATTGTTAATTCAATATATCGTAAGTTGCTTTATCCTCCTATTTTTTTGAAATAGG
```

FIGURE 7 (cont)

```
TCTAATTTTTGTATAAGTATTTCTTTACTTTGATCTGTCAATGGTCTCAAGATGTTCAGATACGAGGACGACTAAAAAGTCAAGATCACTATTTGGTTTTAGTCCACT
CTCAACTCCTGATCCAAACATGTAAGTACCAATAAGGTTATTTTTTAAATGTTTCCGAAGTATTTTTTTCACTTTATTAATTGTTCGTATGTATT
CAAATATATCCTCCTCACTATTTGATTAGTACCTATTTGTTATATCCATAGTTGTTAATTAAACTTAATTTAGTTTATTTATAGATTTCATTG
GCTTCTAAATTTTTATCTAGATAATAATTAGTTAATTTATTCCGCCAGTCACGTTACGTTATTAGTTATTATAACATGTATTCACGAACGAAAATCGCC
TGTAAACCTATTCATTGTTTTAAAAATATCTCTTGCCAGTCACGTTACGTTATTAGTTATTATAACATGTATTCACGAACGAAAATCGCC
ATTCGCCAGCTGCAGGTAAAGATCTGATCCCGCGAAATTAATACGACTCACTATAGGGGAATTGTGAGCGGATAACAATTCCCCTCTAGAAAGCT
TACATAAGGAGGAACTACTATGCGTAAAGGCGAAGAGCTGTTCACTGGTGTCGTCCCTATTCTGGTTGGAACTGGATGTCAACGGTCATAA
GTTTTCCGTGCGTGGCGAGGGTGAAGGTGAACGCAACTAATGGTAAACTGACGGCTACTACTGGTAAACTGCCGGTACCTTGGCC
GACTCTGGTAACGACGCTGACTTATGGTGTTCAGTGCTTTGCTCGTTATCCGGACCATATGAAGCAGCATGAAATTTAACAGCCATGCCGGA
AGGCTATGTGCAGGAACGCACGATTTCCTTTAAGGATGACGGCACGTACAAAACGCTGCGGAAGTGAATACAATTTTAACAGCCCACATGTTTACATCACCGC
CATTGAGCTGAAAGGCATTGACTTTAAAGAAGACGGCAATATCCTGGCCACAACGTGGAGGATGGCAGCGTTCTCTGTCTAAAGATCCGAACGAGAAAGCGCATCATAT
CGATAAACAAAAAATGCATTAAAAGCGAATTTAAAATTCGCCACAACGTGGAGGATGGCAGCGTTCTCTGTCTAAAGATCCGAACGAGAAAGCGCATCATAT
TCCAATCGGTGATGGTCCTGTTCGTCTGCTGCTCAGACAATCACTACTATCTGAGCACGCAAAGCGTTCTCTGTCTAAAGATCCGAACGAGAAAGCGCATCATAT
GGTTCTGCTGGAGTTCGTAACCGCAGCGGGCCATTCGTTTCGTGCTGGCCTTTCGTTTATCTGTTGTGTTGTCGGTGAACGCTCTCTACTAGAGTCACACTGCTCACCTTCGGGTGGG
CGAAAGGCTCAGTGCGAAAGACTGGGCCTTTCGTTTATCTGTTGTGTTGTCGGTGAACGCTCTCTACTAGAGTCACACTGCTCACCTTCGGGTGGG
CCTTTCTGCGTTATACGTTTCGGTGACGTAAATGTGAGCACTGCACCATTCGTTTCAAAAGTTGTTGACTTTATCTACAAGGTGTGGCATAATGTGTGTAAT
GCAAGAACGTTGCTCGAGGGTAAATGTGAGCACTGCACCATTCGTTTCAAAAGTTGTTGACTTTATCTACAAGGTGTGGCATAATGTGTGTAAT
TGTGAGCGGATAACAATTAAGCTTAGTCGACACACTCTGGCTGACCATTCGGCTGAGCGTTGAGCGTTGGCCCTTTGGCCCTGAACAGTTGGCCCGCCAGCCTTCCAGTCTGTAGCAAGCGCAATCG
TCGAACTGGCTGCTATCCCGTCAACACTCTGGCTGAGCGTCAACTTAAAGCGTGGTGAGGTTGCGGATAAGCGCCCAAGCCTCTCATCACTACCCTAC
TGGGTGAAGCACCGCTTCCGCAAGATGTTTTGAGCGTCAACTTAAAGCGTGGTGAGGTTGCGGATAAGCGCCCAAGCCTCTCATCACTACCCTAC
TCCCTAAGATGATTGCACGGCATCAACGACTGGTTTGAGGAAGTGAAAGCTAAGCGCCCAAGCCTCTCATCACTACCCTAC
AGCCGGAAGCCGTAGCGTACAATCACCATTAAGACCACTCTGGCTTGCCTAACCAGTGCTGACACTTGAAGCGTTGAGGAACAACTCAACAAGCGCG
GTCGGGCCATTGAGGACGAGGCTCGCTTCGGTCGTATCCGTGCAAGTTGTCGAGGCTGACATGCTCTCTCAAGGGTCTACTCGGTGCGTGTCTTCGTGGCATA
TAGGGCACGTCTACAAGAAAGCATTTATGCAAGCTGATCGAGGCTGACATGCTCTCTCAAGGGTCTACTCGGTGCGTGTCTTCGTGGCATA
AGGAAGACTCTATTCATGTAGGAGTACGCTGCATCGAGATACGCTGAAGCTCATTGAGTCAACCGGAATGGTTAGCTTACACCGGCGCCAAAATGCTGGCGTAGTAG
GTCAAGACTCTGAGACTTCGAACTCGCACCTGAATACGCTGAAGCTGGTGGTGGTGAGGTGTAACAAGCGATTAACATTGCGCAAAACACCCGCAAAGCGCTGAAGCGTCCGATCCGTCCAAC
CTTGCGTAGTTCCTCCTAAGCGTGAACCGTGACTGGCATTACTGGTGGTGAGGTGTAACAAGCGATTAACATTGCGCAAAACACCCGCAAAGCGCTGAAGCGTCCGATCCGTCCAAC
AGAAAGCACTGATGCGCTACGAAGACGTTTACATGCCTACAAGTGGAAGCATTGTCCGGTCGAGGACATCCCTGCGATTGAGCGTGAAGAACTCCCGATGAAACCGGAAG
TCCTAGCGGTCGCCAAGCGTAATCACCAAGTGGAAGCATTGTCCGGTCGAGGACATCCCTGCGATTGAGCGTGAAGAACTCCCGATGAAACCGGAAG
ACATCGACATGAATCCTGAGGCTCTCACCGCGTGCTGCCGCTGCTGTGTACCGCAA
```

FIGURE 7 (cont)

```
GGACAAGGCTCGCAAGTCTCGCCGTATCAGCCTTGAGTTCATGCTTGAGCAAGCCAATAAGTTGCTAACCATAAGGCCATCTGTTCCCTTACAA
CATGGACTGGCCGGTCGTGTTTACGCTGTGTCAATGTTCAACCCGCAAGTATATGACCAAAGACTGCTTACGCTGGCGAAAGGTAAACC
AATCGGTAAGGAAGGTTACTACTGGCTGAAAATCCACGGTGCAAACTGTGCGGGTGTCGATAAGGTTCCGTTCCGAGCGCATCAAGTTCATTGA
GGAAAACCACGAGAACATCATGGCTTGCGCTAAGTCTCCACTGGAGAACACTTGGTGGGCTGAGCAAGATTCTCCGTTCCGTTCCTTGCGTTCTG
CTTTGAGTACGCTGGGGATGAGGTAGGTGGTCGCGCGGTTAACTTGCTTCAGGACATCGTTCAGGTCTTTGACGGTCTTGACGACACTTCTC
CGCGATGCTCCGAGATGAGGTAGGTGGTCGCGCGGTTAACTTGCTTCAGGACATCGTTCAGGACCATCGGATTGTTGCTAAGAAAGTCAA
CGAGATTCTACAAGCACTGGTGTCAATGGCTCGGTCCACCGATAACGAAGTAGTTACCGTGACCGATGAGAACACTGTGTGAAATCTCTGAGAAAGTCAAGCT
GGGCACTAAGGCACTGCTGGTCAATGGCTCGGTTACTGCCAGTGTGTACTAAGCGTTCAGTCATGACGTTCAGTACGCTGGCTTACGGTCCAAAGA
GTTCGGCTTCCGTCAACAAGTGCTGGAAGATACCAGCATTCAGCCAGTATTGATTCCGGCAAGGGTCTGATGTTCACTCAGCCGAATCAGGCTGCTGG
ATACATGGCTAAGCTGATTTGGGAATCTGTGAGCGTGGTAGCTGCGGTTGAAGCAATGAACTGGCTTAAGTCTGCTGCTAAGCTGCTGGC
TGCTGAGGTCAAAGATAAGAAGACTGGAGAGATTCTTCGCAAGCGTTGCGCTCAGTTCCGCTCAGTCGGTTCCCTGTGTGCAGGAATA
CAAGAAGCCTATTCAGACGCGCTTGGTATCGCTGATTCACGACTCCTTCGATTTCTACGACCAGTTCGCTGACCAGTTGCACAGTCGCTGACCGTTGACAC
ACACAAACAGGAGTCTTTTGCACTGATTCACGACTCCTTCGATTTCTACGACCAGTTCGCTGACCAGTTGCACAGTCGCTGAACTATGGTTGACAC
AATCGAATCTTTGTGATGTACTGGCTGATCATCTTAGAGTCGGACATGCGACTTCGCGTTCCGCGTAAGCATGCAAAATGCCAGCACTTCCGGCTAA
ATATGAGTCTTGTGATGTACTGGCTGATCATCTTAGAGTCGGACATGCGACTTCGCGTTCCGCGTAAGCATGCAAGACTACATTTGTAAGATTTGATGTTGAGTCGGCTGAAAGATCGTACGTAC
GAAAAACGGTTGCATTTAAATCTTACATATGTAATACTTTCAAAGACTACATTTGTAAGATTTGATGTTGAGTCGGCTGAAAGATCGTACGTAC
CAATTATTGTTTCGTGATTGTCAAGCACTAGAGTCGTAGGGATAGTGAAAGAGTGCTTCATCTGGTTACGATCAATCAAATATTCAAACGGAGG
GAGACGATTTTGATGAAACCAGTAACGTTATACGATGTCGCAGAGATCGGCGAATGGCGAGCTGAATTACATTCCCAACCGCGTGGTGGTGAACCAGCCAGC
CACGTTTCTGCGAAAACGGGGAAAAAGTGGAAGCGGATGGCGAGCTGAATTACATTCCCAACCGCGTGGTGGTGAACCAGCCAGCCAGC
TCGTTGCTGATTGCCGTTGCCACCTCCAGTCTGCCACGCGTCGGCCGTCGAAAACGCGGTCTGAAAACGGCGTTCGCGTGAAGCCTGTAAAACGCGGTCAACTGGTGCC
AGCGTGGTGGTGTCGATGGTAGAACGAAGCGGCCATTGCTGTGTGGAAGCTGCCTGGAGACTGGGCGTTATTCTTGATGTCTCTGACCAGACACCCATC
AACAGTATTATTTCTCCCATGAAGACGGTACGCTGGCGCGTGAGCGTGGAGCATATCTCACTCGCAATCAAATTCAGCCGATAGCGAAGGCGACTGG
TTAAGTTCTGTCTGCCGCTTGCTGCGGCCATAATGGGCATTGCTGGAGCATATCTCACTCGCAATCAAATTCAGCCGATAGCGAAGGCGACTGG
AGTGCCATGCCGGTTTTCAACAAACCATGCAAATGCTGAATGCCCGGCCGTTGTTGCCAACGATCGTGTTGCCAACGATCAGATGGCGCTGGGC
GCAATGCGCGCCATTACCGAGTCCGGCGTCGGATTTTCGCCTGCTGGGCAAACCAGCGTGACCAGCGTGCCGATACCGAAGACGATCATGTTATATCCCG
CCGTTAACCACCATCAAACAGGATTTTCGCCTGCTGGGCAAACCAGCGTGACCAGCGTGCCGATACCGAAGACGATCATGTTATATCCCG
CAGCTGTTGCCCGTCTCACTGTGAAAGAAAAACCACCCTGGCGCCAATACGCAAACCGCCTCTCCCCGCGTTGGCCGATTCATTAATGCAG
CTGGCACGACAGGTTTCCCGACTGGAAAGCGGGCAGTGAGCGCAACGCAATTAATGTGAGTTAG
```

FIGURE 7 (cont)

```
GATCCTGAGCGCCGTCGCTACCATTACCAGTTGGTCTGGTGTCAAAAATAATAATAACCGGGCAGGCCATGTCTGCCCGTATTCGCGTAAGGAA
ATCCATTATGTACTATTTAATTAATTCTGCGTGACATCCATCAGACATCGATCAGTTTTAATTTGTGTGTTTCCATGTGTCCAGTTTGGAATACTCTTAA
CCTCATTGGAAATCGCGGCATAATCACTGGTGGTATGATGATTGATGACCGCGTCAACAATGACCTTTATGCCATATTCTTCAGCGGCTGCACACATTT
CTTTAAATTCTTGTTCAGTACCTAAGTAACGGTTGCCAATTTGATACGATGTCGGCTGATACAGCCAGTTGCGATACCAGTTGACATGCTTTATCTCCTT
GATTCCCTTCCTTTACTTGGTTAATCGGAGATGTCTGAAATGGCTGTATATCCTGCATCATGAATATCCTTCATATTGTGTTTAACGTATTGAACG
ACCAATTCCATGCATGAAGAATGTTCCGCTTTGATCGACGGTGCTGTAAGCTCATTGTTCGCCGTTTCGATTTGTTCGCCGTTTCAGCACTCGCAGCCGCCGGTC
CTGCCAGAACCAAATGAAACAGCAATAAAATCCAGCGAATAACGGCAGTAAAGAGGTTTTGAATCGTTTCCTCCTTCAAACGATGTGAAGACTGGAGAATTTGT
TGATTTTTGAAGACTTACTTCGGAGTCAAAAATCCCTCTACTTCATTCTTCCGCTTCTTCCCGCTTCTTCTGTAAGCCAGTTCCACATCACATAC
TAACGCTTACATTAAAATTATCACAATCACTCTATCAAAACAACTTGCAGAGTGAATACAAATCAATGTTCCTATAAAAAGCTGCCCGAAAC
TGTGAACGCTTCCCTCGCTTTCCAAACAGAAGATGATTTCTTTTATTTCTCTTTATTCTTCAGCCAAGCGAATGTATGGGGAATCATTTCAGTTCTTCTTTGGTGTCTATTCTCGGCATGAGC
CGAAGCAGAGAAACAGAACGCCGCCAGACGATAAAAAGAAGAATCATTTCAGCCAAGCGAATGTATGGGGAATCATTTCAGTTCTTCTTTGGTGTCTATTCTCGGCATGAGC
AGCACCACTACCGCAAAGGCGACCGCCAATTGATTCTATTCGCTGCTTCACCCGTTTTGCTTCACCCCGTTTTTTGCTCTTTAAACGGAGCTTGCAGCCATTCTTTAAACGGAATTCAAACATA
ATTCCGATGCCGCAGCCCTGATGCAGTAATAGATCAGTAATAGATAATGAACAAAAAACACAAGGCTTGCAGCCAGATTTTTGTCTTTTTCTTTTACTCTCTTATTT
ATGCCGCGATGATCACATCAAGCAGCGCAAATGCTCCCGCTATCATCCCAATCTCCTCCCGCACTTTTACGAATGGCTTATGGCTTACAGTTACAATAACAG
TTCCCATTCACGCCTGCAATGAATAACTCAAAAGCCCGCCGTACAAGCAAGCGGCACCATAAAAACCCAATTGATCGTGATCATGATCCGATCAC
CCTGCGCTTCTGCAATGAATGAATGAATAACTCAAAAGCCCGCCGTACAAGCAAGCGGCACATAAAAACCCAATTGATCGTGATCATGATCCGATCAC
GATAAAGACAAGCGCCGGATGTCGGGTTGGAATAAATACAACGGCTTCGCCAGACCCCTTCTCCAAGACCATAAACCGCTTCAACCGACATTGATCATGACTCCGATCAC
CATGAGAACGCCGGATGTCGGGTTGGAATAAATACAACGGCTTCGCCAGACCTGACGAACCATTGACGACCAGTATCGACGACAGTATCGACGAAAAATGAAGACGCACTGCGTCTCGTGATTCCCATCAAATC
AGCGAGCGGCCGCCAGGATTGGAATAAATACAACGGCTTCGCCAGACCTGACGAACCTTCGCCAGACCTGAAGAGATGAAGAAATGAAGCACGGCACTGGCACTGGCACTGCGTCACTGGCGATATACATGCCGAT
TGCCCCGCCATCGGCCAATCGGGTCGAATCATCCAAAAGTGAAGCCAAAGTGAAGACACGCCCGTAATGACGCAGTATCGAGAAGTTTGCCAATATCGTTGCGGCCTATTAA
TCGTGCCATCCCGACAATCAGCGCCGCCTACTAAAATACGCCCCGTATACAAGACTTTGGCAGCCCGTAATGACCAGCCAGCCAATCGAGAAGTTTTGCCGGCCCAAGCCCGCCTATTAA
ACCGGCAAGGACAGAATAAAAATAAATGTCGCAGCCATTTGGAATCTGACCAGCCAGCCAGCGGTAAACGGCACTGACTGATCTTCTTCTTTACCGGCTTCGC
TCCCGCCACAGCCAAAATCAGCTTATGCGAACGGTAAACGGCACTGACTGATCTTCTTCTTTACCGGCTTCGC
```

FIGURE 8 Complete Vector without sfGFP SEQ ID NO 7

```
TAATACGACTCACTATAGGGGAATTGTGAGCGGATAACAATTCCCCTCTAGAAGCTGTCACCGGATGTGCTTTCCGGTCTGATGAGTCCGTGAGGA
CGAAACAGCCTCTACAAATAATTTGTTTAAAAGCTTACATAAGGAGAACTACTATGATGATGAGATCCATGAAAGGTCAGTCGAA
AGACTGGGCCTTTCGTTTTATCTGTTGTTTGTCGGTGAACGCTCTCTACTAGAGTCACACTGGCTCACCTTCGGGTGGCCTTTCTGCGTTTATAC
GTTTCGGTGATGAAGATCTTCCGGATGATTAATTCAGAACGCTCGGTTGCCGCGGCGTTTTTATGCAGCAATGGCAAGAACGTTGCTCG
AGGGTAAATGTGAGCGACTCACTCACACACATTTCCAAAGTGTGTGACTTTATCTACAAGGTGTGGCATATTGGCATAATGTGAGCGGGATACCACAAT
TAAGCTTAGTCGACAGCTAGCACATAAGGAGAACTACTATGAACACGATTAACATGCTAAGACGACTTCTCTGACATCGACTCGCTCTATC
CCGTTCAACACTCTGGCTGACCATTACGGTGAGCTGAGCGTTTAGCTCGCGAACAGTTGGCCTTGAGCATGAGTCTTACGAGATGGGGTGAAGCACGCTTC
CGCAAGATGTTTGAGCGTCAACTTAAAGCTGGTGAGGTTGCCGATAACGCGCCGCAAGCGTCCGGATACGCTGCCGCCAAGCCTCTCATCACTACCCTACTCCCTAAGATGATTGCA
CGCATCAACGACTGGTTTGAGGAAGTGAAAGCTAAGGCGGGCAAGCTGGAAACGCGCGCGACGACAGCCTTCCAGTTCCTGCAAGAAATCAAGCCGGAAGCCGTAGCG
TACATCACCATTAAGACCACTCTGGCTTGCCAGCTTGACGAAATACAACCGTCCAGGCCTGTAGCAAGGCAATCGGTCGTAGAGCCATTGAGGAC
GAGGCTCGCTTCGGTCGTATCGAGCTTCAAGAAGCTTCAAGAAAACGTTGAGGAACAACTCAACAAGCGCGTAGGCACGTCTACAAG
AAAGCATTTATGCAAGTTGTCGAGGCTGACAATGCTCTCTAAGGCTCTACTCGGTCGTGGCGTGTCTTCGTGCATAAGGAAGACTCTATTCAT
GTAGGAGTACGCTCGAGATGCTCATTGAGTCAACCGGAATGTTAGCTTACACCGCCAAAATGCTGGCGTAGTAGGTCAAGACTCTGAGACT
ATCGAACTCGCACCTGGCATTACTGGCTGAGCGTATCGCAACCCGTGCAGGTGCCAGTGCCTCTGGCTACTCACAGTAAGAAGCACTGATGCGC
AAGCCGTTGGACTGGCATTACATGCCTGAGGTGTACAAAGCGATTAACATTGCCAAAACACCCATGGAAAATCAACAAGAAAGTCCTAGCGTCGCCAAC
TACGAAGACGTTTACATGCCTGAGGTGTACAAAGCGATTAACATTGCCAAAACACCCATGGAAAATCAACAAGAAAGTCCTAGCGTCGCCAAC
GTAATCACCAAGTGGAAGCATTGAAGCATGAAGTTGTCCGGTGAAGAACATCCCTGCGATTGAGCGTGAAGAACCGATGAAACCGGAAGACATCGACATGAATCCT
GAGGCTCTCACCGGTGGCATAAGGTTCCGGTTCCACCCTGGCTGCGGTTCCTGCGATATCTGGCGGTCTCCGCCTATCAGCCTTGAGTTCATGCTTGAG
CAAGCCAATAAGTTGCTAACCATAAGGCCATCTGGTTCCCTTACAACATGGACTGGCGGTCGTGTGTTACGCTGTGTCAATGTTCAACCCGCAA
GGTAACGATATGACCAAGGACTGCTTACGCTGGCGAAGGTAAACCAATCGGTAAGGAAGTTACTACTGGCTGAAAATCCACGGTGCAAACTGT
GCGGGTGTCGATAAGTTCCGTTCCGATCCCGTTCTGCTTGCATCGAGCGGATCAGCCCATCAAGTTCATTGAGGAAAACCGACGCTAAGTGCCGCTAGTGCCTGCCACCTGAGAAC
ACTTGGTGGCTGAGCAAGATTCTCGGTTCGTTCCTTGGCATTCCGCGCTCTGCTAAGAATCTCAGCACTCTGGCTAAATCTCGAACATCGCTCC
CTTCCGCTGGCGTTTGACGGGTCTTGCTCGGCATCCAGCACTTCTCCGCGATGCTCCGAGATGAGGTAGGTGCGCGGTTAACTGCTTCCT
AGTGAACCGTTCAGGACACATCTACGGATTGTTGCTAAGAAGCTAAGAATCTTCGAGAAAGTCAACGAGATTCTACAAGCACCTAAGGCACTGGCCAATCAATGGGACCGATAACGAAGTAGTT
ACCGTGACCGATGAGAACACGTTCAGTGATGAAAATCTGGTGAAATCTCGAGAAAGTCAAGCTGGCACTGGCCTAAGGCACTGGCTTGCTTACGGGTGTTACTCGC
AGTGTGACTAAGCGTTCAGTGATGAGCGATTCAGTCATGACGAGTTCGGTCGAACAAGAAGTCTGAAGAGATACCATTCAGCCAGCTATT
GATTCCGGCAAGGGTCTGATGTTCACTCAGCCGAATCAGGCTGCTGGATACATCAGGCTGAATCTGATTGGAATCTGTGAGCGTGACGGTGTAGCT
GCGGTTGAAGCAATGAACTGGCTTAAGTCTGCTAAGTCGCTGAGGTCAAAGATAAGAAGAGACTGGAGAG
```

FIGURE 8 (cont)

```
ATTCTTCGCAAGCGTTGCGCTGTGCATTGGGTAACTCCTGATGGTTCCCTGTGTGGCAGGAATACAAGAGAAGCCTATTCAGACGCGCTTGAACCTG
ATGTTCCTCGGTCAGTTCCGCTTACAGCCTACCATTAACACCACAAAGATAGCGAGATTGATGCACACAAACAGGAGTCTGTTGCACTGATTCACGACTCC
TTTGTACACAGCCAAGACGGTAGCCACCTTCGTAAGACTGTAGTGTGGGCACACGAGAAGTACGGAATCGAATCTTTTGCACTGATTCACGACTCC
TTCGGTACCATTCCGCGCTGACGCTGCGAACCTGTTCAAAGCAGTGCGCGAAACTATGGTTGACACATATGAGTCTTGTGATGTACTGGCTGATTTC
TACGACCAGTTCGCTCTGACCCAGTTGCACGAGTGCAAAATGCCAGACTCTCAATTGGACAGAGTCCGGCTAAAGGTAACTTGAACCTCCGTGACATCTTAGAG
TCGGACTTCGCGTTCGCGTTCGCGTAAGCATGCAAGCTAATTCGGTGGAAACGAGGTCATCATTTCCTTCCGAAAAAACGTTGCATTTAAATCTTACATAT
GTAATACTTTCAAAGACTACATTTGTAAGATTGATGTTTGAGTGTCGGCTGAAAGATCGTACGTACCAATTATTGTTTCGTGATTGTTCAAGCCATA
ACACTGTAGGGATAGTGAAAGAGTGCTTCATCTGTTACGATCAATCAAATATTCAAACGAGGAGACGATTTGATGAAACCAGTAACGTTAT
ACGATGTCGCAGAGTATGCCGGTTGTCCTTATCAGACCGTTTCCCGTGTTGTGAACCTGGCGGGCAAACAGTCGTTGCGCGTTGCCACCTCCAGTC
AAGCGGCGATGGCGAGCTGAATTACATTGTCGCAAATTCTCGCGGCGATTAAATCTCGCGCAAACTGGGTGCCAGCGTGGTGGTGTCGATGGTAGAACGAAGCG
TGGCCCTGCACGCGCCGTCTAAAACGCGGCGACCAATCTTCTGGCAACGCGTCAGTGGGCTGATCATTAACTACTCGCTGATGACCAGGATGCCATTG
GCGTTGGAAGCTGCCTGCACTAATGTCCGGCGTTATTTCTGATGTCTCTGACCAGACACCCATCAACAGTATATTTTCTCCCATGAAGACGGTA
CTGTGAAGCTGGGCGTGGAGCATCTGTCGTCATTGGGTCACCAGCAAATCGCGCTGTTAGCGGAACGATCAGCGGAAGGCGACTGGAGTGCCAATGGGGGGCCAATGGCC
CTGGCTGGCATAAATATCTCACTCGCAATCAAATTCAGCCGATAGCGGAAGGCGACTGGAGTGCCAATGCGCGCCATTACCGAGTCCGGCTGC
AAATGCTGAATGAGGCATCGTTCCCATGCCATGTCGGATACCGAAGACAGCTCATGTATATCCGGTGAAGGGCAATCAGCTGTTGCCCGTCTCACTGGTGAAAAGAA
GCGTTGGTGCGCATCGGTAGTGGGGATAGCGATACGAAGACAGCTCATGTTATATCCGGTGAAGGGCAATCAGCTGTTGCCCGTCTCACTGGTGAAAAGAA
TGCTGGGGCAAACCAGCTGGACCGTTGCTGCAACTCTCCGCGCAATCCAGGGCCGTTGCGCACGACCAGGTTCCCGACTGACTGGAAAGCG
AAACCACCCTGCGCCCAATACGCCAAACCGCCTCTCCCCGCGCCGATTCATTAATGCAGCTGGCACGACCAGGTTCCCGACTGACTGGAAAGCG
GGCAGTGA
```

FIGURE 9. Variant *LacI-T7-sfgfp* SEQ ID NO 8

TAATACGACTCACTATAGGGAATTGTGAGCGGATAACAATTCCCCTCTAGAAGCTGTCACCGGATGTGCTTTCCGGTCTGATGAGTCCGTGAGGA
CGAAACAGCCCTCTACAAATAATTTTGTTTAAAAGCTTACATAAGGAGAACTACTAGTGAGAAAGGAAGAATTATTTACAGAGTTGTTCCAAT
TTTAGTGGAACTGGATGGTGATGTCAACGTCATAAGTTTTCCGTGCGTGGCGAGGTGAAGGTGACGCAACTAATGGTAAACTGACGCTGAAGTT
CATCTGTACTACTGGTAAACTGCCGGTACCTTGGCCGACTCTGTAACGACGCTGACTTATGGTGTTCAGTGCTTTCGTGTTTATCCGACCATAT
GAAGCAGCATGACTTCTTCAAGTCCGCCATGCGGAAGGCTATGTGCAGGAACGCATTGTCCTTTAAGGATGACGGCACGTACAAAACGCGTGC
GGAAGTGAAATTTGAAGGCGATACCCTGGTAAACCGCATTGAGCTGAAAGGCATTGACTTTAAAGAAGACGGCAATATCCTGGGCCATAAGCTGAA
ATACAATTTTAACAGCCACAATGTTACATCACCGCCGATAAACAAAAAAATGCATTAAAGCGAATTTAAAATTCGCCACAACGTGGAGGATGG
CAGCCGTGCAGCTGGCTGATCACTACCAGCAAAACACTCCGTTCTGCTGCACAATCACTATCTGAGCACGCAAAGCGT
TCTGTCTAAAGATCCGAACAGAGAAACGGATCATATGGTTCTGCTGGAGTTCGTAACCGCAGCGGGCATCACGCATGGTATGGATGAACTGTACAA
ATAACCAGGCATCAATAAACGAAAGGCTCAGTCGAAAGACTGGGCCTTTCGTGTTGTTTGTCGGTGAACGCTCTCTACTAGAGTCAC
ACTGGCTCACCTTCGGGTGGCCTTTCTGCGTTATACGTTTCGGTGATGAAGATCTTCCCGATGATTAATTCATTTTGCAAAAGTTGTTGACTTTATCTACAAG
GGGCGTTTTTATGCAGCAATGTGCTCGAGGGTAAATGTTAGTCGAGACTAGTAGCACATTAAGGAGAACTACTATGAACACGATTAACATCG
GTGTGGCATAAATGTGTGTAATTGTGAGCGGATAACAATTTAAGCTTGAACACTCTGGCTCAACACCTCTATCCCGTTCAACATGTTGAGCGTCAAGATGTT
CTAAGAACGACTTCTCTGACATCGAACTGGCTGAACGGCTTCCAAGATGTTTTGAGCGTCAACTGTTGAGGAAGCTGGTGAGGTTGCGGATAACGCTGCCGCCA
TTGAGCATGAGTCTTACGAGATGGGTAACAGCTTCCTAAGATGATTCAACGACTGGTTTGAGGAAGTGAAAGCTAAGCGTGCCTAACCAGTGCTGACAATACAACCGTTC
AGCCTCTCATCACTACCCTACTCCTAAGATCAAGCCGGAAATCAAGCCGGATAAGCCCATTGAGGACGAGCCTTGCCTGACCTTGAAGCTAAGCACTTCAAGAAAAACGTTG
TCCAGTTCCTGCAAGCAAGCGCAATCGGTCGGCGGTTGGGCGCAATCGTACAAGCACGTCTCTCAGAAGAAGCATTATGCGAGGCTGCAAGTGTGCAAGTGTACGCTCTCTAAGGGCGGCTGGCG
AGGAACAACTCAACAGCGCGTAGGGCCACGTCTACAAGAAGACTCTATTCATGTAGGAGTACGCTCGAGATGCTCATTGAGCAACCGGAATGGTTAGCTTACACC
AGGCCGTGGCTCTCGTGGCATAAGGAAGACTCTCAAGACTCTGAGACTTCGGGAAGAATGCCCCGAAGACAGCATGCCGAGGATGCTGAGGCTATCGAACCCGTGCAGGTGCGCTGGCTG
GCCAAAATGCTGGCTGATGTTCCAACCTTGCGTAGTCGAGACTTGCTCCTCCTAAGCCGTGGACTGGCATTACTGGTGGTGCTAACGGTCGTCGTCCTTGG
GCATCTCTCCGATGTTCCAACCTTGCGTAGTCGAGACTTGCTCCTCCTAAGCCGTGGACTGGCATTACTGGTGGTGCTAACGGTCGTCGTCCTTGG
CGCTGGTGCTACTCACAGTAAGAAAGTCCTAGCGCTGATGCGCCAACTGATAATCACCAATCCTGAGGCTCACCACCGCCGCGTGGAAACGTTTACATGCCGAGGACATTGTCCGTGCGCAATGGAAGACAAGGCTC
CATGGAAAATCAACAAGAAGTCCTAGCGCTGATCACTACAGCAATCACCAATCCTGAGGCTCACCACCGCCGCGTGGAAACGTTTACATGCCGAGGACATTGTCCGTGCGCAATGGAAGACAAGGCTC
AACTCCCGATGAAACCGGAAGACAATCGACATGAATCTTGAGCAAGCCAATTAAGTTTGCTAACCATAAGGCCATCTGTTCCCTTACAACATGGACTGGC
GCAAGTCTCCGCCATGCCTTAGCTTCATGTGTCAATGTTCAACCGCAAGTAACGATATGACCAAAGGACTGCTTACGCTGGCGAAGTAAACCAATCGGTAAGG
GCGGTTCGTGTTTACGCTGTGTCAAAATCCACTGGCTGAAAGGTGCCAAACTGTGCGGGTGTCGATAAGGTCTGGCTGGGTGAAGTTCATGAGGAAAACCACG
AGAACATCATGCCTAAGTCTGCCTAAGCTCCACTGGAGAACACTTGGTGGGGCTGAGCAAGATTCTCCGTTCGCTTCTGCGTTCCTTGCGTTCTGCGTTTCTGAGTACG
CTGGGGTACAGCACCACGCCGAGCTATAACTGCTCCTCCCCGCTGGCGTTTGACGGGTCTTG

FIGURE 9. (cont)

```
CTCTGGCATCCAGCACTTCTCCGCGATGCTCCGAGATGAGGTAGTGGTCGCGCGGTTAACTTGCTTCCTAGTGAAACCGTTCAGGACATCTACGG
GATTGTTGCTAAGAAAGTCAACGAGATTCTACAAGCAGAGATTCTACAAGCAGACCGATAACGAAGTAGTTACCGTGACCGATGAGAACACTGGTGA
AATCTCTGAGAAAGTCAAGCTGGGCACTAAGGCACTGGCTGGTCAATGGCTGGCTTACGGTGTTACTCGCAGTGTGACTAAGCGTTCAGTCATGAC
GCTGGCTTACGGGTCCAAAGAGTTCGGCTTCCGTCAACAAGTGCTGGAAGATACCATTCAGCCAGCTATTGATTCCGGCAAGGGTCTGATGTTCAC
TCAGCCGAATCAGGCTGCTGGCTTCCGTCTAAGCTGATACATGGCTAAGCTGATTTGGGAATCTGTGAGCGTGGTAGCGTGCGGTTGAAGCAATGAACTGGCTTAA
GTCTGCTGCTAAGCTGCTGCTGAGGTCAAAGATAAGAAGCCTATTCAGACGCGCGCTTGAACCTGATGTTCCGCTTACAGCGTTCCGCTCAGTTGGGTAACTCCTGATGG
TTTCCCTGTGTGCAGGAATACAAGAAGCCTATTCAGACGAGTCTTTGCACTGATTCACGACTCCTTCGGTACCATTCGTACACAGCCAAGCGTAGCCACCTTCGTAAGACTGTAGT
CAAAGATAGCGAGATTGATGCACACAAACAGAGTCTTTGCACTGATTCACGACTCCTTCGGTACCATTCGTACACAGCCAAGCGTAGCCACCTTCGTAAGACTGTAGT
GTGGGCACACGAGAAGTACGGAATCGAATCTTTTGCACTGACACATATGAGTCTTGTGATGTACTGGCTGATTTCTACGACCAGTTGCACGAGTCTCAATTGGACAA
GCGCGAAACTATGGTTGACACATATGAGTCTTGTGATGTACTGGCTGATTTCTACGACCAGTTGCACGAGTCTCAATTGGACAA
AATGCCAGCACTTCCGGCTAAAGGTAACTTGAACCTCCGTGACATCTTAGAGTCGGACATGCTGTAAGCATGCAAGCTAATTCGGTGGAA
ACGAGGTCATCATTTCCTTCCGAAAAAACGTTGCATTTAAATCTTACATATGTAATACTTTCAAAGACTACATTTGTAAGATTGTAGATTTGAGT
CGGCTGAAAGATCGTACGTACCAATTATTGTTCGTGATTGTTCAAGCACCATAACGTTATACGATGTCCAGAGTATGTCGGATAGTGAAAAGAGTGCTTCATCTGGTTACGATC
AATCAAATATTCAAACGGAGGAGACGATTTTGATGAAACCAGTAACGTTATACGATGTCCAGAGTATGCCGGAGTGGCGAGCTGAATTACATTCCCAACCGCGTGGCA
CGCGTGGTGAACCAGGCCAGCCACGTCGTTGCTGATGGCGTTGCCACCTCCAGTCTGGCCGTTGCCACCTCCAGTCTGGCGTCGATGGTAGAACGAAGCGGGTCGAAGCCTGTAAAACGGGTGCACAATCTTCTCGCGCAA
CAACAACTGGCGGGCAAACAGTCGTTGCTGATGGCGTTGCCACCTCCAGTCTGGCGTCGATGGTAGAACGAAGCGGGTCGAAGCCTGTAAAACGGGTGCACAATCTTCTCGCGCAA
CGCGGCCGATCAACTGGGTGCCAGCGTCGTTGCTGATCATTAACTATCCGCTGGATGTGTCGCTGGATGACCAGGATGCCATTGCTGTGGAAGCTGCCTGACCTAATGTTCCGGCGTTATTCTTGAT
CGCGTCAGTGGGCTGATCATTAACTATCCGCTGGATGTGTCGCTGGATGACCAGGATGCCATTGCTGTGGAAGCTGCCTGACCTAATGTTCCGGCGTTATTCTTGAT
GTCTCTGACCAGACACCCATCAACAGTATTATTTTCTCGGCGCGTTGCCTGCGCGTCTGCCTGCATAAATATCTCACTCGCAATCAAATTCAGCCGATA
ATCGGCTGTTAGCGGAAGGCGACTGGAGTCGCCATTGAGTTCTGTCTCGGCGCGTTGCCTGCGCGTCTGCCTGCATAAATATCTCACTCGCAATCAAATTCAGCCGATA
GCGAACGGGAAGGCGACTGGAGTCGCCAATGCGCGCCATTGGAGTCGCCATTGAGTTCTGTCTGGCCATGGCAACCATGCTGAATGAGGGCATCGTTCCCACTGCGATGCTGGTTGCC
AACGATCAGATGGCGCTGGGCGCAATGCGCCGTTAACCACCATCAACAGGATTTTCGCCTGCTGGGGCAAACCAGCGTGACCGTTGCTGACCGTGGATACGCAAACCGAA
GACAGCTCATGTTATATCCGCGTTAACCACCATCAACAGGATTTTCGCCTGCTGGGGCAAACCAGCGTGACCGTTGCTGACCGTGGATACGCAAACCGAA
GGCCAGGCGCAATCAGCTGTTGCCCGTCACTGTGAAAAGAAAACCACCCGGCGCCAATACGCGCCAAACCGCCTCTCCCCGCG
TTGGCCGATTCATTAATGCAGCTGGCACGACAGGTTTCCCGACTGGAAAGCGGGCAGTGA
```

FIGURE 10: Compete Vector with sfGFP Variant SEQ ID NO 9

```
GTTCAGCTCAGTGATACCTGCGATCCCTCCGCGATTCACGACAGCCGGCACACCGATGTCATCTGCACCGTATTGCCCGTCCAAATATGT
GCTGACACAGTTAATATGCTGTTTTCATTATGAAGAATGGCTTTTGTAATGCGAGCAAGACTCATCGCAACCCATAATAAGTCGCGCCTTTTTCTC
AATGATATGGTAAGCTGCGTTTTTCACATCATCTACAATTGGTCAGCTCCCTCTGTTGTACGACATCGTTTTTCTCAACGAGTTCACTGACCGG
CACACCGCCGACATTCGCGTGGCCTGCCCAAACAGGAAGCTCTGTCGCCGTGCCGTGTACGTTTGAGGCGCTGCGCCAAA
GTATTCGCTCAGCATGAAACGGAATCTCGCAGAATCAAGTGTTGTGCCGTCAAATCCGCTCTTTTGGCAGGCCGCTGAATTTCCATGTGC
GTAAGTCAGGATATCAACCGGATTGTCGCGACTAAGAAAATGCCGTCAAATCCGCCATGACTTCACTAACGATGCCTTTGAAAATCTTCAA
GTTCTTTTCTACTAATTCAAGGCGTGTCTGCTCCACCAGTTGTTTGGTTTTTTGTTCCTCCGGCGCAAATGCAGAGACAATATCAGCATCCTGCAGTCTTCATATGT
TCCGTAAGATGTTTTGACGGTTGTGCGCAAACGCCTTTCCGTGGTTAAATCCATCACATCGCCCATTGCTTTTTCTTTATTACATCAATGAC
CACAAGCTCATCTGATTCCTTGGTTAATTAACGCATAAGCTCCAACAAAACCCGCTCGATTAAAGCTACTTTATTTACATGTTT
GTTCATCATTAATCATCCTTCCAGGGTATGTTTCTCTTTGTGGAAGTATTTCACATTTATATTGTGCAACACTTCACAAACT
TTTGCAAGAGAAAAGTTTTGCTCTGATTTATGAACAAAAAAGAAACCATTGATGGTTTCTTCGGTAAGTCCCGTCTAGCCTTGCCCTCAATGG
GGAAGAGAACCGCTAAGCCGAGTCAGCCCAGTGTTGATATCCGGTCACGTGTCAGCAGCTGTAATCAAAGCCAGGCTGATTCTGACCGGGCACTTGGGCGCTGCCATTA
TTAAAAATCACTTTGCGTTAGCGCAACTACTCGGCTCCCATCATGTTTATAGATATAAGCATTACCTGCCTGTAAATTCCGCTCTGTTCCTTTTAGTTGGATTTGATAGCCGATGGTTTG
GATCCGGTCAATTCAATTACTCGGCTCCCATCATGTTTATAGATATAAGCATTACCTGCCTGTAAATTCCGCTCTGTTCCTTTTAGTTGGATTTGATAGCCGATGGTTTG
GCCGACGCTGGATCTCTTTTCCGATTGTGAATGATCATTGAATTGTGCCTGTCAGTTGATCGTGCCTGTCAGTTGATCGTGCTATTGCATTGATCATTGAATGAACCGCTGAGCCGCTGATTCATAAAT
AATGGATCTCCTTTTCCGATTGTGAATGATCATTGAATTGTGCCTGTCAGTTGATCGTGCTATTGCATTGATAGAGACAGAGGATGAACCTGCATTTGCCAGCACATCTATTGACCGCCAGTGTGAAATCTATTGACCCTGATCTTCAAT
TCTGCACGCAAGGTAATCGTCAGTAGACCTGGCATTGATAGAGACAGAGGATGAACCTGCATTTGCCAGCACACTGTTTGTAATTCTCAAGGAAAACATGAGGCGCTTTGCAATATCA
TCAGGATAAAGCACAGCTAATCGTCAGTAGACCTGGCATTGATAGAGACAGAGGATGAACCTGCATTTGCCAGCACACTGTTTACCATCGTTCACTGAAATGAACCCGCTCAGCTTTATTGTCATAC
CTGCCATCAGGCAATTTGTTTGCCGTATTGCGGTTCGAGAGTTCCTCAGGCGTGTCCAGCCATCACATTGTGAAATCTATTGACCGCCAGTAGCCCTGATCGATCCTGATCTTCAAT
ATCTGGTTGTTTCCATTCGGGTTGCCGTATTTGGCTTTTCCCGCGATCGCCTATTGGCTTTCCCGCGATCCGCGCCTATTGGCTTTCCCGCGATCCGCGCCTATTGGCTTTCCCGGGAACCTGAAACGGATATCATCATAATGTTCCGCCTCCAGGTCTGGAAAGAAAGAGCGCTACTGCCT
AAAGCACTCCCGCGATCGCCTATTGGCTTTCCCGCGATCGCCTATTGGCTTTCCCGCGATCCGCGCCTATTGGCTTTCCCGGGAACCTGAAACGGATATCATCATAATGTTCCGCCTCCAGGTCTGGAAAGAAAGAGCGCTACTGCCT
GAACGAGAAGCTATCACCGCCAGCTAAACGATATCAAATATTAAATTATAGTTAAATGAAAACAAAAAGTGTTCCACCATTTTTCAATTTTTTATAAT
TGATTACCAATTAGAATGAATATTCCCAAATATTAAATTATAGTTAAATGAAAACAAAAAGTGTTCCACCATTTTTCAATTTTTTATAAT
TTTTTAATCTGTATTTAAATAGTTATATTTAAATGAAAAGATTCAGCCACTACTGAATTCCCGAATATCTTTGTATGATTTTCCATATGAACTGCTAACAAA
ATTCTCTCCCTATGTTCTAATGGAAGAATTCAGCCACTACTGAATTCCCGAATATCTTTGTATGATTTTACCCGTGTCCATAGTTAAAATCATA
CGGCATAAAGTTAATATAGAGTTGGTTTCATCATCCTGATAATTATCTATTTTTTTCGTTTTGCTTGGTAAAGCATTATGTTAAATCGAATTT
GGAATATCAGTAGTAATTCCCTAAGTCATAATTCTTTATTTTCGTTTTGCTTGGTAAAGCATTATGTTAAATCGAATTT
AATTCCTTCGAGGAATGTATCCTTGTTAATTCAATATCGTAAGTTGCTTTATCCGTATATTTCTCATAAATAAATCTTTTTTTTGAAATAGGTCTAATTTTTTGTATAAGTATTTCT
TCTTGCTGAATAATAATTGTTAATTCAATATCGTAAGTTGCTTTATCCGTATATTTCTCATAAATAAATCTTTTTTTTGAAATAGGTCTAATTTTTTGTATAAGTATTTCT
TTACTTTGATCTGTCAATGTTCAGATACGACGACTAAAAAGTCAAGATCACTATTGGTTTTA
```

FIGURE 10 (cont)

```
GTCCACTCTCAACTCCTGATCCAAACATGTAAGTACCAATAAGGTTATTTTTAAATGTTTCCGAAGTATTTTTCACTTTATTAATTGTTCGT
ATGTATTCAAATATATCCCTCACTATTTGATTAGTACCTATTTGTTAATCCATAGTTGTTAATTAAATAAACTTAATTTAGTTTATTATAGAT
TTCATTGGCTTCTAAATTTTTATCTAGATAATAATTATTTAGTTAATTTATTCTAGATTATATATGATATGTATTATTAACATGATCTTTCATTTCCATAAAACTA
AAGTAAGTGTAAACCTATTCATTGTTTAAAAATATCTCTTGCCAGTCACGTTACGTTATTAGTTATTATAACATGTATTCACGAACGAA
AATCGCCATTCGCCAGCTGACATGTGCTCAGGTAAAGATCTCGATCCCGCGAAATTAATACGACTCACTATAGGGGAATTGTGAGCGGATAACAATTCCCCTCTA
GAAGCTGTCACCGGATGTGCTTCCGGTCTGATGAGTCCGTGAGGACGAAACAGCCCTCTACAAATAATTTGTTTAAAAGCTTACATAAGGAGGAA
CTACTATGAGAAAAGGAGAAGAATTATTACAGGAGTTGTTCCAATTTTAGTGGAACTGGATGGTGATGTCAACGGTCATAAGTTTCCGTGCGTG
GCGAGGGTGAAGGTGACGCAACTAATGGTAAACTGACGCTGAAGTTCATCTGTACTACTGGTAAACTGCCGGTACCTTGGCCGACTCTGGTAACGA
CGCTGACTTATGGTGTTCAGTGGTTGCTTTGCTCGTTATCCGGACCATATGAAGCAGCAGATGACTTCTTCAAGTCCGCCATGCCGGAAGGCTATGTGCAGG
AACGACGATTTCCTTAAGGATGACGGCACGTACAAAACGCGTGCGGAAGTGAAATTTGAAGGCGATACCCTGGTAAACCGCATTGAGCTGAAAG
GCATTGACTTTAAAGAAGACGGCAATATCCTGGCCACAATTAAGCTGGAATACAATTTAACAGCCACAATGTTTACATCACCGCCGATAAACAAAAA
ATGGCATTAAAGCGAATTTTAAAATTCGCCACAACGTGGAGGATGGCAGCGTGAGCAAAGCGTTCTGTCTAAAGATCCTGATCACTACCAGCAAAACACTCCAATCGGTGATG
GTCCTGTTCTGCTGCCAGACAATCACTATCTGAGCACGCAAAGCGTTCTGTCTAAAGATCCTGATCACTACCAGCAAAACACTCCAATCGGTGATG
TCGTAACCGCAGCGGGCATCACGCATGGTATGATGAACTGTACAAATAACCAGGCATCAAATAAAACGAAAGGCTCAGTCGAAAGACTGGGCCTT
TCGTTTTATCTGTTGTTTGTCGGTGAACGCTCTCTACTAGAGTCACACTGGCTCACCTTCGGGTGGGCGTTTTTTTATGCAAGAACGTTGCTCGAGGGTAAATGTG
AAGATCTTCCCGATGATTAATTAATTCAGAACGCTCGGTTGCCGCCGGGCGTTTTTTATGCAAGAACGTTGCTCGAGGGTAAATGTG
AGCACTCACAATTCATTTTGCAAAAGTTGTTGACTTTATCTACAAGGTGTGGCATAATGTGTGTAATTGTGAGCGGATAACAATTAAGCTTAGTCG
ACAGCTAGCACATAAGGAGGAACTACTATGAACACGATTAACATCGCTAAGAACATCGCTCTGACATGCAGCTTCTCGACACTTGGCTGCTGCTATCCCGTTCAACACT
CTGGCTGACCATTACGGTGAGCGTTTAGCTGCGAACAGTTGGCCCTTGGCCCTGAGCATGATGAGTCTTACGAGATGAAGCACGCTTCGAAGATGTTT
GAGCGTCAACTTAAAGCTGGTGAGGTTGCCGATAACGCGCCCCAAGCCTTCGACAATACAACCGTCGACAAGCGCAATACCGCGTAGGGCAGGCCATTGAGGACGAGGCTCGTTC
TGGTTTGAGGAAGTGAAAGTGAAAGCTAACCAGTGCTGACAATACAACCGTCGACAAGCGCAATACCGCGTAGGGCAGGCCATTGAGGACGAGGCTCGTTC
AAGACCACTCTGGCTTGCCTAACCAGTGCTGACAATACAACCGTTGAGGAACAACGTTGAGGAACAACTCAACAAGCGCGTAGGGCACGTCTACAAGAAAGCATTTATG
GGTCGTATCCGTGACCTTGAAGCTGACATGCTCTCTAAGGCTCTACTCCGTGGCGAGGCCGTGCTTCCGTGGCATAAGGAAGACTCTATTCATGTAGGAGTACGC
CAAGTTGTCGAGGCTGACATGCTCTCTAAGGCTCTACTCCGTGGCGAGGCCGTGCTTCCGTGGCATAAGGAAGACTCTATTCATGTAGGAGTACGC
TGCATCGAGATGCTCATTGAGTCAACCGGAATGGTTAGCTTACACCGCCAAAATGCTGGCGTAGTAGGCGTCAAGACTCTGAGACTATCGAACTCGCA
CCTGAATACGCTGAGGCTATCGCAACCGTGCGCTAACGGTCTCGTGCTCGTCCTCGCTGCTACGGCTACCCAGTAAGAAGCACTGATGCGCTACGAAGACGTT
GGCATTACTGGTGGTGTACAAAGCGATTAACATTGCGCAAAACACCGCATGGAAAATCAACAAGAAAGTCCTAGCGCTGCCAACGTAATCACCAAG
TGGAAGCATTGTCCGGTCGAGGACATCCCTGCGATTGAGCGTGAAGAACTCCCGATGAAACCGAAGACAT
```

FIGURE 10 (cont)

```
CGACATGAATCCTGAGGCTCTCACCCGTGAAACGTGCTGCCGCTGCTGTGTACCGCAAGGACAAGGCTCGCGAAGTCTCGCCGTATCAGCCTTGA
GTTCATGCTTGAGCAAGCCAATAAGTTTGCTAACCATAAGGCCATCTGTTCCCTTACAACATGGACTGGCCGCGTCGTGTTTACCGCTGTGTCAAT
GTTCAACCCGCAAGTAACGATATGACCAAGGACTGCTTACGCTGGCGAAAGGTAAACCAATCGGTAAGGAAGGTTACTACTGGCTGAAAATCCA
CGGTGCAAACTGTGCGGGTGTCGATAAGGTTCCGTTCCCTGAGCGCATCAAGTTCATTGAGGAAAACCACGAGAACATCATGGCTTGCGCTAAGTC
TCCACTGGAGAACACTTGGTGGGCTGAGCAAGATTCTCCGTTCTCCTTGCGTTCTCTGGCATCCAGCACTTCTCCGATGCTCCGAGATGAGGTAGGTGCGCGGT
CTATAACTGCTCCCTTCCGTGAAACCGTTCAGGACATCTACGGGATTGTTGCTAAGAAAGTCAACGAGATTCTACAAGCAGACAGCAATCAATGGACCGA
TAACGAAGTAGTTACCGTGACCGATGAGAACACTGGTGAAATCTCTGAGAAAGTCAAGCTGGGCACTGGGCTGTCAAGCCACTAAGGCCACTGGCTGGCTTA
CGGTGTTACTCGCAGTGTGACTAAGCGTTCAGTCATGACGCTCGGCTTCCGTCAACAAGTGCTGAAGATACCAT
TCAGCCAGCTATTGATTCCGGCAAGGGTCTGATGTTCACTCAGCCGAATCAGGCTGCTGGATACATGGCTAAGCTGATTGGGAATCTGTGAGCGT
GACGGTGGTAGCTGCGGTTGAAGCAATGAACTGCTTAAGTCTCGTAAGCTGCTGAGGTCAAAGATAAGAGACTGGAGAGATTCT
TCGCAAGCGTTGCGCTGTGCTTACAGCCACCTTCGTAAGACGGTAGCCACTTCGTAAGACGTGAGTCGGTCAGGAATACAAGAGTCGGTATCGCTCCTAACTTTGT
CCTCGGTCAGTTCCGCTTACAGCCACCTTCGTAAGACGTAGTGTGGGCACACGTAGTGCGCGAAACTATGGTTGACACATATGAGTCTTGTGATGTACTGCGTGCTGATTTCTACGA
ACACAGCCAAGACGTAGCCAAGACGGCTGACGCTGCGAACCTGTTCAAAGCACTGCTCGAAATGCCAGACACTTCCGGCTAAAGGTAACTTGAACCTCCGTGACATCTTAGAGTCGGA
CCAGTTCGCTGACCAGTTGCACGAGTCAAGCATGCAAGCTAATTCGGTGGAAACGAGGTCATCATTTCCTTCCGAAAAAACGGTTGCATTTAAATCTTACATATGTAAT
CTTCGCGTTCGCGTAAGCATGCAAGCTAATTCGGTGGAAACGAGGTCATCATTTCCTTCCGAAAAAACGGTTGCATTTAAATCTTACATATGTAAT
ACTTTCAAAGACTACATTTGTAAGATTTGATGTTTGAGTCGGCTGAAAGATCGGCTGAAAGATCGTACGTACCAATTATTGTTCAAGCCATAACACT
GTAGGGATAGTGGAAAGAGTGCTTCATCTGGTTACGATGTCTTCATCTGGTTACGATCAATCAAATATTCAAACGGAGGAGACGATTTTGATGAAACCAGTAACGTTATACGAT
GTCCAGAGTATGCCGGTGTCTCTTATCAGACCGTTTCCCGGTGAACCAGCCACGTTCGTTGCTGATTGGCCTTGCCACCTCCAGTCTGCC
GCGATGGCGGAGCTGAATTACATTCCCAACCGCGTGCCACAACCAGTCGTTGCTGATTGGCCTTGCCACCTCCAGTCTGCC
CTGCACGCGCCGTCGCAAATTGTCGCGGATGTCGCGGAAACTGGGTGCCAGCTGGTGCAGCGTGGAACGAAGCGGCGTC
GAAGCCTGTAAAACGGCGGTGCACAATCTCTCGCCAACGCGTCAGTGGGCTGATCATTAACTATCCGATGACCAGGATGCCATTGCTGTG
GAAGCTGCCTGGAGCATCTGGTCGCATTGGGTCACCAGACAAATCGCGCTGTTAGCGGAACGGGAAGGCGACTGGAGTGCCAATGCCACTGGAGTGCCAATGGCCAATGGTGAAGCCATGAAGACGCGTACGCGA
CTGGGCGTGGAGCATCTGGTCGCATTGGGTCACCAGACAAATCGCGCTGTTAGCGGAACGGGAAGGCGACTGGAGTGCCAATGCCCATTAAGTTCTGTCTCCGGCGTCTGCCTGGC
TGGCATAAATATCTCACTCGCAATCAAATTCAGCCGATAGCGAAGCGACTGGAGTGCCAATGCCACTGGAGTGCCAATGCCGAGTCCGGCTGCGCGTT
CTGAATGAGGGCATCGTTCCCACTGCGATGTCGGTTGCCAACGATCAGATGCGCGCTGTGGCCAACGATCAGATGCGCGCCAACGATGCGCGCCATTACCGAGTCCGGCTGCGCGTT
GGTGCCGATATCTCGGTAGTGGGATACGACGATACCGAAGACAGCTCATGTTATATCCCGTTAACCACCATCAAACAGATTTTCGCCTGCTG
GGGCAAACCAGCGTGGACCGCTTGCTGCAACTCTCTCCAGGGCGGTGAAGGCAATCAGCTGTTGCCCGTCTCACTGGTGAAAGAAAAACC
ACCCTGGCGCCCAATACGCAAACCGCGCCCTCTCCCCGCGCGTTGCCGATTCATTAATGCAGCTGG
```

FIGURE 10 (cont)

```
CACGACACAGGTTTCCCGACTGGAAAGCGGGCAGTGAGCGCAACGCAATTAATGTGAGTTAGGATCCTGAGCGCCGTCGCTACCATTACCAGTTGGT
CTGGTGTCAAAAATAATAATAACCGGGCAGCCCATGTCTCGCCCATTATTTCGCGTAAGGAGAAATCCATTATGTACTATTTAATTCTGCTGACATCCC
ATCGATCAGACCAGTTTTTAATTTGTGTGTTCCATGTGTCCAGTTTGTCCAGTTTGGAATACTCTTAACCTCTTCATTGGAAATCGCGGCATAATCACTGGTGGTAT
GATTGATGACCGCGTCAACAATGACCTTTATGCCATATCTTCAGCGCTGCACACATTCTTAAATTCTTGTTCAGTACCTAAGTAACGGTTGC
CAATTTGATACGATGTCGGCTGATACAGCCAGTACCAGTTCGACATGCTTTTATCTCCTTGATTCCCTTCCTTTACTTGGTTAATCGGAGATGTCT
GAATGGCTGTATATCCTGCATCATGAATATCCTTCATATTGTGTTTAACGTATTGAACGACCAATTCCATGCATGAAGAATGGTTCCGCTTTGA
TCGACGGTGCTGTAAGCTCATTCGATTTGTTCGCCGTTTCAGCACTCGCAGCCGCCTGCCAGAACCAAATGAAACAGCAATAAAAATCCAG
CGAATAACGGCAGTAAAGAGGTTTGAATCGTTTTGCAAACATTCTTGACACTCTTATTTGAAGACTTACTTCGGAGTCAAAAATCC
CTCTTACTTCATTCTTCCGCTTCCTCCTTTCAAACGATGTGAAGACTGGAGAATTTGTTAACGCTTACATTTAAAATTATCACAATCACTCTAT
CAAAACAACTTGGCAGAGTGAATACAAATCAATGTTCCTATAAAAAAGCTGCCCGAAACTGTGACGCTTCCCTCTGCTTTCCAAACAAAAAGAT
GATTTCTTTTTATTTCTTCTTGTAAGCCAGCTTCACAATCACATACCGAAGCAGAAACAGAACGCCGCCAGACGATAAAA
AGAAGAATCATTTTCAGCCAAGCGAAGAATGTATGGGGAATCCCCCGTCGTACATCGTAAGCACCACATCCGGATGCCGCAAAGGCGACCGCAATTGATTCT
ATTCGCTGCTGCTTCACCCGTTTTTGCAGTTCTCTTCTTGGTGTCTATTCTCGGCATGAGCATTCAAACATAATGCCGCGGATGATCATCAAGCAGCCAAATGCT
ATAATGATGAACAAAAACACAAGGCTTGCAGCCCATTCTTAAACGGAAATTCAAACATAATGCCGCGGATGATCATCAAGCAGCCAAATGCT
CCCGCTATCATCCCAATCTCCGACACTTCCCCATTCCTGCGCTTCTGCAATGATAACAGCCTTCTCTGCAATGAATAACTCAAAAGCCCGCC
TTCATGACCTTCCTCCCGCCACTTTTTACGAATGGCTTAAAACGGCCCCCAATTGATCGTTAAAACGGCCCCCAATTGATCGTCACACAGTTGAC
GTACAAGCCGGGCAGCAATCGTTAAAACGGCCCACTTGACATACGGAATACCGCCACCGGAAGCACCATGAGCGGCGATGTCGGGTTCACACAGTTGAC
AAGCGGCACCATAAACCGCAGCATAAACCGCTTCAACCGCAACCTGTCTCGTGATTCCCATCCAATCAGCGAGCGGCGCCAGCATCGGGCTGAATCCATCCAAAAGTGA
GACCCCTTCTCCAAGCATAAACCGCTTCAACCGCAACCTGTCTCGTGATTCCCATCCAATCAGCGAGCGGCGCCAGCATCGGGCTGAATCCATCCAAAAGTGA
TTCGCCAGAACCTGAAGAGATGAGAAAATGAAGCAGCCACTGCCCAGCAATGCCCGGAAATGCTTCGTGCCATCAGCGAAATGCTTCGTGCCATCAGCCCGTATACAAG
AGCCAAAGCATTGACGACCCGTAATGAAGGTTTTGGCAATATCGTTCGCCGCAAGCCCGCCTATTAAACCGGCAAGGACAGAAATAAAATAATGTCGCAGC
ACTTTGGCAGCCCGTAATGAAGGTTTTGGCAATATCGTTCGCCGCAAGCCCGCCTATTAAACCGGCAAGGACAGAAATAAAATAATGTCGCAGC
CATTTGGGAATCGACCAGCCAAGCTTCAAAGCGCCGTATAAAAATCCGACAAGTGAGAGTCCCGCCACAGCCACAGCCAAAATCAGCTTATGGCGAACGGT
AAACGGCACTGACTGATCTTCTTCTTTACCGCTTCGC
```

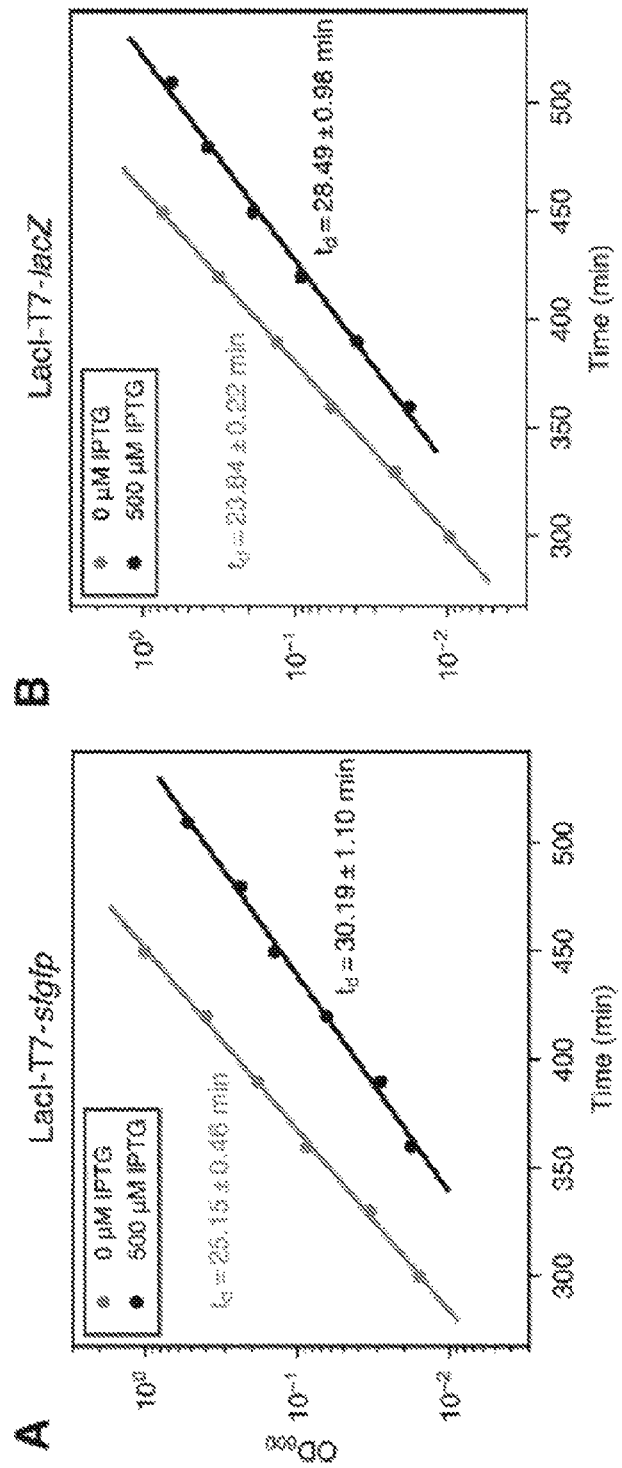
FIGURE 11 Growth curves of LacI-T7 strains

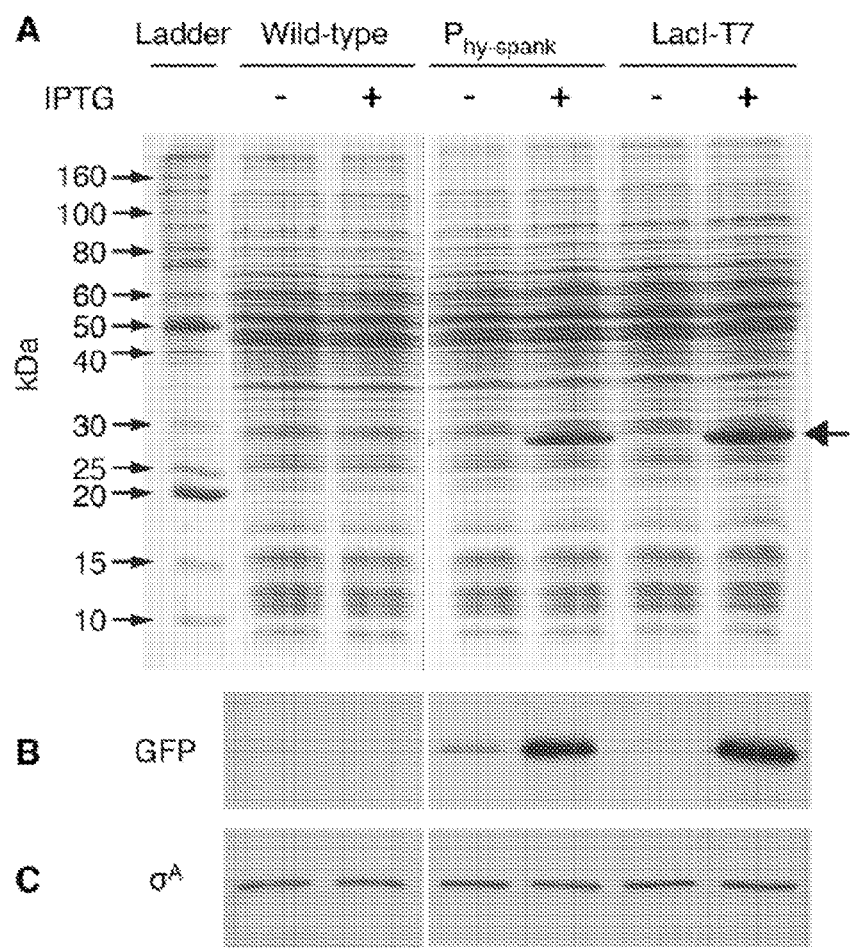
FIGURE 12 sfGFP expression from Phy-spank and LacI-T7

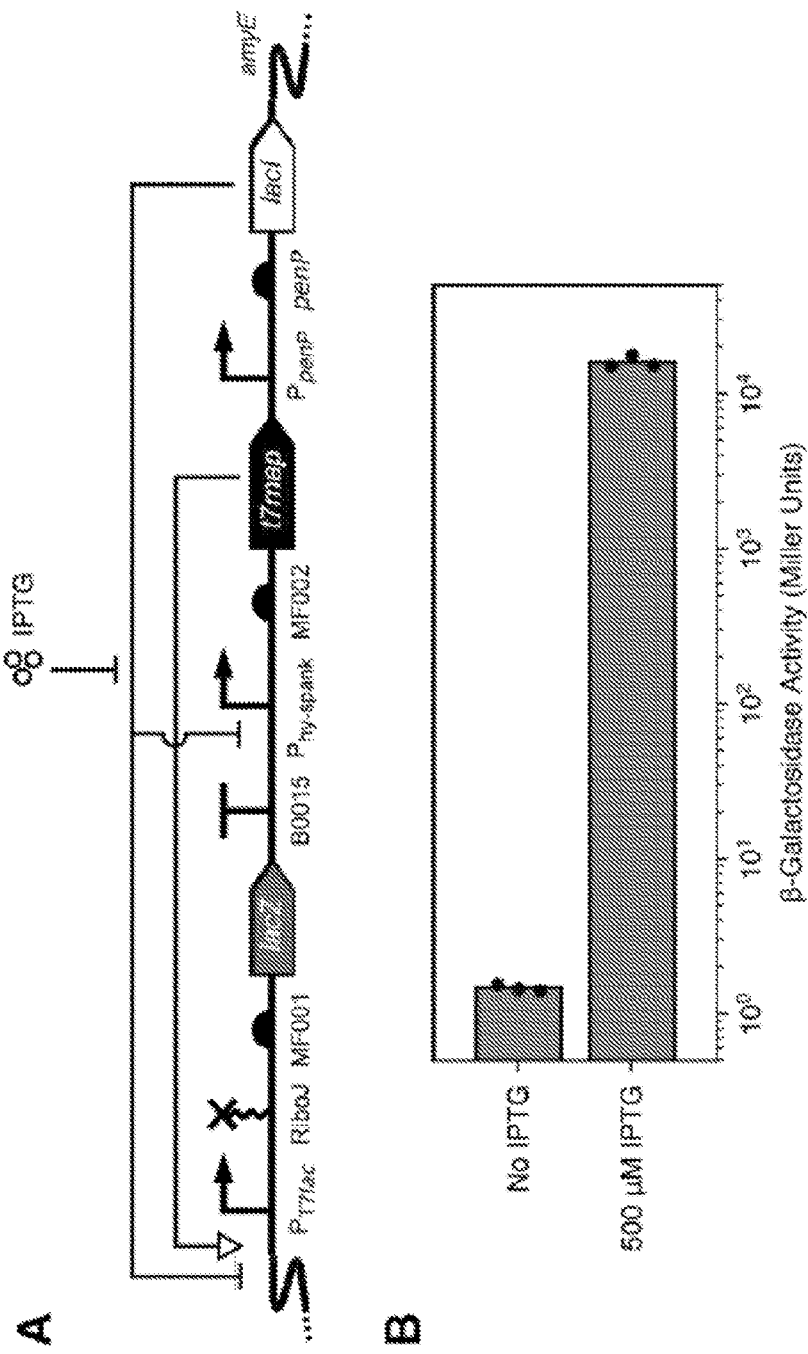
FIGURE 13 Performance of LacI-T7 measured via β-galactosidase

SEQUENCE LISTING

<160> NUMBER OF SEQ ID NOS: 22

<210> SEQ ID NO 1
<211> LENGTH: 154
<212> TYPE: DNA
<213> ORGANISM: Escherichia coli

<400> SEQUENCE: 1
taatacgact cactataggg gaattgtgag cggataacaa ttcccctcta gaagctgtca      60
ccggatgtgc tttccggtct gatgagtccg tgaggacgaa acagcctcta caaataattt    120
tgtttaaaag cttacataag gaggaactac tatg                                154

<210> SEQ ID NO 2
<211> LENGTH: 109
<212> TYPE: DNA
<213> ORGANISM: Escherichia coli

<400> SEQUENCE: 2
ggtaaatgtg agcactcaca attcattttg caaaagttgt tgactttatc tacaaggtgt      60
ggcataatgt gtgtaattgt gagcggataa caattaagct tagtcgaca               109

<210> SEQ ID NO 3
<211> LENGTH: 883
<212> TYPE: PRT
<213> ORGANISM: T7 PHAGE

<400> SEQUENCE: 3

Met Asn Thr Ile Asn Ile Ala Lys Asn Asp Phe Ser Asp Ile Glu Leu
1               5                   10                  15

Ala Ala Ile Pro Phe Asn Thr Leu Ala Asp His Tyr Gly Glu Arg Leu
            20                  25                  30

```
Ala Arg Glu Gln Leu Ala Leu Glu His Glu Ser Tyr Glu Met Gly Glu
        35                  40                  45

Ala Arg Phe Arg Lys Met Phe Glu Arg Gln Leu Lys Ala Gly Glu Val
 50                  55                  60

Ala Asp Asn Ala Ala Lys Pro Leu Ile Thr Thr Leu Leu Pro Lys
 65                  70                  75                  80

Met Ile Ala Arg Ile Asn Asp Trp Phe Glu Val Lys Ala Lys Arg
                 85                  90                  95

Gly Lys Arg Pro Thr Ala Phe Gln Phe Leu Gln Glu Ile Lys Pro Glu
             100                 105                 110

Ala Val Ala Tyr Ile Thr Ile Lys Thr Thr Leu Ala Cys Leu Thr Ser
             115                 120                 125

Ala Asp Asn Thr Thr Val Gln Ala Val Ala Ser Ala Ile Gly Arg Ala
             130                 135                 140

Ile Glu Asp Glu Ala Arg Phe Gly Arg Ile Arg Asp Leu Glu Ala Lys
145                 150                 155                 160

His Phe Lys Lys Asn Val Glu Gln Leu Asn Lys Arg Val Gly His
                 165                 170                 175

Val Tyr Lys Lys Ala Phe Met Gln Val Val Glu Ala Asp Met Leu Ser
             180                 185                 190

Lys Gly Leu Leu Gly Gly Glu Ala Trp Ser Ser Trp His Lys Glu Asp
             195                 200                 205

Ser Ile His Val Gly Val Arg Cys Ile Glu Met Leu Ile Glu Ser Thr
             210                 215                 220

Gly Met Val Ser Leu His Arg Gln Asn Ala Gly Val Val Gly Gln Asp
225                 230                 235                 240

Ser Glu Thr Ile Glu Leu Ala Pro Glu Tyr Ala Glu Ala Ile Ala Thr
                 245                 250                 255

Arg Ala Gly Ala Leu Ala Gly Ile Ser Pro Met Phe Gln Pro Cys Val
             260                 265                 270

Val Pro Pro Lys Pro Trp Thr Gly Ile Thr Gly Gly Tyr Trp Ala
             275                 280                 285

Asn Gly Arg Arg Pro Leu Ala Leu Val Arg Thr His Ser Lys Lys Ala
 290                 295                 300

Leu Met Arg Tyr Glu Asp Val Tyr Met Pro Glu Val Tyr Lys Ala Ile
305                 310                 315                 320

Asn Ile Ala Gln Asn Thr Ala Trp Lys Ile Asn Lys Lys Val Leu Ala
                 325                 330                 335

Val Ala Asn Val Ile Thr Lys Trp Lys His Cys Pro Val Glu Asp Ile
             340                 345                 350

Pro Ala Ile Glu Arg Glu Glu Leu Pro Met Lys Pro Glu Asp Ile Asp
             355                 360                 365

Met Asn Pro Glu Ala Leu Thr Ala Trp Lys Arg Ala Ala Ala Val
 370                 375                 380

Tyr Arg Lys Asp Lys Ala Arg Lys Ser Arg Arg Ile Ser Leu Glu Phe
385                 390                 395                 400

Met Leu Glu Gln Ala Asn Lys Phe Ala Asn His Lys Ala Ile Trp Phe
                 405                 410                 415

Pro Tyr Asn Met Asp Trp Arg Gly Arg Val Tyr Ala Val Ser Met Phe
             420                 425                 430

Asn Pro Gln Gly Asn Asp Met Thr Lys Gly Leu Leu Thr Leu Ala Lys
             435                 440                 445
```

-continued

| | | | | | | | | | | | | | | |
|---|---|---|---|---|---|---|---|---|---|---|---|---|---|---|
|Gly|Lys|Pro|Ile|Gly|Lys|Glu|Gly|Tyr|Tyr|Trp|Leu|Lys|Ile|His|Gly|
| |450| | | |455| | | |460| | | | | |

Ala Asn Cys Ala Gly Val Asp Lys Val Pro Phe Pro Glu Arg Ile Lys
465             470             475             480

Phe Ile Glu Glu Asn His Glu Asn Ile Met Ala Cys Ala Lys Ser Pro
            485             490             495

Leu Glu Asn Thr Trp Trp Ala Glu Gln Asp Ser Pro Phe Cys Phe Leu
            500             505             510

Ala Phe Cys Phe Glu Tyr Ala Gly Val Gln His His Gly Leu Ser Tyr
            515             520             525

Asn Cys Ser Leu Pro Leu Ala Phe Asp Gly Ser Cys Ser Gly Ile Gln
530             535             540

His Phe Ser Ala Met Leu Arg Asp Glu Val Gly Gly Arg Ala Val Asn
545             550             555             560

Leu Leu Pro Ser Glu Thr Val Gln Asp Ile Tyr Gly Ile Val Ala Lys
            565             570             575

Lys Val Asn Glu Ile Leu Gln Ala Asp Ala Ile Asn Gly Thr Asp Asn
            580             585             590

Glu Val Val Thr Val Thr Asp Glu Asn Thr Gly Glu Ile Ser Glu Lys
            595             600             605

Val Lys Leu Gly Thr Lys Ala Leu Ala Gly Gln Trp Leu Ala Tyr Gly
            610             615             620

Val Thr Arg Ser Val Thr Lys Arg Ser Val Met Thr Leu Ala Tyr Gly
625             630             635             640

Ser Lys Glu Phe Gly Phe Arg Gln Gln Val Leu Glu Asp Thr Ile Gln
            645             650             655

Pro Ala Ile Asp Ser Gly Lys Gly Leu Met Phe Thr Gln Pro Asn Gln
            660             665             670

Ala Ala Gly Tyr Met Ala Lys Leu Ile Trp Glu Ser Val Ser Val Thr
            675             680             685

Val Val Ala Ala Val Glu Ala Met Asn Trp Leu Lys Ser Ala Ala Lys
            690             695             700

Leu Leu Ala Ala Glu Val Lys Asp Lys Lys Thr Gly Glu Ile Leu Arg
705             710             715             720

Lys Arg Cys Ala Val His Trp Val Thr Pro Asp Gly Phe Pro Val Trp
            725             730             735

Gln Glu Tyr Lys Lys Pro Ile Gln Thr Arg Leu Asn Leu Met Phe Leu
            740             745             750

Gly Gln Phe Arg Leu Gln Pro Thr Ile Asn Thr Asn Lys Asp Ser Glu
            755             760             765

Ile Asp Ala His Lys Gln Glu Ser Gly Ile Ala Pro Asn Phe Val His
            770             775             780

Ser Gln Asp Gly Ser His Leu Arg Lys Thr Val Val Trp Ala His Glu
785             790             795             800

Lys Tyr Gly Ile Glu Ser Phe Ala Leu Ile His Asp Ser Phe Gly Thr
            805             810             815

Ile Pro Ala Asp Ala Ala Asn Leu Phe Lys Ala Val Arg Glu Thr Met
            820             825             830

Val Asp Thr Tyr Glu Ser Cys Asp Val Leu Ala Asp Phe Tyr Asp Gln
            835             840             845

Phe Ala Asp Gln Leu His Glu Ser Gln Leu Asp Lys Met Pro Ala Leu
850             855             860

Pro Ala Lys Gly Asn Leu Asn Leu Arg Asp Ile Leu Glu Ser Asp Phe

```
<210> SEQ ID NO 4
<211> LENGTH: 94
<212> TYPE: DNA
<213> ORGANISM: Bacillus licheniformis

<400> SEQUENCE: 4
cggtggaaac gaggtcatca tttccttccg aaaaaacggt tgcatttaaa tcttacatat      60
gtaatacttt caaagactac atttgtaaga tttg                                  94

<210> SEQ ID NO 5
<211> LENGTH: 5152
<212> TYPE: DNA
<213> ORGANISM: Artificial Sequence
<220> FEATURE:
<223> OTHER INFORMATION: LacI-T7-sfgfp

<400> SEQUENCE: 5
taatacgact cactataggg gaattgtgag cggataacaa ttcccctcta gaaagcttac      60
ataaggagga actactatgc gtaaaggcga agagctgttc actggtgtcg tccctattct     120
ggtggaactg gatggtgatg tcaacggtca taagttttcc gtgcgtggcg agggtgaagg     180
tgacgcaact aatggtaaac tgacgctgaa gttcatctgt actactggta aactgccggt     240
accttggccg actctggtaa cgacgctgac ttatggtgtt cagtgctttg ctcgttatcc     300
ggaccatatg aagcagcatg acttcttcaa gtccgccatg ccggaaggct atgtgcagga     360
acgcacgatt ccctttaagg atgacggcac gtacaaaacg cgtgcggaag tgaaatttga     420
aggcgatacc ctggtaaacc gcattgagct gaaaggcatt gactttaaag aagacggcaa     480
tatcctgggc cataagctgg aatacaattt taacagccac aatgtttaca tcaccgccga     540
taaacaaaaa aatggcatta agcgaatttt aaaattcgc cacaacgtgg aggatggcag     600
cgtgcagctg gctgatcact accagcaaaa cactccaatc ggtgatggtc ctgttctgct     660
gccagacaat cactatctga gcacgcaaag cgttctgtct aaagatccga acgagaaacg     720
cgatcatatg gttctgctgg agttcgtaac cgcagcgggc atcacgcatg gtatggatga     780
actgtacaaa tgatgataat aatctagacc aggcatcaaa taaaacgaaa ggctcagtcg     840
aaagactggg cctttcgttt tatctgttgt ttgtcggtga acgctctcta ctagagtcac     900
actggctcac cttcgggtgg gcctttctgc gtttatacgt ttcggtgatg aagatcttcc     960
cgatgattaa ttaattcaga acgctcggtt gccgccgggc gttttttatg cagcaatggc    1020
aagaacgttg ctcgagggta aatgtgagca ctcacaattc attttgcaaa agttgttgac    1080
tttatctaca aggtgtggca taatgtgtgt aattgtgagc ggataacaat taagcttagt    1140
cgacagctag cacataagga ggaactacta tgaacacgat taacatcgct aagaacgact    1200
tctctgacat cgaactggct gctatcccgt tcaacactct ggctgaccat acggtgagc    1260 gtttagctcg cgaacagttg gcccttgagc atgagtctta cgagatgggt gaagcacgct    1320
tccgcaagat gtttgagcgt caacttaaag ctggtgaggt tgcggataac gctgccgcca    1380
agcctctcat cactacccta ctccctaaga tgattgcacg catcaacgac tggtttgagg    1440
aagtgaaagc taagcgcggc aagcgcccga cagccttcca gttcctgcaa gaaatcaagc    1500
cggaagccgt agcgtacatc accattaaga ccactctggc ttgcctaacc agtgctgaca    1560
atacaaccgt tcaggctgta gcaagcgcaa tcggtcgggc cattgaggac gaggctcgct    1620
```

```
tcggtcgtat ccgtgacctt gaagctaagc acttcaagaa aaacgttgag gaacaactca    1680
acaagcgcgt agggcacgtc tacaagaaag catttatgca agttgtcgag gctgacatgc    1740
tctctaaggg tctactcggt ggcgaggcgt ggtcttcgtg gcataaggaa gactctattc    1800
atgtaggagt acgctgcatc gagatgctca ttgagtcaac cggaatggtt agcttacacc    1860
gccaaaatgc tggcgtagta ggtcaagact ctgagactat cgaactcgca cctgaatacg    1920
ctgaggctat cgcaacccgt gcaggtgcgc tggctggcat ctctccgatg ttccaacctt    1980
gcgtagttcc tcctaagccg tggactggca ttactggtgg tggctattgg gctaacggtc    2040
gtcgtcctct ggcgctggtg cgtactcaca gtaagaaagc actgatgcgc tacgaagacg    2100
tttacatgcc tgaggtgtac aaagcgatta acattgcgca aaacaccgca tggaaaatca    2160
acaagaaagt cctagcggtc gccaacgtaa tcaccaagtg gaagcattgt ccggtcgagg    2220
acatccctgc gattgagcgt gaagaactcc cgatgaaacc ggaagacatc gacatgaatc    2280
ctgaggctct caccgcgtgg aaacgtgctg ccgctgctgt gtaccgcaag gacaaggctc    2340
gcaagtctcg ccgtatcagc cttgagttca tgcttgagca agccaataag tttgctaacc    2400
ataaggccat ctggttccct tacaacatgg actggcgcgg tcgtgtttac gctgtgtcaa    2460
tgttcaaccc gcaaggtaac gatatgacca aaggactgct tacgctggcg aaaggtaaac    2520
caatcggtaa ggaaggttac tactggctga aaatccacgg tgcaaactgt gcgggtgtcg    2580
ataaggttcc gttccctgag cgcatcaagt tcattgagga aaaccacgag aacatcatgg    2640
cttgcgctaa gtctccactg gagaacactt ggtgggctga gcaagattct ccgttctgct    2700
tccttgcgtt ctgctttgag tacgctgggg tacagcacca cggcctgagc tataactgct    2760
cccttccgct ggcgtttgac gggtcttgct ctggcatcca gcacttctcc gcgatgctcc    2820
gagatgaggt aggtggtcgc gcggttaact tgcttcctag tgaaaccgtt caggacatct    2880 acggattgt tgctaagaaa gtcaacgaga ttctacaagc agacgcaatc aatgggaccg    2940
ataacgaagt agttaccgtg accgatgaga acactggtga aatctctgag aaagtcaagc    3000
tgggcactaa ggcactggct ggtcaatggc tggcttacgg tgttactcgc agtgtgacta    3060
agcgttcagt catgacgctg gcttacgggt ccaaagagtt cggcttccgt caacaagtgc    3120
tggaagatac cattcagcca gctattgatt ccggcaaggg tctgatgttc actcagccga    3180
atcaggctgc tggatacatg gctaagctga tttgggaatc tgtgagcgtg acggtggtag    3240
ctgcggttga agcaatgaac tggcttaagt ctgctgctaa gctgctggct gctgaggtca    3300
aagataagaa gactggagag attcttcgca agcgttgcgc tgtgcattgg gtaactcctg    3360
atggtttccc tgtgtggcag gaatacaaga agcctattca gacgcgcttg aacctgatgt    3420
tcctcggtca gttccgctta cagcctacca ttaacaccaa caagatagc gagattgatg    3480 cacacaaaca ggagtctggt atcgctccta actttgtaca cagccaagac ggtagccacc    3540
ttcgtaagac tgtagtgtgg gcacacgaga agtacggaat cgaatctttt gcactgattc    3600
acgactcctt cggtaccatt ccggctgacg ctgcgaacct gttcaaagca gtgcgcgaaa    3660
ctatggttga cacatatgag tcttgtgatg tactggctga tttctacgac cagttcgctg    3720
accagttgca cgagtctcaa ttggacaaaa tgccagcact tccggctaaa ggtaacttga    3780
acctccgtga catcttagag tcggacttcg cgttcgcgta agcatgcaag ctaattcggt    3840
ggaaacgagg tcatcatttc cttccgaaaa aacggttgca tttaaatctt acatatgtaa    3900
tactttcaaa gactacattt gtaagatttg atgtttgagt cggctgaaag atcgtacgta    3960
```

```
ccaattattg tttcgtgatt gttcaagcca taacactgta gggatagtgg aaagagtgct    4020
tcatctggtt acgatcaatc aaatattcaa acggagggag acgattttga tgaaaccagt    4080
aacgttatac gatgtcgcag agtatgccgg tgtctcttat cagaccgttt cccgcgtggt    4140
gaaccaggcc agccacgttt ctgcgaaaac gcgggaaaaa gtggaagcgg cgatggcgga    4200
gctgaattac attcccaacc gcgtggcaca acaactggcg gcaaacagt cgttgctgat    4260 tggcgttgcc acctccagtc tggccctgca cgcgccgtcg caaattgtcg cggcgattaa    4320
atctcgcgcc gatcaactgg gtgccagcgt ggtggtgtcg atggtagaac gaagcggcgt    4380
cgaagcctgt aaaacggcgg tgcacaatct tctcgcgcaa cgcgtcagtg ggctgatcat    4440
taactatccg ctggatgacc aggatgccat tgctgtggaa gctgcctgca ctaatgttcc    4500
ggcgttattt cttgatgtct ctgaccagac acccatcaac agtattattt ctcccatga    4560 agacggtacg cgactgggcg tggagcatct ggtcgcattg gtcaccagc aaatcgcgct    4620 gttagcgggc ccattaagtt ctgtctcggc gcgtctgcgt ctggctggct ggcataaata    4680
tctcactcgc aatcaaattc agccgatagc ggaacgggaa ggcgactgga gtgccatgtc    4740
cggttttcaa caaccatgc aaatgctgaa tgagggcatc gttcccactg cgatgctggt    4800
tgccaacgat cagatggcgc tgggcgcaat gcgcgccatt accgagtccg ggctgcgcgt    4860
tggtgcggat atctcggtag tgggatacga cgataccgaa gacagctcat gttatatccc    4920
gccgttaacc accatcaaac aggattttcg cctgctgggg caaaccagcg tggaccgctt    4980
gctgcaactc tctcagggcc aggcggtgaa gggcaatcag ctgttgcccg tctcactggt    5040
gaaaagaaaa accaccctgg cgcccaatac gcaaaccgcc tctccccgcg cgttggccga    5100
ttcattaatg cagctggcac gacaggtttc ccgactggaa agcgggcagt ga    5152
```

<210> SEQ ID NO 6
<211> LENGTH: 10641
<212> TYPE: DNA
<213> ORGANISM: Artificial Sequence
<220> FEATURE:
<223> OTHER INFORMATION: ARTIFICIAL VECTOR

<400> SEQUENCE: 6

```
gttcagctca gtgatacctg cgatccctcc gcgattcacg acagccggca caccgatgta      60
cacgtcatct gcaccgtatt gcccgtccaa atatgtgctg acagttaata tgctgttttc     120
attatgaaga atggcttttg taatgcgagc aagactcatc gcaaccccat aataagtcgc     180
gccttttttc tcaatgatat ggtaagctgc gttttcaca tcatctacaa tttggtccag     240
ctcctcttgt ttgtacgcat cgttttctc aacgagttca ctgaccggca caccgccgac     300
attcgcgtgg ctccaaacag gaagctctgt gtcgccgtgc tctccgataa tatgcgcgtg     360
tacgttttga ggcgctgcgc caaagtattc gctcagcatg aaacggaatc tcgcagaatc     420
aagtgttgtg ccgcttccaa tcacccgctc ttttggcagg ccgctgaatt ccatgttgc     480 gtaagtcagg atatcaaccg gatttgtcgc gactaagaaa atgccgtcaa atccgctcgc     540
catgacttca ctaacgatgc ctttgaaaat cttcaagttc ttttctacta attcaaggcg     600
tgtctcacca ggttttggt ttgctccggc gcaaatgcag acaatatcag catccttgca     660
gtcttcatat gttccgtaag atgttttgac cggttgtggc gcaaacgcct ttccgtggtt     720
taaatccatc acatcgccca ttgctttttc tttatttaca tcaatgacca caagctcatc     780
tgtgattcct tggttaatta acgcaaatgc ataactgctt ccaacaaaac ccgctccgat     840
taaagctact ttatttacat gtttgttcat cattaatcat ccttccaggg tatgtttctc     900
```

```
tttgatgtct ttttgtttgt gaagtatttc acatttatat tgtgcaacac ttcacaaact    960
tttgcaagag aaaagttttg tctgatttat gaacaaaaaa gaaaccatca ttgatggttt   1020
ctttcggtaa gtcccgtcta gccttgccct caatggggaa gagaaccgct taagcccgag   1080
tcattatata aaccatttag cacgtaatca aagccaggct gattctgacc gggcacttgg   1140
gcgctgccat tattaaaaat cacttttgcg ttggttgtat ccgtgtccgc aggcagcgtc   1200
agcgtgtaaa ttccgtctgc attttttagtc attggttttc caggccaaga tccggtcaat   1260
tcaattactc ggctcccatc atgtttatag atataagcat ttacctggct ccaatgattc   1320
ggattttgat agccgatggt tttggccgac gctggatctc ttttaacaaa actgtatttc   1380
tcggtcctcg ttacaccatc actgttcgtt ccttttaaca tgatggtgta tgttttgcca   1440
aatggatctc cttttccgat tgtgaattga ctccatcct aaacgccgt ctctggtcca   1500
ttattgattt gataaacggc ttttgttgta ttcgcatctg cacgcaaggt aatcgtcagt   1560
tgatcattga agaatgtgt tacacctgtt ttgtaattct caaggaaaac atgaggcgct   1620
tttgcaatat catcaggata aagcacagct acagacctgg cattgatcgt gcctgtcagt   1680
ttaccatcgt tcacttgaaa tgaacccgct ccagctttat tgtcatacct gccatcaggc   1740
aattttgttg ccgtattgat agagacagag gatgaacctg catttgccag cacaacgcca   1800
tgtgagccgc gctgattcat aaatatctgg ttgtttccat tcgggttcga gagttcctca   1860
ggctgtccag ccatcacatt gtgaaatcta ttgaccgcag tgatagcctg atcttcaaat   1920
aaagcactcc cgcgatcgcc tatttggctt tcccccggga acctcacacc atttccgcct   1980
ccctcaggtc tggaaaagaa aagaggcgta ctgcctgaac gagaagctat caccgcccag   2040
cctaaacgga tatcatcatc gctcatccat gtcgagatcc ccctatgcaa gggtttattg   2100
ttttctaaaa tctgattacc aattagaatg aatatttccc aaatattaaa taataaaaca   2160
aaaaaattga aaaagtgtt tccaccattt tttcaatttt tttataattt ttttaatctg   2220
ttatttaaat agtttatagt taaatttaca ttttcattag tccattcaat attctctcca   2280
agataactac gaactgctaa caaaattctc tccctatgtt ctaatggaga agattcagcc   2340
actgcatttc ccgcaatatc ttttggtatg attttacccg tgtccatagt taaaatcata   2400
cggcataaag ttaatataga gttggtttca tcatcctgat aattatctat taattcctct   2460
gacgaatcca taatggctct tctcacatca gaaaatggaa tatcaggtag taattcctct   2520
aagtcataat ttccgtatat tcttttattt tttcgttttg cttggtaaag cattatggtt   2580
aaatctgaat ttaattcctt ctgaggaatg tatccttgtt cataaagctc ttgtaaccat   2640
tctccataaa taaattcttg tttgggagga tgattccacg gtaccatttc ttgctgaata   2700
ataattgtta attcaatata tcgtaagttg cttttatctc ctattttttt tgaaataggt   2760
ctaattttt gtataagtat ttctttactt tgatctgtca atggttcaga tacgacgact   2820
aaaaagtcaa gatcactatt tggttttagt ccactctcaa ctcctgatcc aaacatgtaa   2880
gtaccaataa ggttattttt taaatgtttc cgaagtattt ttttcacttt attaatttgt   2940
tcgtatgtat tcaaatatat cctcctcact attttgatta gtaccatttt tatatccata   3000
gttgttaatt aaataaactt aatttagttt atttatagat ttcattggct tctaaatttt   3060
ttatctagat aataattatt ttagttaatt ttattctaga ttatatatga tatgatcttt   3120
catttccata aaactaaagt aagtgtaaac ctattcattg ttttaaaaat atctcttgcc   3180
agtcacgtta cgttattagt tatagttatt ataacatgta ttcacgaacg aaaatcgcca   3240
```

```
ttcgccagct gcaggtaaag atctcgatcc cgcgaaatta atacgactca ctatagggga    3300
attgtgagcg gataacaatt cccctctaga aagcttacat aaggaggaac tactatgcgt    3360
aaaggcgaag agctgttcac tggtgtcgtc cctattctgg tggaactgga tggtgatgtc    3420
aacggtcata gttttccgt gcgtggcgag ggtgaaggtg acgcaactaa tggtaaactg    3480
acgctgaagt tcatctgtac tactggtaaa ctgccggtac cttggccgac tctggtaacg    3540
acgctgactt atggtgttca gtgctttgct cgttatccgg accatatgaa gcagcatgac    3600
ttcttcaagt ccgccatgcc ggaaggctat gtgcaggaac gcacgatttc ctttaaggat    3660
gacggcacgt acaaaacgcg tgcggaagtg aaatttgaag cgataccct ggtaaaccgc     3720 attgagctga aaggcattga ctttaaagaa gacggcaata tcctgggcca taagctggaa    3780 tacaattta acagccacaa tgtttacatc accgccgata acaaaaaaa tggcattaaa      3840 gcgaatttta aaattcgcca caacgtggag gatggcagcg tgcagctggc tgatcactac    3900
cagcaaaaca ctccaatcgg tgatggtcct gttctgctgc cagacaatca ctatctgagc    3960
acgcaaagcg ttctgtctaa agatccgaac gagaaacgcg atcatatggt tctgctggag    4020
ttcgtaaccg cagcgggcat cacgcatggt atggatgaac tgtacaaatg atgataataa    4080
tctagaccag gcatcaaata aaacgaaagg ctcagtcgaa agactgggcc tttcgttta    4140 tctgttgttt gtcggtgaac gctctctact agagtcacac tggctcacct tcgggtgggc    4200 cttttctgcgt ttatacgttt cggtgatgaa gatcttcccg atgattaatt aattcagaac    4260
gctcggttgc cgccgggcgt tttttatgca gcaatggcaa gaacgttgct cgagggtaaa    4320
tgtgagcact cacaattcat tttgcaaaag ttgttgactt tatctacaag gtgtggcata    4380
atgtgtgtaa ttgtgagcgg ataacaatta agcttagtcg acagctagca cataaggagg    4440
aactactatg aacacgatta acatcgctaa gaacgacttc tctgacatcg aactggctgc    4500
tatcccgttc aacactctgg ctgaccatta cggtgagcgt ttagctcgcg aacagttggc    4560
ccttgagcat gagtcttacg agatgggtga agcacgcttc cgcaagatgt ttgagcgtca    4620
acttaaagct ggtgaggttg cggataacgc tgccgccaag cctctcatca ctaccctact    4680
ccctaagatg attgcacgca tcaacgactg gtttgaggaa gtgaaagcta agcgcggcaa    4740
gcgcccgaca gccttccagt tcctgcaaga aatcaagccg gaagccgtag cgtacatcac    4800
cattaagacc actctggctt gcctaaccag tgctgacaat acaaccgttc aggctgtagc    4860
aagcgcaatc ggtcgggcca ttgaggacga ggctcgcttc ggtcgtatcc gtgaccttga    4920
agctaagcac ttcaagaaaa acgttgagga caactcaac aagcgcgtag gcacgtcta    4980 caagaaagca tttatgcaag ttgtcgaggc tgacatgctc tctaagggtc tactcggtgg    5040
cgaggcgtgg tcttcgtggc ataaggaaga ctctattcat gtaggagtac gctgcatcga    5100
gatgctcatt gagtcaaccg gaatggttag cttacaccgc caaaatgctg gcgtagtagg    5160
tcaagactct gagactatcg aactcgcacc tgaatacgct gaggctatcg caacccgtgc    5220
aggtgcgctg gctggcatct ctccgatgtt ccaaccttgc gtagttcctc ctaagccgtg    5280
gactggcatt actggtggtg gctattgggc taacggtcgt cgtcctctgg cgctggtgcg    5340
tactcacagt aagaaagcac tgatgcgcta cgaagacgtt acatgcctg aggtgtacaa     5400 agcgattaac attgcgcaaa acaccgcatg gaaaatcaac aagaaagtcc tagcggtcgc    5460
caacgtaatc accaagtgga gcattgtcc ggtcgaggac atccctgcga ttgagcgtga     5520
agaactcccg atgaaaccgg aagacatcga catgaatcct gaggctctca ccgcgtggaa    5580
acgtgctgcc gctgctgtgt accgcaagga caaggctcgc aagtctcgcc gtatcagcct    5640
```

```
tgagttcatg cttgagcaag ccaataagtt tgctaaccat aaggccatct ggttcccttg     5700
caacatggac tggcgcggtc gtgtttacgc tgtgtcaatg ttcaacccgc aaggtaacga     5760
tatgaccaaa ggactgctta cgctggcgaa aggtaaacca atcggtaagg aaggttacta     5820
ctggctgaaa atccacggtg caaactgtgc gggtgtcgat aaggttccgt tccctgagcg     5880
catcaagttc attgaggaaa accacgagaa catcatggct tgcgctaagt ctccactgga     5940
gaacacttgg tgggctgagc aagattctcc gttctgcttc cttgcgttct gctttgagta     6000
cgctggggta cagcaccacg gcctgagcta taactgctcc cttccgctgg cgtttgacgg     6060
gtcttgctct ggcatccagc acttctccgc gatgctccga gatgaggtag gtggtcgcgc     6120
ggttaacttg cttcctagtg aaaccgttca ggacatctac gggattgttg ctaagaaagt     6180
caacgagatt ctacaagcag acgcaatcaa tgggaccgat aacgaagtag ttaccgtgac     6240
cgatgagaac actggtgaaa tctctgagaa agtcaagctg ggcactaagg cactggctgg     6300
tcaatggctg gctacggtg ttactcgcag tgtgactaag cgttcagtca tgacgctggc     6360
ttacgggtcc aaagagttcg gcttccgtca acaagtgctg gaagatacca ttcagccagc     6420
tattgattcc ggcaagggtc tgatgttcac tcagccgaat caggctgctg gatacatggc     6480
taagctgatt tgggaatctg tgagcgtgac ggtggtagct gcggttgaag caatgaactg     6540
gcttaagtct gctgctaagc tgctggctgc tgaggtcaaa gataagaaga ctggagagat     6600
tcttcgcaag cgttgcgctg tgcattgggt aactcctgat ggtttccctg tgtggcagga     6660
atacaagaag cctattcaga cgcgcttgaa cctgatgttc ctcggtcagt ccgcttaca      6720
gcctaccatt aacaccaaca agatagcga gattgatgca cacaaacagg agtctggtat     6780
cgctcctaac tttgtacaca gccaagacgg tagccacctt cgtaagactg tagtgtgggc     6840
acacgagaag tacggaatcg aatcttttgc actgattcac gactccttcg gtaccattcc     6900
ggctgacgct gcgaacctgt tcaaagcagt gcgcgaaact atggttgaca catatgagtc     6960
ttgtgatgta ctggctgatt tctacgacca gttcgctgac cagttgcacg agtctcaatt     7020
ggacaaaatg ccagcacttc cggctaaagg taacttgaac ctccgtgaca tcttagagtc     7080
ggacttcgcg ttcgcgtaag catgcaagct aattcggtgg aaacgaggtc atcatttcct     7140
tccgaaaaaa cggttgcatt taaatcttac atatgtaata ctttcaaaga ctacatttgt     7200
aagatttgat gtttgagtcg gctgaaagat cgtacgtacc aattattgtt tcgtgattgt     7260
tcaagccata acactgtagg gatagtggaa agagtgcttc atctggttac gatcaatcaa     7320
atattcaaac ggagggagac gattttgatg aaaccagtaa cgttatacga tgtcgcagag     7380
tatgccggtg tctcttatca gaccgtttcc cgcgtggtga accaggccag ccacgtttct     7440
gcgaaaacgc gggaaaaagt ggaagcggcg atggcggagc tgaattacat tcccaaccgc     7500
gtggcacaac aactggcggg caaacagtcg ttgctgattg gcgttgccac ctccagtctg     7560
gccctgcacg cgccgtcgca aattgtcgcg gcgattaaat ctcgcgccga tcaactgggt     7620
gccagcgtgg tggtgtcgat ggtagaacga agcggcgtcg aagcctgtaa aacggcggtg     7680
cacaatcttc tcgcgcaacg cgtcagtggg ctgatcatta actatccgct ggatgaccag     7740
gatgccattg ctgtggaagc tgcctgcact aatgttccgg cgttatttct tgatgtctct     7800
gaccagacac ccatcaacag tattattttc tcccatgaag acggtacgcg actgggcgtg     7860
gagcatctgg tcgcattggg tcaccagcaa atcgcgctgt tagcgggccc attaagttct     7920
gtctcggcgc gtctgcgtct ggctggctgg cataaatatc tcactcgcaa tcaaattcag     7980
```

-continued

```
ccgatagcgg aacgggaagg cgactggagt gccatgtccg gttttcaaca aaccatgcaa    8040
atgctgaatg agggcatcgt tcccactgcg atgctggttg ccaacgatca gatggcgctg    8100
ggcgcaatgc gcgccattac cgagtccggg ctgcgcgttg gtgcggatat ctcggtagtg    8160
ggatacgacg ataccgaaga cagctcatgt tatatcccgc cgttaaccac catcaaacag    8220
gattttcgcc tgctggggca aaccagcgtg gaccgcttgc tgcaactctc tcagggccag    8280
gcggtgaagg gcaatcagct gttgcccgtc tcactggtga aaagaaaaac caccctggcg    8340
cccaatacgc aaaccgcctc tccccgcgcg ttggccgatt cattaatgca gctggcacga    8400
caggtttccc gactggaaag cgggcagtga gcgcaacgca attaatgtga gttaggatcc    8460
tgagcgccgg tcgctaccat taccagttgg tctggtgtca aaataataa taaccgggca    8520 ggccatgtct gcccgtattt cgcgtaagga aatccattat gtactattta attctgcgtg    8580
acatcccatc gatcagacca gttttttaatt tgtgtgtttc catgtgtcca gtttggaata    8640
ctcttaacct cattggaaat cgcggcataa tcactggtgg tatgattgat gaccgcgtca    8700
acaatgacct ttatgccata ttcttcagcg gctgcacaca tttctttaaa ttcttgttca    8760
gtacctaagt aacggttgcc aatttgatac gatgtcggct gatacagcca gtaccagttc    8820
gacatgcttt tatctccttg attcccttcc tttacttggt taatcggaga tgtctgaatg    8880
gctgtatatc ctgcatcatg aatatccttc atattgtgtt ttaacgtatt gaacgaccaa    8940
ttccatgcat gaagaatggt tccgcttttg atcgacggtg ctgtaagctc attcgatttg    9000
ttcgccgttt cagcactcgc agccgccggt cctgccagaa ccaaatgaaa cagcaataaa    9060
aatccagcga ataacggcag taaagaggtt ttgaatcgtt ttgcaaacat tcttgacact    9120
ccttatttga ttttttgaag acttacttcg gagtcaaaaa tccctcttac ttcattcttc    9180
cgcttcctcc tttcaaaccg atgtgaagac tggagaattt tgttaacgct tacatttaaa    9240
attatcacaa tcactctatc aaaacaactt ggcagagtga atacaaatca atgttcctat    9300
aaaaaaagct gcccgaaact gtgaacgctt ccctcgcttt ccaaacaaaa aagatgattt    9360
cttttttatt tcttctttta ccgctcttct gtaagccagc ttcacaatca cataccgaag    9420
cagaaacaga acgccgccgc agacgataaa aagaagaatc attttcagcc aagcgaagaa    9480
tgtatgggga atccccctgt cgtacatcgt aagcaccact accgcaaagg cgaccgcaat    9540
tgattctatt cgctgctgct tcacccgttt ttgcagttct tctttggtgt ctattctcgg    9600
catgagcatt ccggatgccg cagccctgat gcagtaatat aagataatga tgaacaaaaa    9660
cacaaggctt gcagcccatt ctttaaacgg aaattcaaac ataatgccgc ggatgatcac    9720
atcaagcagc gcaaatgctc ccgctatcat cccaatctcc gaccagattt tttgttcttt    9780 ttctttttact ctcttatttt tcccattcac gcctgaaagt ctattacgca gattattcat    9840
gaccttcctc ccgcacttttt acgaatggct tatggcttac atgttacaat aacagcctgc    9900
gcttctgcaa tgaataactc aaaagcccgc cgtacaagcc ggcgggcagc aatcgttaaa    9960
acggccccca attgatcatg actccgatca cgataaagac aagcccgatc aagaaccaaa   10020
tcagagcaag cggcaccata aaccgcagcc acttgacata cggaataccg ctggcggcaa   10080
gcaccgccat gagaacgccg gatgtcgggt tcacacagtt gacgacccct tctccaagca   10140
taaccgcttc aaccgcaacc tgtctcgtga ttcccatcaa atcagcgagc ggcgccagga   10200
ttggaataaa tacaacggct tcgcagaaac ctgaagagat gagaaaatga agcagcgcac   10260
tggcgatata catgccgatt gccccagcaa tcgggctgaa tccatccaaa agtgaagcca   10320
aagcattgac gacagtatcg agaagctttc cattttcaag gataacggaa atgcttcgtg   10380
```

| | | |
|---|---|---|
| ccatcccgac aatcagcgcc ccgtatacaa gactttggca gcccgtaatg aaggttttgg | | 10440 |
| caatatcgtt cgccgcaagc ccgcctatta aaccggcaag gacagaaata aaaataaatg | | 10500 |
| tcgcagccat ttgggaatct gaccagccaa gcttcaaagc gccgtataaa atccgacaa | | 10560 |
| gtgagagtcc cgccacagcc aaaatcagct tatggcgaac ggtaaacggc actgactgat | | 10620 |
| cttcttcttt accggcttcg c | | 10641 |

<210> SEQ ID NO 7
<211> LENGTH: 4501
<212> TYPE: DNA
<213> ORGANISM: Artificial Sequence
<220> FEATURE:
<223> OTHER INFORMATION: ARTIFICIAL VECTOR WITHOUT SFGFP

<400> SEQUENCE: 7

| | | |
|---|---|---|
| taatacgact cactataggg gaattgtgag cggataacaa ttcccctcta gaagctgtca | | 60 |
| ccggatgtgc tttccggtct gatgagtccg tgaggacgaa acagcctcta caaataattt | | 120 |
| tgtttaaaag cttacataag gaggaactac tatgtaacca ggcatcaaat aaaacgaaag | | 180 |
| gctcagtcga aagactgggc ctttcgtttt atctgttgtt tgtcggtgaa cgctctctac | | 240 |
| tagagtcaca ctggctcacc ttcgggtggg cctttctgcg tttatacgtt tcggtgatga | | 300 |
| agatcttccc gatgattaat taattcagaa cgctcggttg ccgccgggcg ttttttatgc | | 360 |
| agcaatggca agaacgttgc tcgagggtaa atgtgagcac tcacaattca ttttgcaaaa | | 420 |
| gttgttgact ttatctacaa ggtgtggcat aatgtgtgta attgtgagcg ataacaatt | | 480 |
| aagcttagtc gacagctagc ataaggag gaactactat gaacacgatt aacatcgcta | | 540 |
| agaacgactt ctctgacatc gaactggctg ctatcccgtt caacactctg gctgaccatt | | 600 |
| acggtgagcg tttagctcgc gaacagttgg cccttgagca tgagtcttac gagatgggtg | | 660 |
| aagcacgctt ccgcaagatg tttgagcgtc aacttaaagc tggtgaggtt gcggataacg | | 720 |
| ctgccgccaa gcctctcatc actaccctac tccctaagat gattgcacgc atcaacgact | | 780 |
| ggtttgagga agtgaaagct aagcgcggca agcccgac agccttccag ttcctgcaag | | 840 |
| aaaatcaagcc ggaagccgta gcgtacatca ccattaagac cactctggct tgcctaacca | | 900 |
| gtgctgacaa tacaaccgtt caggctgtag caagcgcaat cggtcgggcc attgaggacg | | 960 |
| aggctcgctt cggtcgtatc cgtgaccttg aagctaagca cttcaagaaa acgttgagg | | 1020 |
| aacaactcaa caagcgcgta gggcacgtct acaagaaagc atttatgcaa gttgtcgagg | | 1080 |
| ctgacatgct ctctaagggt ctactcggtg gcgaggcgtg gtcttcgtgg cataaggaag | | 1140 |
| actctattca tgtaggagta cgctgcatcg agatgctcat tgagtcaacc ggaatggtta | | 1200 |
| gcttacaccg ccaaaatgct ggcgtagtag gtcaagactc tgagactatc gaactcgcac | | 1260 |
| ctgaatacgc tgaggctatc gcaacccgtg caggtgcgct ggctggcatc tctccgatgt | | 1320 |
| tccaaccttg cgtagttcct cctaagccgt ggactgcat tactggtggt ggctattggg | | 1380 |
| ctaacggtcg tcgtcctctg gcgctggtgc gtactcacag taagaaagca ctgatgcgct | | 1440 |
| acgaagacgt ttacatgcct gaggtgtaca aagcgattaa cattgcgcaa acaccgcat | | 1500 |
| ggaaaatcaa caagaaagtc ctagcggtcg ccaacgtaat caccaagtgg aagcattgtc | | 1560 |
| cggtcgagga catccctgcg attgagcgtg aagaactccc gatgaaaccg gaagacatcg | | 1620 |
| acatgaatcc tgaggctctc accgcgtgga aacgtgctgc cgctgctgtg taccgcaagg | | 1680 |
| acaaggctcg caagtctcgc cgtatcagcc ttgagttcat gcttgagcaa gccaataagt | | 1740 |

```
ttgctaacca taaggccatc tggttccctt acaacatgga ctggcgcggt cgtgtttacg    1800
ctgtgtcaat gttcaacccg caaggtaacg atatgaccaa aggactgctt acgctggcga    1860
aaggtaaacc aatcggtaag gaaggttact actggctgaa atccacggt gcaaactgtg     1920 cgggtgtcga taaggttccg ttccctgagc gcatcaagtt cattgaggaa accacgaga     1980 acatcatggc ttgcgctaag tctccactgg agaacacttg gtgggctgag caagattctc    2040
cgttctgctt ccttgcgttc tgctttgagt acgctgggt acagcaccac ggcctgagct     2100
ataactgctc ccttccgctg cgtttgacg ggtcttgctc tggcatccag cacttctccg     2160
cgatgctccg agatgaggta ggtggtcgcg cggttaactt gcttcctagt gaaaccgttc    2220
aggacatcta cgggattgtt gctaagaaag tcaacgagat tctacaagca gacgcaatca    2280
atgggaccga taacgaagta gttaccgtga ccgatgagaa cactggtgaa atctctgaga    2340
aagtcaagct gggcactaag gcactggctg gtcaatggct ggcttacggt gttactcgca    2400
gtgtgactaa gcgttcagtc atgacgctgg cttacgggtc caaagagttc ggcttccgtc    2460
aacaagtgct ggaagatacc attcagccag ctattgattc cggcaagggt ctgatgttca    2520
ctcagccgaa tcaggctgct ggatacatgg ctaagctgat ttgggaatct gtgagcgtga    2580
cggtggtagc tgcggttgaa gcaatgaact ggcttaagtc tgctgctaag ctgctggctg    2640
ctgaggtcaa agataagaag actggagaga ttcttcgcaa cgttgcgct gtgcattggg     2700 taactcctga tggttccct gtgtggcagg aatacaagaa gcctattcag acgcgcttga     2760
acctgatgtt cctcggtcag ttccgcttac agcctaccat taacaccaac aaagatagcg    2820
agattgatgc acacaaacag gagtctggta tcgctcctaa ctttgtacac agccaagacg    2880
gtagccacct tcgtaagact gtagtgtggg cacacgagaa gtacggaatc gaatcttttg    2940
cactgattca cgactccttc ggtaccattc cggctgacgc tgcgaacctg ttcaaagcag    3000
tgcgcgaaac tatggttgac acatatgagt cttgtgatgt actggctgat ttctacgacc    3060
agttcgctga ccagttgcac gagtctcaat tggacaaaat gccagcactt ccggctaaag    3120
gtaacttgaa cctccgtgac atcttagagt cggacttcgc gttcgcgtaa gcatgcaagc    3180
taattcggtg gaaacgaggt catcatttcc ttccgaaaaa acggttgcat ttaaatctta    3240
catatgtaat actttcaaag actacatttg taagatttga tgtttgagtc ggctgaaaga    3300
tcgtacgtac caattattgt ttcgtgattg ttcaagccat aacactgtag ggatagtgga    3360
aagagtgctt catctggtta cgatcaatca atatattcaaa cggagggaga cgattttgat    3420
gaaaccagta acgttatacg atgtcgcaga gtatgccggt gtctcttatc agaccgtttc    3480
ccgcgtggtg aaccaggcca gccacgtttc tgcgaaaacg cgggaaaaag tggaagcggc    3540
gatggcggag ctgaattaca ttcccaaccg cgtggcacaa caactggcgg gcaaacagtc    3600
gttgctgatt ggcgttgcca cctccagtct ggccctgcac gcgccgtcgc aaattgtcgc    3660
ggcgattaaa tctcgcgccg atcaactggg tgccagcgtg gtggtgtcga tggtagaacg    3720
aagcggcgtc gaagcctgta aaacggcggt gcacaatctt ctcgcgcaac gcgtcagtgg    3780
gctgatcatt aactatccgc tggatgacca ggatgccatt gctgtggaag ctgcctgcac    3840
taatgttccg gcgttatttc ttgatgtctc tgaccagaca cccatcaaca gtattatttt    3900
ctcccatgaa gacggtacgc gactgggcgt ggagcatctg gtcgcattgg gtcaccagca    3960
aatcgcgctg ttagcgggcc cattaagttc tgtctcggcg cgtctgcgtc tggctggctg    4020
gcataaatat ctcactcgca atcaaattca gccgatagcg gaacgggaag gcgactggag    4080
tgccatgtcc ggttttcaac aaaccatgca aatgctgaat gagggcatcg ttcccactgc    4140
```

```
gatgctggtt gccaacgatc agatggcgct gggcgcaatg cgcgccatta ccgagtccgg    4200
gctgcgcgtt ggtgcggata tctcggtagt gggatacgac gataccgaag acagctcatg    4260
ttatatcccg ccgttaacca ccatcaaaca ggattttcgc ctgctggggc aaaccagcgt    4320
ggaccgcttg ctgcaactct ctcagggcca ggcggtgaag gcaatcagc tgttgcccgt     4380 ctcactggtg aaaagaaaaa ccaccctggc gcccaatacg caaaccgcct ctccccgcgc    4440
gttggccgat tcattaatgc agctggcacg acaggtttcc cgactggaaa gcgggcagtg    4500
a                                                                    4501
```

<210> SEQ ID NO 8
<211> LENGTH: 5212
<212> TYPE: DNA
<213> ORGANISM: Artificial Sequence
<220> FEATURE:
<223> OTHER INFORMATION: Variant LacI-T7-sfgfp

<400> SEQUENCE: 8

```
taatacgact cactataggg gaattgtgag cggataacaa ttcccctcta gaagctgtca     60
ccggatgtgc tttccggtct gatgagtccg tgaggacgaa acagcctcta caaataattt    120
tgtttaaaag cttacataag gaggaactac tatgagaaaa ggagaagaat tatttacagg    180
agttgttcca atttagtgg aactggatgg tgatgtcaac ggtcataagt tttccgtgcg    240
tggcgagggt gaaggtgacg caactaatgg taaactgacg ctgaagttca tctgtactac    300
tggtaaactg ccggtacctt ggccgactct ggtaacgacg ctgacttatg gtgttcagtg    360 cttttgctcgt tatccggacc atatgaagca gcatgacttc ttcaagtccg ccatgccgga    420
aggctatgtg caggaacgca cgatttcctt taaggatgac ggcacgtaca aaacgcgtgc    480
ggaagtgaaa tttgaaggcg ataccctggt aaaccgcatt gagctgaaag gcattgactt    540
taaagaagac ggcaatatcc tgggccataa gctggaatac aattttaaca gccacaatgt    600
ttacatcacc gccgataaac aaaaaaatgg cattaaagcg aattttaaaa ttcgccacaa    660
cgtggaggat ggcagcgtgc agctggctga tcactaccag caaaacactc caatcggtga    720
tggtcctgtt ctgctgccag acaatcacta tctgagcacg caaagcgttc tgtctaaaga    780
tccgaacgag aaacgcgatc atatggttct gctggagttc gtaaccgcag cgggcatcac    840
gcatggtatg gatgaactgt acaaataacc aggcatcaaa taaaacgaaa ggctcagtcg    900
aaagactggg cctttcgttt tatctgttgt ttgtcggtga acgctctcta ctagagtcac    960
actggctcac cttcgggtgg gcctttctgc gtttatacgt ttcggtgatg aagatcttcc   1020
cgatgattaa ttaattcaga acgctcggtt gccgccgggc gttttttatg cagcaatggc   1080
aagaacgttg ctcagggta atgtgagca ctcacaattc attttgcaaa agttgttgac   1140
tttatctaca aggtgtggca taatgtgtgt aattgtgagc ggataacaat taagcttagt   1200
cgacagctag cacataagga ggaactacta tgaacgat taacatcgct aagaacgact   1260
tctctgacat cgaactggct gctatcccgt tcaacactct ggctgaccat tacggtgagc   1320
gtttagctcg cgaacagttg gcccttgagc atgagtctta cgagatgggt gaagcacgct   1380
tccgcaagat gtttgagcgt caacttaaag ctggtgaggt tgcggataac gctgccgcca   1440
agcctctcat cactacccta ctccctaaga tgattgcacg catcaacgac tggtttgagg   1500
aagtgaaagc taagcgcggc aagcgcccga cagccttcca gttcctgcaa gaaatcaagc   1560
cggaagccgt agcgtacatc accattaaga ccactctggc ttgcctaacc agtgctgaca   1620
```

-continued

```
atacaaccgt tcaggctgta gcaagcgcaa tcggtcgggc cattgaggac gaggctcgct    1680
tcggtcgtat ccgtgacctt gaagctaagc acttcaagaa aaacgttgag gaacaactca    1740
acaagcgcgt agggcacgtc tacaagaaag catttatgca agttgtcgag gctgacatgc    1800
tctctaaggg tctactcggt ggcgaggcgt ggtcttcgtg gcataaggaa gactctattc    1860
atgtaggagt acgctgcatc gagatgctca ttgagtcaac cggaatggtt agcttacacc    1920
gccaaaatgc tggcgtagta ggtcaagact ctgagactat cgaactcgca cctgaatacg    1980
ctgaggctat cgcaacccgt gcaggtgcgc tggctggcat ctctccgatg ttccaacctt    2040
gcgtagttcc tcctaagccg tggactggca ttactggtgg tggctattgg gctaacggtc    2100
gtcgtcctct ggcgctggtg cgtactcaca gtaagaaagc actgatgcgc tacgaagacg    2160
tttacatgcc tgaggtgtac aaagcgatta acattgcgca aaacaccgca tggaaaatca    2220
acaagaaagt cctagcggtc gccaacgtaa tcaccaagtg gaagcattgt ccggtcgagg    2280
acatccctgc gattgagcgt gaagaactcc cgatgaaacc ggaagacatc gacatgaatc    2340
ctgaggctct caccgcgtgg aaacgtgctg ccgctgctgt gtaccgcaag gacaaggctc    2400
gcaagtctcg ccgtatcagc cttgagttca tgcttgagca agccaataag tttgctaacc    2460
ataaggccat ctggttccct tacaacatgg actggcgcgg tcgtgtttac gctgtgtcaa    2520
tgttcaaccc gcaaggtaac gatatgacca aaggactgct tacgctggcg aaaggtaaac    2580
caatcggtaa ggaaggttac tactggctga aaatccacgg tgcaaactgt gcgggtgtcg    2640
ataaggttcc gttccctgag cgcatcaagt tcattgagga aaaccacgag aacatcatgg    2700
cttgcgctaa gtctccactg gagaacactt ggtgggctga gcaagattct ccgttctgct    2760
tccttgcgtt ctgctttgag tacgctgggg tacagcacca cggcctgagc tataactgct    2820
cccttccgct ggcgtttgac gggtcttgct ctggcatcca gcacttctcc gcgatgctcc    2880
gagatgaggt aggtggtcgc gcggttaact tgcttcctag tgaaaccgtt caggacatct    2940 acggattgt tgctaagaaa gtcaacgaga ttctacaagc agacgcaatc aatgggaccg    3000
ataacgaagt agttaccgtg accgatgaga acactggtga atctctgag aaagtcaagc    3060 tgggcactaa ggcactggct ggtcaatggc tggcttacgg tgttactcgc agtgtgacta    3120
agcgttcagt catgacgctg gcttacgggt ccaaagagtt cggcttccgt caacaagtgc    3180
tggaagatac cattcagcca gctattgatt ccggcaaggg tctgatgttc actcagccga    3240
atcaggctgc tggatacatg ctaagctga tttgggaatc tgtgagcgtg acggtggtag    3300
ctgcggttga agcaatgaac tggcttaagt ctgctgctaa gctgctggct gctgaggtca    3360
aagataagaa gactggagag attcttcgca agcgttgcgc tgtgcattgg gtaactcctg    3420
atggtttccc tgtgtggcag gaatacaaga agcctattca gacgcgcttg aacctgatgt    3480
tcctcggtca gttccgctta cagcctacca ttaacaccaa caaagatagc gagattgatg    3540
cacacaaaca ggagtctggt atcgctccta actttgtaca cagccaagac ggtagccacc    3600
ttcgtaagac tgtagtgtgg gcacacgaga agtacgaat cgaatctttt gcactgattc    3660
acgactcctt cggtaccatt ccggctgacg ctgcgaacct gttcaaagca gtgcgcgaaa    3720
ctatggttga cacatatgag tcttgtgatg tactggctga tttctacgac cagttcgctg    3780
accagttgca cgagtctcaa ttggacaaaa tgccagcact tccggctaaa ggtaacttga    3840
acctccgtga catcttagag tcggacttcg cgttcgcgta agcatgcaag ctaattcggt    3900
ggaaacgagg tcatcatttc cttccgaaaa aacggttgca tttaaatctt acatatgtaa    3960
tactttcaaa gactacattt gtaagatttg atgtttgagt cggctgaaag atcgtacgta    4020
```

```
ccaattattg tttcgtgatt gttcaagcca taacactgta gggatagtgg aaagagtgct    4080
tcatctggtt acgatcaatc aaatattcaa acggagggag acgattttga tgaaaccagt    4140
aacgttatac gatgtcgcag agtatgccgg tgtctcttat cagaccgttt cccgcgtggt    4200
gaaccaggcc agccacgttt ctgcgaaaac gcgggaaaaa gtggaagcgg cgatggcgga    4260
gctgaattac attcccaacc gcgtggcaca acaactggcg gcaaacagtc gttgctgat     4320 tggcgttgcc acctccagtc tggccctgca cgcgccgtcg caaattgtcg cggcgattaa    4380
atctcgcgcc gatcaactgg gtgccagcgt ggtggtgtcg atggtagaac gaagcggcgt    4440
cgaagcctgt aaaacggcgg tgcacaatct tctcgcgcaa cgcgtcagtg ggctgatcat    4500
taactatccg ctggatgacc aggatgccat tgctgtggaa gctgcctgca ctaatgttcc    4560
ggcgttattt cttgatgtct ctgaccagac acccatcaac agtattattt ctcccatga     4620 agacggtacg cgactgggcg tggagcatct ggtcgcattg ggtcaccagc aaatcgcgct    4680
gttagcgggc ccattaagtt ctgtctcggc gcgtctgcgt ctggctggct ggcataaata    4740
tctcactcgc aatcaaattc agccgatagc ggaacgggaa ggcgactgga gtgccatgtc    4800
cggttttcaa caaaccatgc aaatgctgaa tgagggcatc gttcccactg cgatgctggt    4860
tgccaacgat cagatggcgc tgggcgcaat gcgcgccatt accgagtccg ggctgcgcgt    4920
tggtgcggat atctcggtag tgggatacga cgataccgaa gacagctcat gttatatccc    4980
gccgttaacc accatcaaac aggattttcg cctgctgggg caaaccagcg tggaccgctt    5040
gctgcaactc tctcagggcc aggcggtgaa gggcaatcag ctgttgcccg tctcactggt    5100
gaaaagaaaa accaccctgg cgcccaatac gcaaaccgcc tctccccgcg cgttggccga    5160
ttcattaatg cagctggcac gacaggtttc ccgactggaa agcgggcagt ga            5212

<210> SEQ ID NO 9
<211> LENGTH: 10701
<212> TYPE: DNA
<213> ORGANISM: Artificial Sequence
<220> FEATURE:
<223> OTHER INFORMATION: Compete Vector with sfGFP Variant

<400> SEQUENCE: 9
gttcagctca gtgatacctg cgatccctcc gcgattcacg acagccggca caccgatgta      60
cacgtcatct gcaccgtatt gcccgtccaa atatgtgctg acagttaata tgctgttttc     120
attatgaaga atggcttttg taatgcgagc aagactcatc gcaacccat aataagtcgc      180 gccttttttc tcaatgatat ggtaagctgc gttttcaca tcatctacaa tttggtccag      240
ctcctcttgt ttgtacgcat cgttttttctc aacgagttca ctgaccggca caccgccgac    300 attgcgtgg ctccaaacag gaagctctgt gtcgccgtgc tctccgataa tatgcgcgtg      360
tacgttttga ggcgctgcgc caaagtattc gctcagcatg aaacggaatc tcgcagaatc     420
aagtgttgtg ccgcttccaa tcacccgctc ttttggcagg ccgctgaatt ccatgttgc      480 gtaagtcagg atatcaaccg gatttgtcgc gactaagaaa atgccgtcaa atccgctcgc     540
catgacttca ctaacgatgc ctttgaaaat cttcaagttc ttttctacta attcaaggcg     600
tgtctcacca ggttttggt ttgctccggc gcaaatgcag acaatatcag catccttgca      660
gtcttcatat gttccgtaag atgttttgac cggttgtggc gcaaacgcct ttccgtggtt     720
taaatccatc acatcgccca ttgctttttc tttatttaca tcaatgacca caagctcatc    780
tgtgattcct tggttaatta acgcaaatgc ataactgctt ccaacaaaac ccgctccgat    840
```

```
taaagctact ttatttacat gtttgttcat cattaatcat ccttccaggg tatgtttctc    900
tttgatgtct ttttgtttgt gaagtatttc acatttatat tgtgcaacac ttcacaaact    960
tttgcaagag aaaagttttg tctgatttat gaacaaaaaa gaaaccatca ttgatggttt   1020
ctttcggtaa gtcccgtcta gccttgccct caatggggaa gagaaccgct taagcccgag   1080
tcattatata aaccatttag cacgtaatca aagccaggct gattctgacc gggcacttgg   1140
gcgctgccat tattaaaaat cacttttgcg ttggttgtat ccgtgtccgc aggcagcgtc   1200
agcgtgtaaa ttccgtctgc attttagtc attggttttc caggccaaga tccggtcaat   1260
tcaattactc ggctcccatc atgtttatag atataagcat ttacctggct ccaatgattc   1320
ggattttgat agccgatggt tttggccgac gctggatctc ttttaacaaa actgtatttc   1380
tcggtcctcg ttacaccatc actgttcgtt cctttaaca tgatggtgta tgttttgcca   1440
aatggatctc cttttccgat tgtgaattga tctccatcct taaacgccgt ctctggtcca   1500
ttattgattt gataaacggc ttttgttgta ttcgcatctg cacgcaaggt aatcgtcagt   1560
tgatcattga aagaatgtgt tacacctgtt ttgtaattct caaggaaaac atgaggcgct   1620
tttgcaatat catcaggata aagcacagct acagacctgg cattgatcgt gcctgtcagt   1680
ttaccatcgt tcacttgaaa tgaacccgct ccagctttat tgtcatacct gccatcaggc   1740
aattttgttg ccgtattgat agagacagag gatgaacctg catttgccag cacaacgcca   1800
tgtgagccgc gctgattcat aaatatctgg ttgtttccat tcgggttcga gagttcctca   1860
ggctgtccag ccatcacatt gtgaaatcta ttgaccgcag tgatagcctg atcttcaaat   1920
aaagcactcc cgcgatcgcc tatttggctt ttccccggga acctcacacc atttccgcct   1980
ccctcaggtc tggaaaagaa aagaggcgta ctgcctgaac gagaagctat caccgcccag   2040
cctaaacgga tatcatcatc gctcatccat gtcgagatcc ccctatgcaa gggtttattg   2100
ttttctaaaa tctgattacc aattagaatg aatatttccc aaatattaaa taataaaaca   2160
aaaaaattga aaaagtgtt tccaccatt ttttcaatttt tttataattt ttttaatctg   2220
ttatttaaat agtttatagt taaatttaca ttttcattag tccattcaat attctctcca   2280
agataactac gaactgctaa caaaattctc tccctatgtt ctaatggaga agattcagcc   2340
actgcatttc ccgcaatatc ttttggtatg attttacccg tgtccatagt taaaatcata   2400
cggcataaag ttaatataga gttggtttca tcatcctgat aattatctat taattcctct   2460
gacgaatcca taatggctct tctcacatca gaaaatggaa tatcaggtag taattcctct   2520
aagtcataat ttccgtatat tcttttatt tttcgttttg cttggtaaag cattatggtt   2580
aaatctgaat ttaattcctt ctgaggaatg tatccttgtt cataaagctc ttgtaaccat   2640
tctccataaa taaattcttg tttgggagga tgattccacg gtaccatttc ttgctgaata   2700
ataattgtta attcaatata tcgtaagttg ctttattctc ctattttttt tgaaataggt   2760
ctaattttt gtataagtat ttcttttactt tgatctgtca atggttcaga tacgacgact   2820
aaaaagtcaa gatcactatt tggttttagt ccactctcaa ctcctgatcc aaacatgtaa   2880
gtaccaataa ggttattttt taaatgtttc cgaagtattt ttttcacttt attaatttgt   2940
tcgtatgtat tcaaatatat cctcctcact attttgatta gtaccatttt tatatccata   3000
gttgttaatt aaataaactt aatttagttt atttatagat ttcattggct tctaaatttt   3060
ttatctagat aataattatt ttagttaatt ttattctaga ttatatatga tatgatcttt   3120
catttccata aaactaaagt aagtgtaaac ctattcattg ttttaaaaat atctcttgcc   3180
agtcacgtta cgttattagt tatagttatt ataacatgta ttcacgaacg aaaatcgcca   3240
```

```
ttcgccagct gcaggtaaag atctcgatcc cgcgaaatta atacgactca ctatagggga    3300
attgtgagcg gataacaatt cccctctaga agctgtcacc ggatgtgctt ccggtctga     3360 tgagtccgtg aggacgaaac agcctctaca ataatttttg tttaaaagct tacataagga    3420
ggaactacta tgagaaaagg agaagaatta tttacaggag ttgttccaat tttagtggaa    3480
ctggatggtg atgtcaacgg tcataagttt tccgtgcgtg gcgagggtga aggtgacgca    3540
actaatggta aactgacgct gaagttcatc tgtactactg gtaaactgcc ggtaccttgg    3600
ccgactctgg taacgacgct gacttatggt gttcagtgct tgctcgtta tccggaccat     3660 atgaagcagc atgacttctt caagtccgcc atgccggaag ctatgtgca ggaacgcacg     3720 atttccttta aggatgacgg cacgtacaaa acgcgtgcgg aagtgaaatt tgaaggcgat    3780
accctggtaa accgcattga gctgaaaggc attgacttta aagaagacgg caatatcctg    3840
ggccataagc tggaatacaa ttttaacagc cacaatgttt acatcaccgc cgataaacaa    3900
aaaaatggca ttaaagcgaa ttttaaaatt cgccacaacg tggaggatgg cagcgtgcag    3960
ctggctgatc actaccagca aaacactcca atcggtgatg gtcctgttct gctgccagac    4020
aatcactatc tgagcacgca aagcgttctg tctaaagatc cgaacgagaa acgcgatcat    4080
atggttctgc tggagttcgt aaccgcagcg ggcatcacgc atggtatgga tgaactgtac    4140
aaataaccag gcatcaaata aaacgaaagg ctcagtcgaa agactgggcc tttcgtttta    4200
tctgttgttt gtcggtgaac gctctctact agagtcacac tggctcacct tcgggtgggc    4260
ctttctgcgt ttatacgttt cggtgatgaa gatcttcccg atgattaatt aattcagaac    4320
gctcggttgc cgccgggcgt tttttatgca gcaatggcaa gaacgttgct cgagggtaaa    4380
tgtgagcact cacaattcat tttgcaaaag ttgttgactt tatctacaag gtgtggcata    4440
atgtgtgtaa ttgtgagcgg ataacaatta agcttagtcg acagctagca cataaggagg    4500
aactactatg aacacgatta acatcgctaa gaacgacttc tctgacatcg aactggctgc    4560
tatcccgttc aacactctgg ctgaccatta cggtgagcgt ttagctcgcg aacagttggc    4620
ccttgagcat gagtcttacg agatgggtga agcacgcttc cgcaagatgt ttgagcgtca    4680
acttaaagct ggtgaggttg cggataacgc tgccgccaag cctctcatca ctaccctact    4740
ccctaagatg attgcacgca tcaacgactg gtttgaggaa gtgaaagcta agcgcggcaa    4800
gcgcccgaca gccttccagt tcctgcaaga atcaagccg gaagccgtag cgtacatcac     4860
cattaagacc actctggctt gcctaaccag tgctgacaat acaaccgttc aggctgtagc    4920
aagcgcaatc ggtcgggcca ttgaggacga ggctcgcttc ggtcgtatcc gtgaccttga    4980
agctaagcac ttcaagaaaa acgttgagga acaactcaac aagcgcgtag ggcacgtcta    5040
caagaaagca tttatgcaag ttgtcgaggc tgacatgctc tctaagggtc tactcggtgg    5100
cgaggcgtgg tcttcgtggc ataaggaaga ctctattcat gtaggagtac gctgcatcga    5160
gatgctcatt gagtcaaccg gaatggttag cttacaccgc caaatgctg gcgtagtagg     5220 tcaagactct gagactatcg aactcgcacc tgaatacgct gaggctatcg caacccgtgc    5280
aggtgcgctg gctggcatct ctccgatgtt ccaaccttgc gtagttcctc ctaagccgtg    5340
gactggcatt actggtggtg gctattgggc taacggtcgt cgtcctctgg cgctggtgcg    5400
tactcacagt aagaaagcac tgatgcgcta cgaagacgtt tacatgcctg aggtgtacaa    5460
agcgattaac attgcgcaaa acaccgcatg gaaaatcaac aagaaagtcc tagcggtcgc    5520
caacgtaatc accaagtgga agcattgtcc ggtcgaggac atccctgcga ttgagcgtga    5580
```

-continued

```
agaactcccg atgaaaccgg aagacatcga catgaatcct gaggctctca ccgcgtggaa    5640
acgtgctgcc gctgctgtgt accgcaagga caaggctcgc aagtctcgcc gtatcagcct    5700
tgagttcatg cttgagcaag ccaataagtt tgctaaccat aaggccatct ggttcccttg    5760
caacatggac tggcgcggtc gtgtttacgc tgtgtcaatg ttcaacccgc aaggtaacga    5820
tatgaccaaa ggactgctta cgctggcgaa aggtaaacca atcggtaagg aaggttacta    5880
ctggctgaaa atccacggtg caaactgtgc gggtgtcgat aaggttccgt tccctgagcg    5940
catcaagttc attgaggaaa accacgagaa catcatggct tgcgctaagt ctccactgga    6000
gaacacttgg tgggctgagc aagattctcc gttctgcttc cttgcgttct gctttgagta    6060
cgctggggta cagcaccacg gcctgagcta taactgctcc cttccgctgg cgtttgacgg    6120
gtcttgctct ggcatccagc acttctccgc gatgctccga gatgaggtag gtggtcgcgc    6180
ggttaacttg cttcctagtg aaaccgttca ggacatctac gggattgttg ctaagaaagt    6240
caacgagatt ctacaagcag acgcaatcaa tgggaccgat aacgaagtag ttaccgtgac    6300
cgatgagaac actggtgaaa tctctgagaa agtcaagctg ggcactaagg cactggctgg    6360
tcaatggctg gcttacggtg ttactcgcag tgtgactaag cgttcagtca tgacgctggc    6420
ttacgggtcc aaagagttcg gcttccgtca acaagtgctg gaagatacca ttcagccagc    6480
tattgattcc ggcaagggtc tgatgttcac tcagccgaat caggctgctg gatacatggc    6540
taagctgatt tgggaatctg tgagcgtgac ggtggtagct gcggttgaag caatgaactg    6600
gcttaagtct gctgctaagc tgctggctgc tgaggtcaaa gataagaaga ctggagagat    6660
tcttcgcaag cgttgcgctg tgcattgggt aactcctgat ggtttccctg tgtggcagga    6720
atacaagaag cctattcaga cgcgcttgaa cctgatgttc ctcggtcagt tccgcttaca    6780
gcctaccatt aacaccaaca agatagcga gattgatgca cacaaacagg agtctggtat    6840
cgctcctaac tttgtacaca gccaagacgg tagccacctt cgtaagactg tagtgtgggc    6900
acacgagaag tacggaatcg aatcttttgc actgattcac gactccttcg gtaccattcc    6960
ggctgacgct gcgaacctgt tcaaagcagt gcgcgaaact atggttgaca catatgagtc    7020
ttgtgatgta ctggctgatt tctacgacca gttcgctgac cagttgcacg agtctcaatt    7080
ggacaaaatg ccagcacttc cggctaaagg taacttgaac ctccgtgaca tcttagagtc    7140
ggacttcgcg ttcgcgtaag catgcaagct aattcggtgg aaacgaggtc atcatttcct    7200
tccgaaaaaa cggttgcatt taaatcttac atatgtaata ctttcaaaga ctacatttgt    7260
aagatttgat gtttgagtcg gctgaaagat cgtacgtacc aattattgtt tcgtgattgt    7320 tcaagcccata acactgtagg gatagtggaa agagtgcttc atctggttac gatcaatcaa    7380
atattcaaac ggagggagac gatttttgatg aaaccagtaa cgttatacga tgtcgcagag    7440
tatgccggtg tctcttatca gaccgtttcc cgcgtggtga accaggccag ccacgtttct    7500 gcgaaacgc gggaaaaagt ggaagcggcg atggcggagc tgaattacat tcccaaccgc    7560
gtggcacaac aactggcggg caaacagtcg ttgctgattg gcgttgccac ctccagtctg    7620
gccctgcacg cgccgtcgca aattgtcgcg gcgattaaat ctcgcgccga tcaactgggt    7680
gccagcgtgg tggtgtcgat ggtagaacga agcggcgtcg aagcctgtaa acgcggtg    7740 cacaatcttc tcgcgcaacg cgtcagtggg ctgatcatta actatccgct ggatgaccag    7800
gatgccattg ctgtggaagc tgcctgcact aatgttccgg cgttatttct tgatgtctct    7860
gaccagacac ccatcaacag tattattttc tcccatgaag acggtacgcg actgggcgtg    7920
gagcatctgg tcgcattggg tcaccagcaa atcgcgctgt tagcgggccc attaagttct    7980
```

```
gtctcggcgc gtctgcgtct ggctggctgg cataaatatc tcactcgcaa tcaaattcag   8040
ccgatagcgg aacgggaagg cgactggagt gccatgtccg gttttcaaca aaccatgcaa   8100
atgctgaatg agggcatcgt tcccactgcg atgctggttg ccaacgatca gatggcgctg   8160
ggcgcaatgc gcgccattac cgagtccggg ctgcgcgttg tgcggatat  ctcggtagtg   8220 ggatacgacg ataccgaaga cagctcatgt tatatcccgc cgttaaccac catcaaacag   8280
gattttcgcc tgctggggca aaccagcgtg gaccgcttgc tgcaactctc tcagggccag   8340
gcggtgaagg gcaatcagct gttgcccgtc tcactggtga aagaaaaac  caccctggcg   8400 cccaatacgc aaaccgcctc tccccgcgcg ttggccgatt cattaatgca gctggcacga   8460
caggtttccc gactggaaag cgggcagtga gcgcaacgca attaatgtga gttaggatcc   8520
tgagcgccgt cgctaccat  taccagttgg tctggtgtca aaaataataa taaccgggca   8580
ggccatgtct gcccgtattt cgcgtaagga aatccattat gtactattta attctgcgtg   8640
acatcccatc gatcagacca gttttaatt  tgtgtgtttc catgtgtcca gtttggaata   8700
ctcttaacct cattggaaat cgcggcataa tcactggtgg tatgattgat gaccgcgtca   8760
acaatgacct ttatgccata ttcttcagcg gctgcacaca tttcttaaa  ttcttgttca   8820 gtacctaagt aacggttgcc aatttgatac gatgtcggct gatacagcca gtaccagttc   8880
gacatgcttt tatctccttg attcccttcc tttacttggt taatcggaga tgtctgaatg   8940
gctgtatatc ctgcatcatg aatatccttc atattgtgtt ttaacgtatt gaacgaccaa   9000
ttccatgcat gaagaatggt tccgcttttg atcgacggtg ctgtaagctc attcgatttg   9060
ttcgccgttt cagcactcgc agccgccggt cctgccagaa ccaaatgaaa cagcaataaa   9120
aatccagcga ataacggcag taaagaggtt ttgaatcgtt ttgcaaacat tcttgacact   9180
ccttatttga ttttttgaag acttacttcg gagtcaaaaa tccctcttac ttcattcttc   9240
cgcttcctcc tttcaaaccg atgtgaagac tggagaattt tgttaacgct tacatttaaa   9300
attatcacaa tcactctatc aaaacaactt ggcagagtga atacaaatca atgttcctat   9360
aaaaaaagct gcccgaaact gtgaacgctt ccctcgcttt ccaaacaaaa aagatgattt   9420
cttttttatt tcttcttta  ccgctcttct gtaagccagc ttcacaatca cataccgaag   9480
cagaaacaga acgccgccgc agacgataaa aagaagaatc attttcagcc aagcgaagaa   9540
tgtatgggga atcccctgt  cgtacatcgt aagcaccact accgcaaagg cgaccgcaat   9600
tgattctatt cgctgctgct tcacccgttt ttgcagttct tctttggtgt ctattctcgg   9660
catgagcatt ccggatgccg cagccctgat gcagtaatat aagataatga tgaacaaaaa   9720
cacaaggctt gcagcccatt ctttaaacgg aaattcaaac ataatgccgc ggatgatcac   9780
atcaagcagc gcaaatgctc ccgctatcat cccaatctcc gaccagattt tttgttcttt   9840
ttcttttact ctcttatttt tcccattcac gcctgaaagt ctattacgca gattattcat   9900
gaccttcctc ccgcactttt acgaatggct tatggcttac atgttacaat aacagcctgc   9960
gcttctgcaa tgaataactc aaaagcccgc cgtacaagcc ggcgggcagc aatcgttaaa  10020
acggccccca attgatcatg actccgatca cgataaagac aagcccgatc aagaaccaaa  10080
tcagagcaag cggcaccata aaccgcagcc acttgacata cggaataccg ctggcggcaa  10140
gcaccgccat gagaacgccg gatgtcgggt tcacacagtt gacgaccct  tctccaagca  10200 taaccgcttc aaccgcaacc tgtctcgtga ttcccatcaa atcagcgagc ggcgccagga  10260
ttggaataaa tacaacggct tcgccagaac ctgaagagat gagaaaatga agcagcgcac  10320
```

| | |
|---|---|
| tggcgatata catgccgatt gccccagcaa tcgggctgaa tccatccaaa agtgaagcca | 10380 |
| aagcattgac gacagtatcg agaagctttc cattttcaag gataacggaa atgcttcgtg | 10440 |
| ccatcccgac aatcagcgcc ccgtatacaa gactttggca gcccgtaatg aaggttttgg | 10500 |
| caatatcgtt cgccgcaagc ccgcctatta accggcaag gacagaaata aaaataaatg | 10560 |
| tcgcagccat ttgggaatct gaccagccaa gcttcaaagc gccgtataaa aatccgacaa | 10620 |
| gtgagagtcc cgcccagcc aaaatcagct tatggcgaac ggtaaacggc actgactgat | 10680 |
| cttcttcttt accggcttcg c | 10701 |

<210> SEQ ID NO 10
<211> LENGTH: 720
<212> TYPE: DNA
<213> ORGANISM: Artificial Sequence
<220> FEATURE:
<223> OTHER INFORMATION: SUPER FOLDER GFP

<400> SEQUENCE: 10

| | |
|---|---|
| atgcgtaaag gcgaagagct gttcactggt gtcgtcccta ttctggtgga actggatggt | 60 |
| gatgtcaacg gtcataagtt ttccgtgcgt ggcgagggtg aaggtgacgc aactaatggt | 120 |
| aaactgacgc tgaagttcat ctgtactact ggtaaactgc cggtaccttg gccgactctg | 180 |
| gtaacgacgc tgacttatgg tgttcagtgc tttgctcgtt atccggacca tatgaagcag | 240 |
| catgacttct tcaagtccgc catgccggaa ggctatgtgc aggaacgcac gatttccttt | 300 |
| aaggatgacg gcacgtacaa aacgcgtgcg gaagtgaaat ttgaaggcga taccctggta | 360 |
| aaccgcattg agctgaaagg cattgacttt aagaagacg gcaatatcct gggccataag | 420 |
| ctggaataca attttaacag ccacaatgtt tacatcaccg ccgataaaca aaaaaatggc | 480 |
| attaaagcga attttaaaat tcgccacaac gtggaggatg gcagcgtgca gctggctgat | 540 |
| cactaccagc aaaacactcc aatcggtgat ggtcctgttc tgctgccaga caatcactat | 600 |
| ctgagcacgc aaagcgttct gtctaaagat ccgaacgaga aacgcgatca tatggttctg | 660 |
| ctggagttcg taaccgcagc gggcatcacg catggtatgg atgaactgta caaatgatga | 720 |

<210> SEQ ID NO 11
<211> LENGTH: 1083
<212> TYPE: DNA
<213> ORGANISM: Artificial Sequence
<220> FEATURE:
<223> OTHER INFORMATION: LACI FROM PDR111

<400> SEQUENCE: 11

| | |
|---|---|
| atgaaaccag taacgttata cgatgtcgca gagtatgccg gtgtctctta tcagaccgtt | 60 |
| tcccgcgtgg tgaaccaggc cagccacgtt tctgcgaaaa cgcgggaaaa agtggaagcg | 120 |
| gcgatggcgg agctgaatta cattcccaac cgcgtggcac aacaactggc gggcaaacag | 180 |
| tcgttgctga ttggcgttgc cacctccagt ctggccctgc acgcgccgtc gcaaattgtc | 240 |
| gcggcgatta aatctcgcgc cgatcaactg ggtgccagcg tggtggtgtc gatggtagaa | 300 |
| cgaagcggcg tcgaagcctg taaaacggcg gtgcacaatc ttctcgcgca acgcgtcagt | 360 |
| gggctgatca ttaactatcc gctggatgac caggatgcca ttgctgtgga agctgcctgc | 420 |
| actaatgttc cggcgttatt tcttgatgtc tctgaccaga cacccatcaa cagtattatt | 480 |
| ttctcccatg aagacggtac gcgactgggc gtggagcatc tggtcgcatt gggtcaccag | 540 |
| caaatcgcgc tgttagcggg cccattaagt tctgtctcgg cgcgtctgcg tctggctggc | 600 |
| tggcataaat atctcactcg caatcaaatt cagccgatag cggaacggga aggcgactgg | 660 |

```
agtgccatgt ccggttttca acaaaccatg caaatgctga atgagggcat cgttccccact    720 gcgatgctgg ttgccaacga tcagatggcg ctgggcgcaa tgcgcgccat taccgagtcc    780
gggctgcgcg ttggtgcgga tatctcggta gtgggatacg acgataccga agacagctca    840
tgttatatcc cgccgttaac caccatcaaa caggattttc gcctgctggg gcaaaccagc    900
gtggaccgct tgctgcaact ctctcagggc caggcggtga agggcaatca gctgttgccc    960
gtctcactgg tgaaaagaaa aaccaccctg gcgcccaata cgcaaaccgc ctctccccgc   1020
gcgttggccg attcattaat gcagctggca cgacaggttt cccgactgga aagcgggcag   1080
tga                                                                 1083
```

<210> SEQ ID NO 12
<211> LENGTH: 2652
<212> TYPE: DNA
<213> ORGANISM: T7 PHAGE

<400> SEQUENCE: 12

```
atgaacacga ttaacatcgc taagaacgac ttctctgaca tcgaactggc tgctatcccg     60
ttcaacactc tggctgacca ttacggtgag cgtttagctc gcgaacagtt ggcccttgag    120
catgagtctt acgagatggg tgaagcacgc ttccgcaaga tgtttgagcg tcaacttaaa    180
gctggtgagg ttgcggataa cgctgccgcc aagcctctca tcactaccct actccctaag    240
atgattgcac gcatcaacga ctggtttgag gaagtgaaag ctaagcgcgg caagcgcccg    300
acagccttcc agttcctgca agaaatcaag ccggaagccg tagcgtacat caccattaag    360
accactctgg cttgcctaac cagtgctgac aatacaaccg ttcaggctgt agcaagcgca    420
atcggtcggg ccattgagga cgaggctcgc ttcggtcgta tccgtgacct tgaagctaag    480
cacttcaaga aaaacgttga ggaacaactc aacaagcgcg tagggcacgt ctacaagaaa    540
gcatttatgc aagttgtcga ggctgacatg ctctctaagg gtctactcgg tggcgaggcg    600
tggtcttcgt ggcataagga agactctatt catgtaggag tacgctgcat cgagatgctc    660
attgagtcaa ccggaatggt tagcttacac cgccaaaatg ctggcgtagt aggtcaagac    720
tctgagacta tcgaactcgc acctgaatac gctgaggcta tcgcaacccg tgcaggtgcg    780
ctggctggca tctctccgat gttccaacct tgcgtagttc ctcctaagcc gtggactggc    840
attactggtg gtggctattg ggctaacggt cgtcgtcctc tggcgctggt gcgtactcac    900
agtaagaaag cactgatgcg ctacgaagac gtttacatgc ctgaggtgta caaagcgatt    960
aacattgcgc aaaacaccgc atggaaaatc aacaagaaag tcctagcggt cgccaacgta   1020
atcaccaagt ggaagcattg tccggtcgag gacatccctg cgattgagcg tgaagaactc   1080
ccgatgaaac cggaagacat cgacatgaat cctgaggctc tcaccgcgtg aaacgtgct    1140 gccgctgctg tgtaccgcaa ggacaaggct cgcaagtctc gccgtatcag ccttgagttc   1200
atgcttgagc aagccaataa gtttgctaac cataaggcca tctggttccc ttacaacatg   1260
gactggcgcg gtcgtgttta cgctgtgtca atgttcaacc cgcaaggtaa cgatatgacc   1320
aaaggactgc ttacgctggc gaaaggtaaa ccaatcggta aggaaggtta ctactggctg   1380
aaaatccacg gtgcaaactg tgcgggtgtc gataaggttc cgttccctga gcgcatcaag   1440
ttcattgagg aaaaccacga gaacatcatg gcttgcgcta agtctccact ggagaacact   1500
tggtgggctg agcaagattc tccgttctgc ttccttgcgt tctgctttga gtacgctggg   1560
gtacagcacc acggcctgag ctataactgc tcccttccgc tggcgtttga cgggtcttgc   1620
```

```
tctggcatcc agcacttctc cgcgatgctc cgagatgagg taggtggtcg cgcggttaac    1680
ttgcttccta gtgaaaccgt tcaggacatc tacgggattg ttgctaagaa agtcaacgag    1740
attctacaag cagacgcaat caatgggacc gataacgaag tagttaccgt gaccgatgag    1800
aacactggtg aaatctctga gaaagtcaag ctgggcacta aggcactggc tggtcaatgg    1860
ctggcttacg gtgttactcg cagtgtgact aagcgttcag tcatgacgct ggcttacggg    1920
tccaaagagt tcggcttccg tcaacaagtg ctggaagata ccattcagcc agctattgat    1980
tccggcaagg gtctgatgtt cactcagccg aatcaggctg ctggatacat ggctaagctg    2040
atttgggaat ctgtgagcgt gacggtggta gctgcggttg aagcaatgaa ctggcttaag    2100
tctgctgcta agctgctggc tgctgaggtc aaagataaga agactggaga gattcttcgc    2160
aagcgttgcg ctgtgcattg ggtaactcct gatggtttcc ctgtgtggca ggaatacaag    2220
aagcctattc agacgcgctt gaacctgatg ttcctcggtc agttccgctt acagcctacc    2280
attaacacca acaaagatag cgagattgat gcacacaaac aggagtctgg tatcgctcct    2340
aactttgtac acagccaaga cggtagccac cttcgtaaga ctgtagtgtg gcacacgag     2400 aagtacggaa tcgaatcttt tgcactgatt cacgactcct tcggtaccat tccggctgac    2460
gctgcgaacc tgttcaaagc agtgcgcgaa actatggttg acacatatga gtcttgtgat    2520
gtactggctg atttctacga ccagttcgct gaccagttgc acgagtctca attggacaaa    2580
atgccagcac ttccggctaa aggtaacttg aacctccgtg acatcttaga gtcggacttc    2640
gcgttcgcgt aa                                                        2652
```

<210> SEQ ID NO 13
<211> LENGTH: 109
<212> TYPE: DNA
<213> ORGANISM: Artificial Sequence
<220> FEATURE:
<223> OTHER INFORMATION: IPTG-INDUCIBLE PROMOTER

<400> SEQUENCE: 13

```
ggtaaatgtg agcactcaca attcattttg caaaagttgt tgactttatc tacaaggtgt    60
ggcataatgt gtgtaattgt gagcggataa caattaagct tagtcgaca                109
```

<210> SEQ ID NO 14
<211> LENGTH: 47
<212> TYPE: DNA
<213> ORGANISM: Artificial Sequence
<220> FEATURE:
<223> OTHER INFORMATION: Hybrid T7 promoter with lac operators SEQ ID NO
      14

<400> SEQUENCE: 14

```
taatacgact cactataggg gaattgtgag cggataacaa ttcccct                  47
```

<210> SEQ ID NO 15
<211> LENGTH: 94
<212> TYPE: DNA
<213> ORGANISM: Bacillus licheniformis

<400> SEQUENCE: 15

```
cggtggaaac gaggtcatca tttccttccg aaaaaacggt tgcatttaaa tcttacatat    60
gtaatacttt caaagactac atttgtaaga tttg                                94
```

<210> SEQ ID NO 16
<211> LENGTH: 24
<212> TYPE: DNA

```
<213> ORGANISM: Artificial Sequence
<220> FEATURE:
<223> OTHER INFORMATION: Synthetic RBS in pMF35

<400> SEQUENCE: 16
aagcttacat aaggaggaac tact                                          24

<210> SEQ ID NO 17
<211> LENGTH: 24
<212> TYPE: DNA
<213> ORGANISM: Artificial Sequence
<220> FEATURE:
<223> OTHER INFORMATION: Slightly modified MF001

<400> SEQUENCE: 17
gctagcacat aaggaggaac tact                                          24

<210> SEQ ID NO 18
<211> LENGTH: 24
<212> TYPE: DNA
<213> ORGANISM: Artificial Sequence
<220> FEATURE:
<223> OTHER INFORMATION: RBS driving expression of lacI

<400> SEQUENCE: 18
ttcaaacgga gggagacgat tttg                                          24

<210> SEQ ID NO 19
<211> LENGTH: 129
<212> TYPE: DNA
<213> ORGANISM: Artificial Sequence
<220> FEATURE:
<223> OTHER INFORMATION: TERMINATOR

<400> SEQUENCE: 19
ccaggcatca ataaaacga aaggctcagt cgaaagactg ggcctttcgt tttatctgtt    60
gtttgtcggt gaacgctctc tactagagtc acactggctc accttcgggt gggcctttct   120
gcgtttata                                                           129

<210> SEQ ID NO 20
<211> LENGTH: 717
<212> TYPE: DNA
<213> ORGANISM: Artificial Sequence
<220> FEATURE:
<223> OTHER INFORMATION: Codon optimized sfGFP

<400> SEQUENCE: 20
atgagaaaag gagaagaatt atttacagga gttgttccaa ttttagtgga actggatggt    60
gatgtcaacg gtcataagtt ttccgtgcgt ggcgagggtg aaggtgacgc aactaatggt   120
aaactgacgc tgaagttcat ctgtactact ggtaaactgc cggtaccttg gccgactctg   180
gtaacgacgc tgacttatgg tgttcagtgc tttgctcgtt atccggacca tatgaagcag   240
catgacttct tcaagtccgc catgccggaa ggctatgtgc aggaacgcac gatttccttt   300
aaggatgacg gcacgtacaa aacgcgtgcg gaagtgaaat tgaaggcga taccctggta   360 aaccgcattg agctgaaagg cattgacttt aagaagacg gcaatatcct gggccataag   420
ctggaataca attttaacag ccacaatgtt tacatcaccg ccgataaaca aaaaaatggc   480
attaaagcga attttaaaat tcgccacaac gtggaggatg gcagcgtgca gctggctgat   540
cactaccagc aaaacactcc aatcggtgat ggtcctgttc tgctgccaga caatcactat   600
ctgagcacgc aaagcgttct gtctaaagat ccgaacgaga aacgcgatca tatggttctg   660
```
ctggagttcg taaccgcagc gggcatcacg catggtatgg atgaactgta caaataa 717

<210> SEQ ID NO 21
<211> LENGTH: 3075
<212> TYPE: DNA
<213> ORGANISM: Artificial Sequence
<220> FEATURE:
<223> OTHER INFORMATION: ]-galactosidase enzyme

<400> SEQUENCE: 21

| | |
|---|---|
| atgaccatga ttacggattc actggccgtc gttttacaac gtcgtgactg ggaaaaccct | 60 |
| ggcgttaccc aacttaatcg ccttgcagca catccccctt tcgccagctg gcgtaatagc | 120 |
| gaagaggccc gcaccgatcg cccttcccaa cagttgcgca gcctgaatgg cgaatggcgc | 180 |
| tttgcctggt ttccggcacc agaagcggtg ccggaaagct ggctggagtg cgatcttcct | 240 |
| gaggccgata ctgtcgtcgt cccctcaaac tggcagatgc acggttacga tgcgcccatc | 300 |
| tacaccaacg tgacctatcc cattacggtc aatccgccgt ttgttcccac ggagaatccg | 360 |
| acgggttgtt actcgctcac atttaatgtt gatgaaagct ggctacagga aggccagacg | 420 |
| cgaattattt ttgatggcgt taactcggcg tttcatctgt ggtgcaacgg cgctgggtc | 480 |
| ggttacggcc aggacagtcg tttgccgtct gaatttgacc tgagcgcatt tttacgcgcc | 540 |
| ggagaaaacc gcctcgcggt gatggtgctg cgctggagtg acggcagtta tctggaagat | 600 |
| caggatatgt ggcggatgag cggcattttc cgtgacgtct cgttgctgca taaaccgact | 660 |
| acacaaatca gcgatttcca tgttgccact cgctttaatg atgatttcag ccgcgctgta | 720 |
| ctggaggctg aagttcagat gtgcggcgag ttgcgtgact acctacgggt aacagtttct | 780 |
| ttatggcagg gtgaaacgca ggtcgccagc ggcaccgcgc ctttcggcgg tgaaattatc | 840 |
| gatgagcgtg gtggttatgc cgatcgcgtc acactacgtc tgaacgtcga aaacccgaaa | 900 |
| ctgtggagcg ccgaaatccc gaatctctat cgtgcggtgg ttgaactgca caccgccgac | 960 |
| ggcacgctga ttgaagcaga agcctgcgat gtcggtttcc gcgaggtgcg gattgaaaat | 1020 |
| ggtctgctgc tgctgaacgg caagccgttg ctgattcgag gcgttaaccg tcacgagcat | 1080 |
| catcctctgc atggtcaggt catggatgag cagacgatgg tgcaggatat cctgctgatg | 1140 |
| aagcagaaca actttaacgc cgtgcgctgt tcgcattatc cgaaccatcc gctgtggtac | 1200 |
| acgctgtgcg accgctacgg cctgtatgtg gtggatgaag ccaatattga aacccacggc | 1260 |
| atggtgccaa tgaatcgtct gaccgatgat ccgcgctggc taccggcgat gagcgaacgc | 1320 |
| gtaacgcgaa tggtgcagcg cgatcgtaat cacccgagtg tgatcatctg gtcgctgggg | 1380 |
| aatgaatcag gccacggcgc taatcacgac gcgctgtatc gctggatcaa atctgtcgat | 1440 |
| ccttcccgcc cggtgcagta tgaaggcggc ggagccgaca ccacgccac cgatattatt | 1500 |
| tgcccgatgt acgcgcgcgt ggatgaagac cagcccttcc cggctgtgcc gaaatggtcc | 1560 |
| atcaaaaaat ggctttcgct acctggagag acgcgcccgc tgatcctttg cgaatacgcc | 1620 |
| cacgcgatgg gtaacagtct tggcggtttc gctaaatact ggcaggcgtt tcgtcagtat | 1680 |
| ccccgtttac agggcggctt cgtctgggac tgggtggatc agtcgctgat taaatatgat | 1740 |
| gaaaacggca acccgtggtc ggcttacggc ggtgattttg gcgatacgcc gaacgatcgc | 1800 |
| cagttctgta tgaacggtct ggtctttgcc gaccgcacgc cgcatccagc gctgacggaa | 1860 |
| gcaaaacacc agcagcagtt tttccagttc cgtttatccg gcaaaccat cgaagtgacc | 1920 |
| agcgaatacc tgttccgtca tagcgataac gagctcctgc actggatggt ggcgctggat | 1980 |

```
ggtaagccgc tggcaagcgg tgaagtgcct ctggatgtcg ctccacaagg taaacagttg    2040
attgaactgc ctgaactacc gcagccgag agcgccgggc aactctggct cacagtacgc    2100
gtagtgcaac cgaacgcgac cgcatggtca gaagccgggc acatcagcgc ctggcagcag    2160
tggcgtctgg cggaaaacct cagtgtgacg ctccccgccg cgtcccacgc catcccgcat    2220
ctgaccacca gcgaaatgga tttttgcatc gagctgggta ataagcgttg gcaatttaac    2280
cgccagtcag gctttctttc acagatgtgg attggcgata aaaacaact gctgacgccg    2340 ctgcgcgatc agttcacccg tgcaccgctg gataacgaca ttggcgtaag tgaagcgacc    2400
cgcattgacc ctaacgcctg ggtcgaacgc tggaaggcgg cgggccatta ccaggccgaa    2460
gcagcgttgt tgcagtgcac ggcagataca cttgctgatg cggtgctgat tacgaccgct    2520
cacgcgtggc agcatcaggg gaaaaccta tttatcagcc ggaaaaccta ccggattgat    2580
ggtagtggtc aaatggcgat taccgttgat gttgaagtgg cgagcgatac accgcatccg    2640
gcgcggattg gcctgaactg ccagctggcg caggtagcag agcgggtaaa ctggctcgga    2700
ttagggccgc aagaaaacta tcccgaccgc cttactgccg cctgttttga ccgctgggat    2760
ctgccattgt cagacatgta taccccgtac gtcttcccga gcgaaaacgg tctgcgctgc    2820
gggacgcgcg aattgaatta tggcccacac cagtggcgcg gcgacttcca gttcaacatc    2880
agccgctaca gtcaacagca actgatggaa accagccatc gccatctgct gcacgcggaa    2940
gaaggcacat ggctgaatat cgacggtttc catatgggga ttggtggcga cgactcctgg    3000
agcccgtcag tatcggcgga attccagctg agcgccggtc gctaccatta ccagttggtc    3060
tggtgtcaaa aataa                                                    3075

<210> SEQ ID NO 22
<211> LENGTH: 75
<212> TYPE: DNA
<213> ORGANISM: Artificial Sequence
<220> FEATURE:
<223> OTHER INFORMATION: Self-cleaving ribozyme

<400> SEQUENCE: 22
agctgtcacc ggatgtgctt tccggtctga tgagtccgtg aggacgaaac agcctctaca    60
aataattttg tttaa                                                     75
```

Bacillus EXPRESSION SYSTEM

PRIOR RELATED APPLICATIONS

This application claims priority to U.S. Ser. No. 62/776,132, filed Dec. 6, 2018, and to International Application No. PCT/US2019/65080, filed Dec. 6, 2019, each incorporated by reference in its entirety for all purposes.

FEDERALLY SPONSORED RESEARCH STATEMENT

This invention was made with government support under Grant Nos: R21AI115014 and MCB1616755, awarded by the NIH and NSF, respectively. The government has certain rights in the invention.

REFERENCE TO SEQUENCE LISTING

This application includes an electronically submitted sequence listing in .txt format. The .txt file contains a sequence listing entitled "RICE2019-029-03US_ST25.txt" created on Dec. 6, 2019, and is 65,940 bytes in size. The sequence listing contained in this .txt file is part of the specification and is hereby incorporated by reference herein in its entirety.

FIELD OF THE DISCLOSURE

This invention provides materials and methods allowing expression of RNA and proteins in Bacillus, especially B. subtilis and similar species, with a new tightly regulated, integrative and inducible expression system.

BACKGROUND OF THE DISCLOSURE

Bacillus subtilis is a model organism for studies of Gram-positive bacterial biology and systems biology of cellular differentiation, stress responses, and multicellular organization. Additionally, B. subtilis is among the most widely used hosts for protein production in the biotechnology industry due to its ability to secrete proteins into the cell medium, its non-pathogenic GRAS (generally recognized as safe) designation, and its high genetic tractability. For example, B. subtilis is used for large-scale production of lipases, proteases, and amylases, among other industrially-relevant proteins.

However, B. subtilis work has been limited by a lack of high-quality synthetic biological parts. For example, biotechnology applications require inducible promoters capable of switching between a low production state for early-stage culturing and a high production state that maximizes protein yield during fermentation. Such parts are particularly important when the recombinant protein or metabolic pathway of interest are toxic to the host cells when overproduced.

Typical inducible promoters in B. subtilis have dynamic ranges (ratio of output protein expression in the presence versus absence of inducer) of at most a few hundred. While a B. subtilis bacitracin-inducible promoter with a 1,000-fold range has been reported (13), it requires antibiotic selection to maintain a multicopy plasmid, and its activity is transient and shuts down less than two hours after induction, likely due to an endogenous bacitracin stress response. In contrast, for the Gram-negative bacterium Escherichia coli, inducible promoters have been engineered with dynamic ranges greater than 1,000 or even 10,000.

Thus, improved B. subtilis inducible promoter systems are greatly needed in the art. The ideal system will be very tightly regulated, result in high levels of protein expression when induced, have 10,000 or even greater fold dynamic range, and ideally be integratable into the genome.

SUMMARY OF THE DISCLOSURE

Protein expression systems that are activated in response to chemicals such as IPTG, xylose or bacitracin currently exist for B. subtilis. However, their fold-activation values are fairly low, and their active output levels are limited by the B. subtilis endogenous transcription machinery. On the other hand, a few systems based on the exogenous viral T7 RNA Polymerase (T7 RNAP) have been previously built. While these achieve high expression levels, protein production in the inactive state or "leakiness" is fairly high and therefore fold-activation is still low.

Here, we have engineered an extraordinarily stringent and strongly inducible protein expression system for Bacillus. This system combines the viral T7 RNAP, which produces high amounts of recombinant protein in the active state, with the LacI bacterial transcription factor that inhibits production of both the protein and the viral polymerase, resulting in nearly undetectable output in the inactive state. Our system achieves greater than 10,000-fold or even 20,000-fold activation in response to a chemical inducer. We expect this system to improve yield of existing protein production, especially toxic proteins, or metabolic engineering applications using B. subtilis and possibly other Bacillus species, and enable synthesis of new proteins and chemicals that were previously unfeasible.

Our LacI-T7 inducible system comprises the following elements:
- Transcriptional repressor LacI, expressed constitutively.
- The T7 phage RNA polymerase (T7 RNAP), expressed from the B. subtilis promoter $P_{hy-spank}$, which is normally repressed by LacI.
- The hybrid $P_{T7lac}$ promoter, normally repressed by LacI as well, under whose control the recombinant protein of interest or ORF is placed.

For an integrative sequence, these elements should be flanked by first and second portions of a non-essential portion of the Bacillus genome, thereby allowing integration into that genome. The order of parts is typically not critical, but whatever the order, the cassette is flanked by the integrating sequences such that everything there between is integrated into the genome. In addition, sequences to optimize expression of the target ORF can also be included, such as ribosome binding sites, enhancers, terminators, and the like.

The cassette can be assembled and used as is, or can be formulated as an expression vector—capable of self-reproduction and ORF expression. For an expression vector, additional vector sequences are added, allowing replication in Bacillus and/or E. coli (e.g., ori), marker genes for selection (e.g., antibiotic resistance), unique restriction endonuclease (RE) sites or the multi-cloning site, shuttle sequences allowing the vector to shuttle e.g., between E. coli and Bacillus (both on sequences), or between yeast and Bacillus (Bacillus on and autonomously replicating sequence (ARS), a yeast centromere (CEN), and a yeast selectable marker), viral packaging sequences, protein degradation tags, and the like. It may also be possible to formulate the cassette described herein as minivectors, such as those described by Twister® (Houston TX).

LacI and the $P_{hy\text{-}spank}$ promoter were obtained from pDR111 (ATCC® 53123), a commercially available plasmid for genomic integration in *B. subtilis*. The $P_{T7lac}$ promoter sequence is identical to that included in some of the commercially-available *E. coli* pET plasmids, and was synthesized via oligo annealing and extension. The sequence of the T7 RNAP is identical to that found in the *E. coli* BL21(DE3) strain, and was obtained from an *E. coli* plasmid.

DNA coding for these elements was assembled, together with a spectinomycin resistance cassette. Flanking sequences for genome integration were added that were homologous to the *B. subtilis* amyE genomic locus, but any non-essential loci could be used. The assembled DNA cassette was then integrated into the *Bacillus* genome via standard *Bacillus* transformation methods.

In the inactive state, LacI repression of both T7 RNAP production and $P_{T7lac}$ ensures very low production of recombinant protein. Upon addition of chemical inducer IPTG to the cell media, LacI-repression is relieved and the T7 RNAP is produced. The T7 RNAP can now transcribe the recombinant gene from the now unrepressed $P_{T7lac}$ promoter.

To assess the performance of the LacI-T7 system, we placed superfolder GFP (sfGFP) under $P_{T7lac}$ and measured cell fluorescence in the presence or absence of IPTG. This resulted in high levels of fluorescence in the presence of IPTG, but undetectable levels in its absence. Based on estimates of the limit of detection of our flow cytometer instrument, we placed a lower bound on the fold-activation of this system at 20,000. We have also tested the system with other report The invention includes any one or more of the following in any combination(s) thereof:

An inducible and integrative genetic system for *Bacillus subtilis*, said system comprising the following components:
a) a LacI repressor constitutively expressed under a first constitutive promoter from *B. subtilis*;
b) a T7 phage RNA polymerase (T7 RNAP) expressed from a second *B. subtilis* promoter that is normally repressed by LacI;
c) a hybrid output promoter activated by T7RNAP and repressed by LacI;
d) part a) being 5' flanked by a first portion of a chromosomal gene from *B. subtilis*, and part c) being 3' flanked by a second portion of said chromosomal gene from *B. subtilis*, so as to allow integration into a genome of *B. subtilis*.
A system as herein described, having at least one open-reading frame under the control of the output promoter.
A system as herein described, having at least 10,000 fold or 20,000 activation (expression of said ORF before and after induction) when induced.
The system can also include other sequences for convenience of use, such as *E. coli* ori, antibiotic resistance cassette, multiple cloning sites, and the like, and thus be able to shuttle from species to species and/or function as a vector for amplification and cloning purposes. Herein, however, we assembled the components in vitro and then used the assembled material for direct integration.
A system as herein described, wherein the LacI was obtained from or is equivalent to the sequences in pDR111.
A system as herein described, wherein said first promoter is a $P_{penP}$ promoter.
A system as herein described, wherein said second promoter is a $P_{hy\text{-}spank}$ promoter.
A system as herein described, wherein the $P_{hy\text{-}spank}$ promoter was obtained from or is equivalent to the sequences in pDR111.
A system as herein described, wherein the $P_{T7lac}$ promoter sequence was obtained from or is equivalent to *E. coli* pET plasmids.
A system as herein described, wherein the T7 RNAP was obtained from or is equivalent to the *E. coli* BL21(DE3).
A system as herein described, further comprising an antibiotic resistance cassette, e.g., a spectinomycin resistance cassette or others.
A system as herein described, wherein said chromosomal gene from *B. subtilis* is an amyE gene.
An expression system for *Bacillus subtilis*, said system having a structure of FIG. 1A.
An expression system for *Bacillus subtilis*, said system having a sequence of SEQ ID NO 7, or at least 95% identity to same
An inducible and integrative expression system for *Bacillus subtilis*, said system comprising the following components:
a) a LacI repressor constitutively expressed under a *B. subtilis* $P_{penP}$ promoter;
b) a lacI-repressible T7 phage RNA polymerase (T7 RNAP) expressed from a *B. subtilis* $P_{hy\text{-}spank}$ promoter;
c) a hybrid $P_{T7lac}$ promoter regulated by said T7RNAP;
d) a multiple cloning site for insertion of an ORF operably linked to said $P_{T7lac}$ promoter;
e) part a) being 5' flanked by a first portion of a chromosomal gene from *B. subtilis*, and part d) being 3' flanked by a second portion of said chromosomal gene from *B. subtilis*, so as to allow integration into a genome of *B. subtilis*.
A recombinant *Bacillus*, wherein said *Bacillus* is transformed with a system as herein described, said system having an ORF for a target protein inserted after $P_{T7lac}$, said *Bacillus* able to express said target protein when induced with IPTG.
A recombinant *Bacillus*, wherein said *Bacillus* is transformed with the system herein described, said system having an ORF for a target protein inserted after $P_{T7lac}$, said ORF being integrated into a genome of said *Bacillus*, and said *Bacillus* able to express said target protein when induced with IPTG.
A method of transforming *Bacillus subtilis*, comprising introducing the system as herein described to a population of *Bacillus subtilis* under conditions that allow transformation and integration of said system into the genome of said *Bacillus subtilis*, and selecting for transformed and integrated *Bacillus subtilis*.
A method of producing a target protein, comprising introducing an ORF encoding a target protein after $P_{T7lac}$ of the system as herein described, introducing said system and ORF to a population of *Bacillus subtilis* under conditions that allow integration of said ORF into a genome of said *Bacillus subtilis*, and selecting for integrated *Bacillus subtilis*, growing said integrated *Bacillus subtilis* in a growth medium until cells reach near saturation, adding IPTG to said growth medium in an amount sufficient to induce the lac operon, continue culturing said integrated *Bacillus subtilis* until said ORF is expressed, and isolating said target protein from said growth medium or said transformed *Bacillus subtilis* or both.

A *Bacillus* promoter system, comprising an DNA molecule comprising:
a) a Lacl repressor constitutively expressed under a first constitutive promoter;
b) a T7 phage RNA polymerase (T7 RNAP) expressed from a second promoter that is normally repressed by Lacl; and
c) a third promoter sequence regulated by a T7RNAP that is normally repressed by Lacl.

Any promoter system herein, further comprising an open reading frame ("ORF") for a gene of interest inserted after said third promoter sequence, such that said ORF is regulated by said third promoter sequence.

Any promoter system herein, having at least 5,000, 10,000, 15,000 or 20,000 fold activation of expression of said ORF when induced by IPTG.

Any promoter system herein, comprising one or more of the following:
a) the Lacl is from or is equivalent to the sequences in pDR111 or having at least 95% nucleotide identity to SEQ ID NO 11; or
b) the first constitutive promoter is a PpenP promoter or a sequence having at least 95% nucleotide identity to SEQ ID NO 15; or
c) the second promoter is a Phy-spank promoter or a sequence having at least 95% nucleotide identity to SEQ ID NO 13; or
d) the Phy-spank promoter is from or is equivalent to the sequences in pDR111; or
e) the hybrid PT7lac promoter sequence is from or is equivalent to *E. coli* pET plasmids; or
f) the T7 RNAP is from or is equivalent to the *E. coli* BL21(DE3); or
g) the T7RNAP is a sequence having at least 95% nucleotide identity to SEQ ID NO 12
h) the third promoter is a hybrid PT7lac promoter sequence or a sequence having at least 95% nucleotide identity to SEQ ID NO 14; or
i) the first constitutive promoter for the Lacl repressor is a promoter from *Bacillus*; or
j) the T7RNAP is expressed from a *Bacillus* Lacl repressed promoter.

An expression system for *Bacillus*, said system being in a *Bacillus* and having:
a) at least 95% nucleotide identity to the sequence of SEQ ID NO 7, said 95% identity excluding an open reading frame (ORF) added thereto; and
b) having at least 5,000, 10,000, 15,000 or 20,000 fold more expression of said ORF with IPTG induction than without IPTG induction.

An inducible and integrative expression system for *Bacillus subtilis*, said system comprising an expression cassette with the following structure:
a) a first portion of a chromosomal sequence from *B. subtilis* at a 5' end of said expression cassette;
b) a second portion of said chromosomal sequence at a 3' end of said expression cassette;
c) a Lacl repressor constitutively expressed under a *B. subtilis* PpenP promoter within said expression cassette;
d) a lacl-repressible T7 phage RNA polymerase (T7 RNAP) expressed from a *B. subtilis* Phy-spank promoter within said expression cassette;
e) a hybrid promoter activated by T7RNAP and repressed by Lacl that controls expression of an ORF.

Any system herein, further comprising a cassette comprising an antibiotic resistance gene or a spectinomycin resistance gene.

Any system herein, further comprising a cassette comprising a 5' chromosomal sequence from the *Bacillus* amyE gene and a 3' chromosomal sequence from the *Bacillus* amyE gene to allow homologous recombination into a genome of *Bacillus*.

Any promoter system herein, further comprising one or more *B. subtilis*-specific ribosome-binding sites (RBSs) placed to stimulate translation from mRNAs expressed from the first, second or third promoters and/or comprising one or more *B. subtilis*-specific ribosome-binding sites (RBSs) placed to stimulate translation from mRNAs expressed from PT7lac, Phy-spank, or PpenP promoters, or any combination thereof Any system herein, said cassette further comprising a self-cleaving ribozyme placed after PT7lac to improve output production.

Any system herein, further comprising a multiple cloning site after said third promoter (for insertion of the ORF).

Any system herein, wherein said *Bacillus* is a *Bacillus subtilis*.

Any system herein, wherein the promoter system is an inducible promoter system or is an inducible by IPTG.

Any system herein, wherein said ORF encodes an output mRNA, that may or may not encode a protein.

Any system herein, comprising an ORF for a target protein and being capable of a 10,000 fold increase in expression of said ORF when induced with IPTG as compared to without IPTG.

A vector comprising any system herein, said vector being self-reproduceable in a *Bacillus*, *Escherichia* or yeast.

Any vector herein producing at least 10,000 fold more expression of said ORF in a *Bacillus* transformed with said vector and induced with IPTG induction, as compared to without IPTG.

A recombinant *Bacillus*, wherein said *Bacillus* is transformed with any system herein, said system being integrated or not.

A method of transforming *Bacillus subtilis*, comprising introducing any system herein to a population of *Bacillus subtilis* under conditions that allow transformation and integration of -continued said system into a chromosome of said *Bacillus subtilis*, and selecting for transformed and integrated *Bacillus subtilis*.
A method of producing a target protein, comprising introducing any system herein to a population of *Bacillus subtilis* under conditions that allow integration of said expression cassette into a genome of said *Bacillus subtilis*, and selecting for integrated *Bacillus subtilis*, growing said integrated *Bacillus subtilis* in a growth medium until cells reach near saturation, adding IPTG to said growth medium in an amount sufficient to induce said lac operon, continuing culturing said integrated *Bacillus subtilis* until said ORF is expressed, and isolating said target protein from said growth medium or said transformed *Bacillus subtilis* or both.

As used herein "recombinant" or "engineered" is relating to, derived from, or containing genetically engineered material. In other words, the genome was intentionally manipulated by humans in some way.

"Expression vectors" are used in accordance with the art-accepted definition of a plasmid, virus, cosmid, or other propagatable sequence designed for protein expression in cells. There are thousands of such vectors commercially available, and typically each has an origin of replication (ori); a multiple cloning site; a selectable marker; ribosome binding sites; a promoter and often enhancers; and the needed termination sequences. Most expression vectors are inducible, although constitutive expression vectors also exist and either can be used.

As used herein, "inducible" means that gene expression can be controlled by the hand-of-man, by adding e.g., a ligand to induce expression from an inducible promoter. Exemplary inducible promoters include the lac promoter, inducible by isopropylthio-β-D-galactopyranoside (IPTG), the yeast AOX1 promoter inducible with methanol, the strong LAC4 promoter inducible with lactate, and the like. Low level of constitutive protein synthesis may occur even in expression vectors with tightly controlled promoters. "Constitutive" means there is always expression from that promoter. $P_{veg}$ is an example of same.

As used herein, "integrative" or "integratable" means the nucleic acid has the ability to integrate into a *B. subtilis* or equivalent genome.

As used herein, an "integrated sequence" means the sequence has been integrated into the host genome, as opposed to being maintained on an expression vector or as a separate integration cassette. It will still be expressible, either inducibly or constitutively. Herein, we are more interested in tightly regulated and highly activatable inducible expression vectors and/or cassettes that are integrative or are integrated.

As used herein, "operatively connected" or "operatively coupled" with respect to DNA sequences means that the oligonucleotide segments are connected in such a way as to allow the DNA (or RNA or protein derived therefrom) to be functional in a cell. Typically, this means e.g., the correct spacing, essential regulatory sequences, and reading frame (if applicable) are maintained.

As used herein, "homolog" means an enzyme with at least 40% identity to one of the listed sequences and also having the same general catalytic activity, although kinetic parameters of the reactions can of course vary. While higher identity (60%, 70%, 80%) and the like may be preferred, it is typical for bacterial sequences to diverge significantly (40-60% identity), yet still be identifiable as homologs, while mammalian species tend to diverge much less (80-90% identity). Unless specified otherwise, any reference to an enzyme herein also includes its homologs that catalyze the same reaction.

As used herein, references to cells or bacteria or strains and all such similar designations include progeny thereof. It is also understood that all progeny may not be precisely identical in DNA content, due to deliberate or inadvertent mutations that have been added to the parent. Mutant progeny that have the same function or biological activity as screened for in the originally transformed cell are included. Where distinct designations are intended, it will be clear from the context.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
|---|---|
| CDS | Protein coding sequence. Equivalent to an ORF. |
| GFP | Green fluorescent protein |
| IM | Integration module |
| IPTG | Isopropyl β-D-1-thiogalactopyranoside. When IPTG is added, the lac repressor is inactivated, allowing the T7 polymerase to be used and therefore the protein of interest will be expressed. |
| LacI | Lactose operon repressor, e.g. P03023 |
| LacI-T7 | LacI operatively coupled to the T7 phage RNA polymerase |
| ORF | Open-reading frame |

| ABBREVIATION | TERM |
|---|---|
| P$_{hy\text{-}spank}$ | Promoter hyper spank |
| P$_{penP}$ | Promoter from the penicillinase gene (penP) of *Bacillus licheniformis*. |
| RBS | Ribosome binding site |
| sfGFP | Superfolder GFP. A constitutively fluorescent green fluorescent protein, published in 2005. |
| T7 RNAP | T7 phage RNA polymerase, e.g., P00573 |

DESCRIPTION OF FIGURES

FIG. 1A Genetic device schematic of LacI-T7 with regulatory interactions shown.

FIG. 1C-D Representative flow cytometry histograms of autofluorescence control (*B. subtilis* lacking any sfgfp gene), and those with sfgfp under either LacI-T7 (1C) or Phy-spank (1D), in the presence or absence of IPTG.

FIG. 2: T71ac promoter (P$_{T7lac}$) and placing of the gene of interest. P$_{T7lac}$ is highlighted with underline. Ribosome binding site is highlighted with double underline. The start codon (ATG) of the gene to be expressed is shown in bold. SEQ ID NO 1.

FIG. 3: Promoter hyper spank SEQ ID NO 2.

FIG. 4. T7 RNAP SEQ ID NO 3.

FIG. 5: Promoter $_{penP}$ SEQ ID NO 4.

FIG. 6. LacI-T7-sfgfp. SEQ ID NO 5.

FIG. 7: Compete expression system sequence SEQ ID NO 6.

FIG. 8 Complete Vector without sfGFP SEQ ID NO 7.

FIG. 9. Variant LacI-T7-sfgfp SEQ ID NO 8.

FIG. 10: Compete Vector with sfGFP Variant SEQ ID NO 9.

FIG. 11. Growth curves of LacI-T7 strains. LacI-T7-sfgfp (A) and LacI-T7-lacZ (B) strains were grown in the absence or presence of IPTG, and the OD600 of each culture was measured at the indicated timepoints. Dots indicate individual OD600 measurements. Continuous lines indicate best fits to an exponential growth model. Estimated doubling times and uncertainties (standard error) are indicated next to the corresponding growth curves.

FIG. 12 SDS-PAGE and immunoblot analysis of sfGFP expression from Phy-spank and LacI-T7. (A) Whole cell extracts of wild-type, Phy-spank-sfgfp and LacI-T7-sfgfp strains grown in the absence or presence of IPTG were analyzed by SDS-PAGE and stained with Coomassie brilliant-blue. The arrow on the right points to the expected sfGFP location. (B) sfGFP expression was further examined by immunoblot analysis using polyclonal anti-GFP antibodies. (C) As a loading control, expression of the constitutively expressed σA protein was examined by immunoblotting with anti-σA antibodies.

FIG. 13. Performance of LacI-T7 measured via β-galactosidase. (A) Device schematic of the LacI-T7 system expressing lacZ. (B) β-galactosidase activity in the absence or presence of IPTG. Bars show the mean of three experiments run on separate days. Dots show values of individual experimental replicates.

Table 1. Data.

Table 2. Various sequences SEQ ID NO 10-22.

DETAILED DESCRIPTION

In more detail, we have engineered a stringent (i.e. non-leaky) and highly-inducible LacI-T7 promoter system for *B. subtilis*. Our system utilizes the hybrid P$_{T7lac}$ promoter to express a gene of interest, and the IPTG-inducible promoter P$_{hy\text{-}spank}$ to express the T7 RNA Polymerase (T7 RNAP) (FIG. 1A).

In the absence of the IPTG inducer, the repressor lacI is active and both T7 RNAP and P$_{T7lac}$ are thereby repressed. This dual repression minimizes leaky expression of the gene of interest. Thus, the system is very stringent, with little to no detectable leaking. Upon addition of IPTG, LacI activity is inhibited, and the newly produced T7 RNAP strongly transcribes the gene of interest from the now de-repressed P$_{T7lac}$ (FIG. 1A).

Our LacI-T7 design is conceptually similar to some variants of the commercial *E. coli* pET expression system, where IPTG also induces both expression of T7 RNAP and de-repression of P$_{T7lac}$. However, our system uses *Bacillus* or *B. subtilis*-specific promoters (other than P$_{T7lac}$) and ribosome-binding sites (RBSs). Additionally, while a few *B. subtilis* gene expression systems based on T7 RNAP have been previously reported, they use the LacI-independent P$_{T7}$ instead of P$_{T7lac}$, resulting in dynamic ranges of less than 50.

Figure 1A:
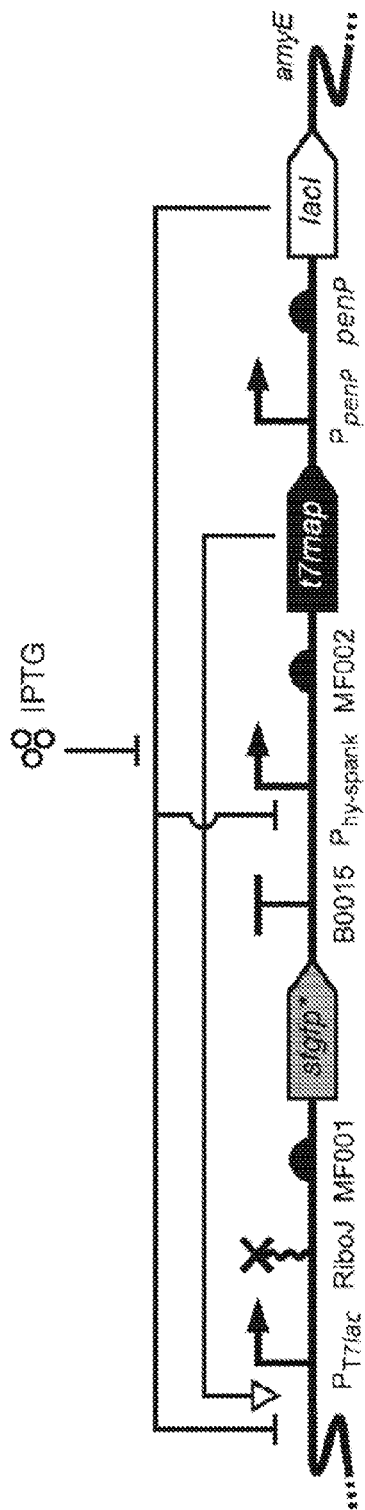
FIG. 1AF. LacI-T7 design and performance.

To validate our design, we placed a sfgfp reporter gene[22] with a codon-optimized N-terminal fragment (sfgfp*) under control of LacI-T7, the self-cleaving ribozyme RiboJ, and RBS MF001, and integrated it into the non-essential amyE locus of the *B. subtilis* genome as a single copy (FIG. 1A).

Figure 1B:
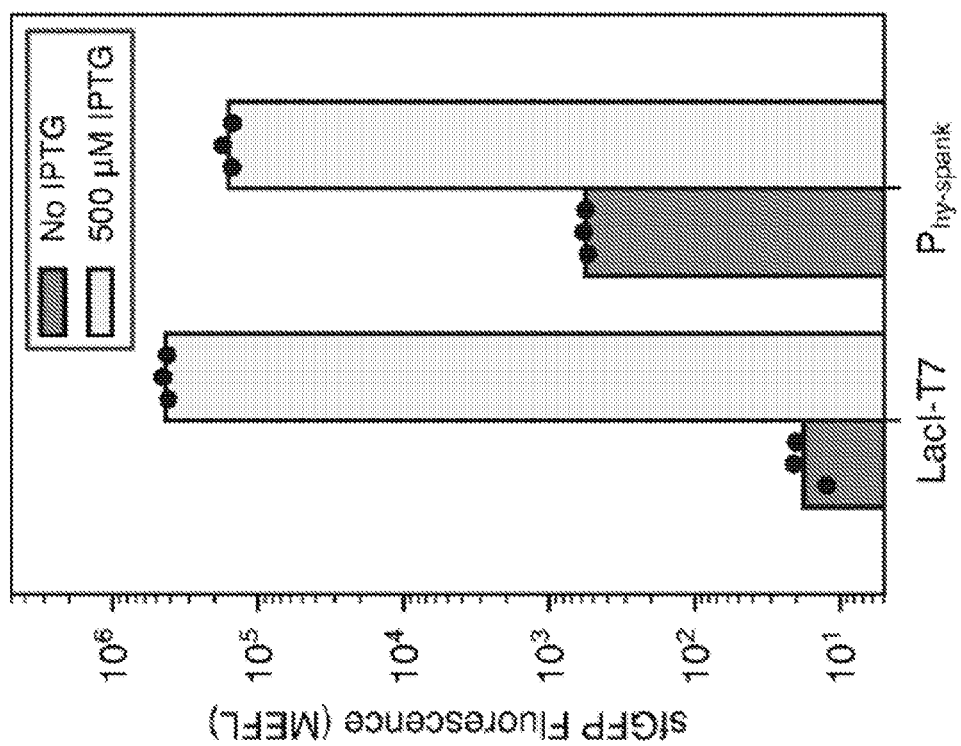
FIG. 1B sfGFP fluorescence from LacI-T7 and Phy-spank in the absence or presence of IPTG. Fluorescence is shown in calibrated Molecules of Equivalent Fluorescein (MEFL) units. Bars represent the mean of three experimental replicates run on separate days. Dots show the values of the individual replicates.

We utilized flow cytometry to characterize sfGFP fluorescence levels in the absence and presence of IPTG. We found that, in the absence of inducer, sfGFP fluorescence equals 17.9±4.7 molecules of equivalent fluorescein (MEFL) (FIGS. 1B and C). In contrast, sfGFP levels in the presence of IPTG are 432,000±20,000 MEFL (FIGS. 1B and C), resulting in a dynamic range of 25,300±6,900. Remarkably, only a small growth slowdown was observed under inducing conditions (cell division time: 25.15±0.46 minutes without IPTG, 30.2±1.1 minutes with IPTG) (not shown). Polyacrylamide gel electrophoresis (PAGE) analysis of total cellular protein indicated that sfGFP is the mostly highly expressed protein in the cell in the presence of IPTG (not shown).

To validate that this high dynamic range is preserved when expressing a different gene of interest, we placed the lacZ reporter gene under LacI-T7 (FIG. 13) and measured β-galactosidase activity in the absence and presence of IPTG. This resulted in a dynamic range of 11,000±1,200 (FIG. 11-12). The difference between this value and the one obtained with sfGFP might be explained by uncertainty in reporter measurements under non-inducing conditions, which result in signals that are close to background. Again, we observed only a mild growth slowdown (cell division time: 23.84±0.22 minutes without IPTG, 28.49±0.98 minutes with IPTG). We conclude that LacI-T7 can regulate expression of several genes with a dynamic range greater than 10,000-fold with little toxicity.

$P_{hy-spank}$ is a variant of the IPTG-inducible promoter $P_{spac}$ optimized for higher expression and dynamic range, and is perhaps the most widely used B. subtilis inducible promoter system. We constructed a second B. subtilis strain wherein sfgfp* was expressed under the control of $P_{hy-spank}$, RiboJ, and RBS MF001 to compare its performance to that of LacI-T7. We found that $P_{hy-spank}$ exhibits much greater leakiness (565±18 MEFL) and a lower maximal output (160,000±14,000 MEFL) than LacI-T7, resulting in a dynamic range of only 282±18 (FIG. 1B, D).

Figure 1E:
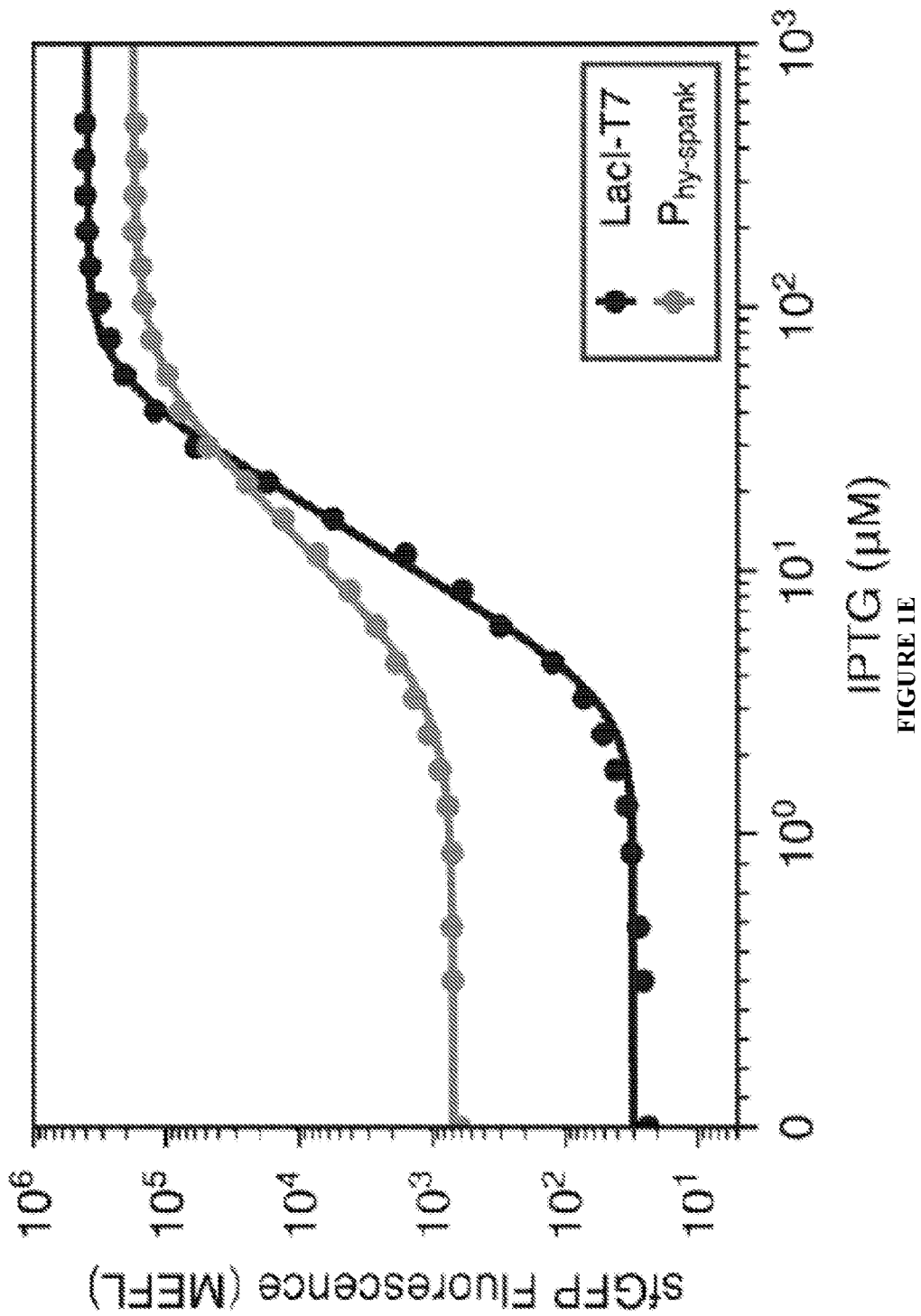
FIG. 1E sfGFP Fluorescence from LacI-T7 and P$_{hy\text{-}spank}$ as a function of IPTG concentration.

Next, we measured the steady state transfer function of both systems by growing the corresponding strains under different concentrations of IPTG. In both cases, sfGFP fluorescence increases as a function of IPTG concentration in a manner well-approximated by a Hill function (FIG. 1E). Remarkably, both systems exhibit similar IPTG detection thresholds (50% activation concentrations: LacI-T7: 54.1±1.6 μM, $P_{hy-spank}$: 50.2±1.5 μM). On the other hand, the Hill coefficient of the LacI-T7 system is larger (3.377±0.051, compared to 2.120±0.033 for $P_{hy-spank}$), indicating that protein expression is more sensitive to changes in IPTG levels in the responsive range of the system.

Figure 1F:
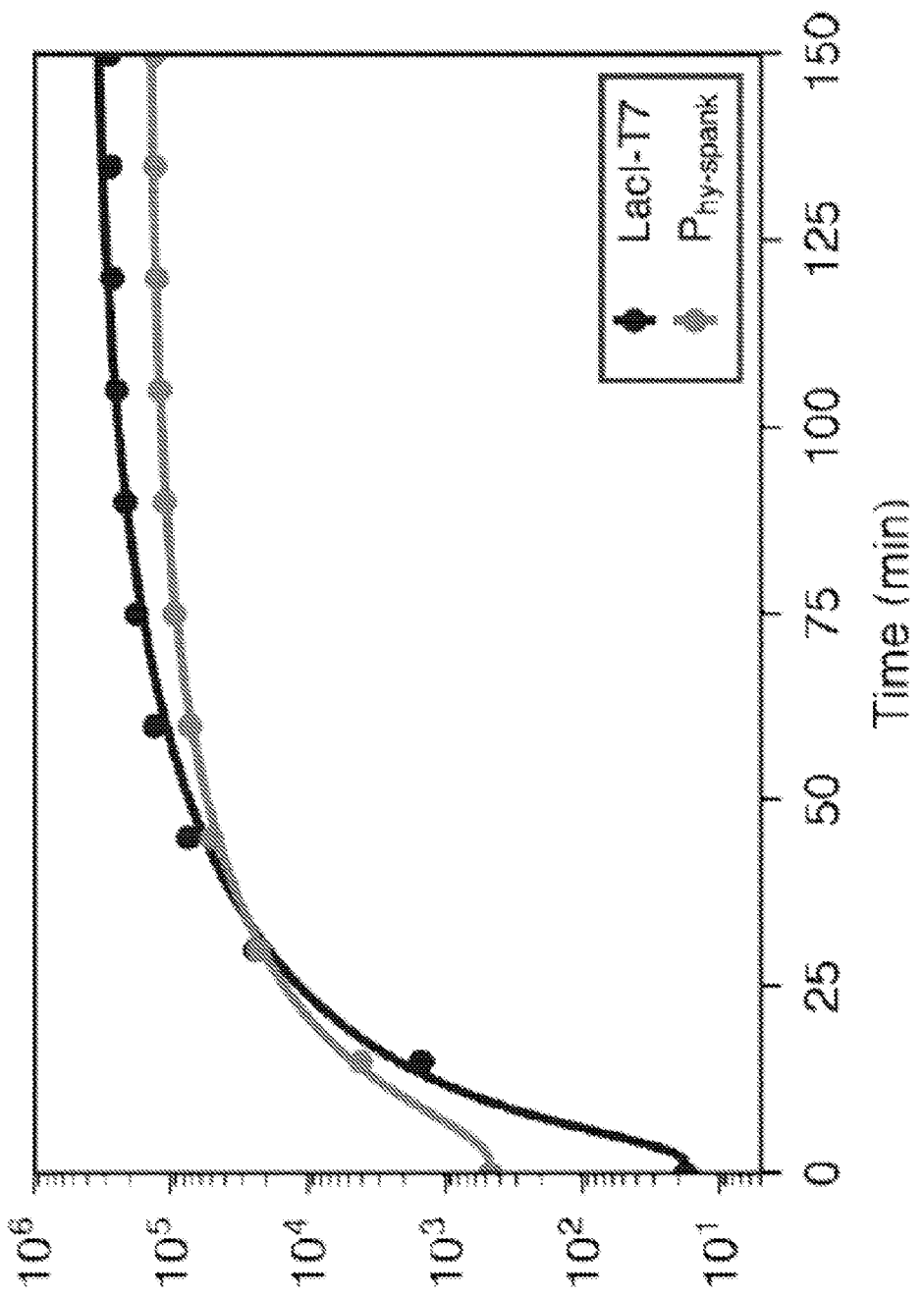
FIG. 1F sfGFP fluorescence from LacI-T7 and P$_{hy\text{-}spank}$ after addition of saturating IPTG. Dots and error bars show the mean and standard deviation, respectively, of three experiments run on separate days. Error bars are, in most cases, smaller than the size of the dots, and thus not visible. Black lines represent model fits.

Finally, we characterized the response dynamics of both systems after an instantaneous addition of saturating IPTG (FIG. 1F). As expected, both responses show an exponential-like increase until saturation. However, LacI-T7 responds slightly slower ($t_{1/2}$=82.1±6.5 min for LacI-T7, 62.1±1.1 min for $P_{hy-spank}$), consistent with the need to produce an intermediate protein (T7RNAP) before expression of the reporter gene. In conclusion, LacI-T7 exhibits lower leakiness, higher maximal expression output, similar sensitivity to inducer, and much higher dynamic range than the widely used $P_{hy-spank}$ system, albeit with a slightly slower response time.

The superior performance of LacI-T7 appears to arise from its unique design features. First, high maximal expression results from the use of T7 RNAP, a strong viral RNA polymerase which is capable of re-directing all bacterial resources towards expression of a single output gene. In contrast, previous expression systems based on endogenous promoters are limited by the native transcriptional machinery and are subject to competition with other endogenous promoters. Second, leaky expression in the absence of inducer is reduced via the dual repression activity of LacI. In E. coli, a similar design has been shown to reduce basal expression by more than an order of magnitude compared to an unmodified $P_{T7}$ output promoter.

LacI-T7 should be useful in quantitative studies of B. subtilis biology. In particular, its stable single-copy chromosomal location and its low leakiness are desirable for analyses of ultrasensitive or excitable networks where low amounts of excess protein can cause cells to undergo dramatically different differentiation programs.

We also expect LacI-T7 to be useful for heterologous protein expression applications. High expression from $P_{T7lac}$ should enable high yields of both cytoplasmic and secreted proteins. Additionally, low leakiness in the absence of inducer should allow for fast initial cell growth, even with potentially toxic proteins. Furthermore, LacI-T7 is integrated into the B. subtilis genome, and thus will not suffer from plasmid instability issues or require strong selective pressure to be maintained. Because it relies on the orthogonal T7 polymerase, LacI-T7 could also be ported to other industrially-relevant Bacillus species or strains with little additional work.

DNA Assembly and Cloning

All cloning and experiments were performed in B. subtilis strain PY79. Primers were ordered from Integrated DNA Technologies, Inc. $P_{hy-spank}$ was amplified from integration plasmid pDR111. $P_{T7lac}$ was constructed via oligo annealing and extension. Synthetic RBS MF001 was obtained from integration plasmid pMF35. Genomic homology fragments required for chromosomal integration were amplified from the purified genome of B. subtilis PY79.

All systems were built as linear double-stranded integration module (IM) or cassette, as we have previously described. Our IMs contain the DNA of interest and a selection marker flanked by 1.5kb-long sequences homologous to the amyE locus of the B. subtilis genome where chromosomal integration via double crossover occurs. IMs were assembled from PCR-amplified parts using Golden Gate. The resulting Golden Gate product was amplified using NEB Phusion DNA Polymerase and gel purified to obtain the IM. 500 ng was transformed into competent B. subtilis using standard transformation methods.

The transformants were plated on selective media. Colonies were picked the next day and grown in LB media at 37° C. and 250 RPM for a few hours. Finally, freezer stocks were prepared with 700 μL culture and 300 μL 60% glycerol, and stored at −80° C. This method avoids sub-cloning of integration plasmids in E. coli, as long as enough PCR-amplified DNA can be obtained. The complete sequences of all IMs constructed in this study can be found in GenBank via the following accession numbers: $P_{hy-spank}$-sfgfp: MN005205, LacI-T7-sfgfp: MN005204, LacI-T7-lacZ: MN005206.

For DNA sequence verification, an overnight LB culture was grown from a freezer stock, and 2 μL saturated culture was used as template for a 50 μL PCR reaction, either with Taq or Phusion DNA Polymerase. PCR products obtained in this fashion were gel-purified and sent for sequence verification to Genewiz, Inc.

Media and Experimental Protocols

We used a modified M9 medium for all experiments. 1 L 5×M9 salts at pH 6.8 were prepared with 64 g $Na_2HPO_4 \cdot 7H_2O$, 15 g $KH_2PO_4$, 2.5 g NaCl, 5 g $NH_4Cl$, 9.2 mL 6M HCl, and up to 1 L $dH_2O$. For 1 L M9, we used 200 mL 5×M9 salts, 20 mL 10% casamino acids, 6.67 mL 60% glycerol, 1 mL 50 mM $FeCl_3$/100 mM $C_6H_8O_7$ solution, 2 mL 50 mM $MnSO_4$, 2 mL 1M $MgSO_4$, 100 μL 1M $CaCl_2$, and $dH_2O$ up to 1 L.

For each experiment, an overnight LB culture was started from the freezer stock of each relevant strain. The next day, saturated cultures ($OD_{600}$~3) were diluted $10^5$-fold in M9.

Media was distributed in culture tubes (3 mL per tube), inoculated with the appropriate inducers (0 µM or 500 µM IPTG), and incubated in a shaker operating at 250 rpm and 37° C., until the $OD_{600}$ reached between 0.08 and 0.15 (around 6 hours). Culture tubes were then transferred to ice. 100 µL of each sample was transferred to a flow cytometry tube containing 1 mL PBS for measurement.

Flow Cytometry Analysis

The sfGFP fluorescence distribution of each culture was measured using a BD FACScan flow cytometer with an excitation source of 488 nm and an emission window of 510/21 nm. 30,000 events were collected per sample. A suspension of calibration beads (Spherotech® RCP-30-5A) in PBS was measured with each experiment. After data acquisition, raw .fcs flow cytometry files were processed using FlowCal.

Cell populations were gated by forward scatter/side scatter density (not shown) retaining 50% of the total number of events. Next, fluorescence of each gated event in arbitrary units was converted into standardized MEFL values using the calibration bead data. The total cellular fluorescence of each culture sample was then obtained by calculating the median MEFL fluorescence of all gated events in that sample. Finally, the reported sfGFP fluorescence values were obtained by subtracting the total cellular fluorescence of a wild-type PY79 sample measured the same day from each sample's total cellular fluorescence. Numerical sfGFP fluorescence values of every sample and replicate can be found in Table 1.

Codon Optimization of SFGFP

Codon optimization of the N-terminal sequence of the sfgfp ORF was performed to decrease secondary structure with the RBS and increase translation efficiency. To do so, for each of the first 15 codons of the original sfgfp sequence, a synonymous codon was chosen to reduce GC and increase AU content, with A preferred over U, with no regard for codon frequency. These changes were confirmed to increase the mRNA secondary structure free energy (and thus decrease secondary structure stability) via Nupack, by using the sequence from the transcription start site up to the $90^{th}$ nucleotide residue of the ORF. The complete optimized sfgfp* sequence can be found in Table 2.

Statistical methods are not reproduced herein, but can be found in Castillo (2019).

Each of the following references is incorporated by reference herein in its entirety for all purposes:

Westers, L., W et al., (2004) Bacillus subtilis as cell factory for pharmaceutical proteins: a biotechnological approach to optimize the host organism. Biochim. Biophys. Acta BBA—Mol. Cell Res., 1694, 299-310.

van Dijl, J. & Hecker, M. (2013) Bacillus subtilis: from soil bacterium to super-secreting cell factory. Microb. Cell Factories, 12, 3.

Yansura, D. G. & Henner, D.J. (1984) Use of the Escherichia coli lac repressor and operator to control gene expression in Bacillus subtilis. Proc. Natl. Acad. Sci., 81, 439-443.

Kim, L., et al., (1996) A xylose-inducible Bacillus subtilis integration vector and its application. Gene, 181, 71-76.

Conrad, B., et al., (1996) A T7 promoter-specific, inducible protein expression system for Bacillus subtilis. Mol. Gen. Genet. MGG, 250, 230-236.

Bhavsar, A. P., et al., (2001) Development and Characterization of a Xylose-Dependent System for Expression of Cloned Genes in Bacillus subtilis: Conditional Complementation of a Teichoic Acid Mutant. Appl Env. Microbiol, 67, 403-410.

Bongers, R. S., et al., (2005) Development and Characterization of a Subtilin-Regulated Expression System in Bacillus subtilis: Strict Control of Gene Expression by Addition of Subtilin. Appl Env. Microbiol, 71, 8818-8824.

Chen, P. T., et al., (2010) Construction of Chromosomally Located T7 Expression System for Production of Heterologous Secreted Proteins in Bacillus subtilis. J. Agric. Food Chem., 58, 5392-5399.

Toymentseva, A. A., et al., (2012) The LIKE system, a novel protein expression toolbox for Bacillus subtilis based on the lial promoter. Microb. Cell Factories, 11, 143.

Dubendorf, J. W. & Studier, F. W. (1991) Controlling basal expression in an inducible T7 expression system by blocking the target T7 promoter with lac repressor. J. Mol. Biol., 219, 45-59.

Guzman, L. M., et 1., (1995) Tight regulation, modulation, and high-level expression by vectors containing the arabinose PBAD promoter. J. Bacteriol., 177, 4121-4130.

Lutz, R. & Bujard, H. (1997) Independent and Tight Regulation of Transcriptional Units in Escherichia Coli Via the LacR/O, the TetR/O and AraC/I1-I2 Regulatory Elements. Nucleic Acids Res., 25, 1203-1210.

Chen, X., L et al., (2016) An extraordinary stringent and sensitive light-switchable gene expression system for bacterial cells. Cell Res., 10.1038/cr.2016.74.

Britton, R. A., et al., (2002) Genome-Wide Analysis of the Stationary-Phase Sigma Factor (Sigma-H) Regulon of Bacillus subtilis. J. Bacteriol., 184, 4881-4890.

Studier, F.W. & Moffatt, B.A. (1986) Use of bacteriophage T7 RNA polymerase to direct selective high-level expression of cloned genes. J. Mol. Biol., 189, 113-130.

Castillo-Hair, Sebastian M., et al. "An Engineered B. subtilis Inducible Promoter System with over 10 000-Fold Dynamic Range." ACS Synthetic Biology, 8, no. 7 (2019) American Chemical Society: 1673-1678.

TABLE 1

| Strain | IPTG (µM) | Replicate | sfGFP Fluorescence (MEFL) |
| --- | --- | --- | --- |
| Physpank-sfgfp | 0 | 1 | 12.6247004 |
| Physpank-sfgfp | 0 | 2 | 8.483803292 |
| Physpank-sfgfp | 0 | 3 | 7.244700498 |
| Physpank-sfgfp | 500 | 1 | 2429.998994 |
| Physpank-sfgfp | 500 | 2 | 2611.038636 |
| Physpank-sfgfp | 500 | 3 | 2068.52592 |
| Lacl-T7-sfgfp | 0 | 1 | -11.70963282 |
| Lacl-T7-sfgfp | 0 | 2 | -0.006598202 |
| Lacl-T7-sfgfp | 0 | 3 | -2.802232792 |
| Lacl-T7-sfgfp | 500 | 1 | 108557.0156 |
| Lacl-T7-sfgfp | 500 | 2 | 113360.4879 |
| Lacl-T7-sfgfp | 500 | 3 | 115850.8173 |

TABLE 2

| | | | VARIOUS SEQUENCES |
|---|---|---|---|
| Name | Type | Description | SEQUENCE |
| sfgfp | CDS | Superfolder green fluorescent protein SEQ ID NO 10 | ATGCGTAAAGGCGAAGAGCTGTTCACTGGTGTCGTCCCT ATTCTGGTGGAACTGGATGGTGATGTCAACGGTCATAAG TTTTCCGTGCGTGGCGAGGGTGAAGGTGACGCAACTAAT GGTAAACTGACGCTGAAGTTCATCTGTACTACTGGTAAA CTGCCGGTACCTTGGCCGACTCTGGTAACGACGCTGACT TATGGTGTTCAGTGCTTTGCTCGTTATCCGGACCATATG AAGCAGCATGACTTCTTCAAGTCCGCCATGCCGGAAGGC TATGTGCAGGAACGCACGATTTCCTTTAAGGATGACGGC ACGTACAAAACGCGTGCGGAAGTGAAATTTGAAGGCGAT ACCCTGGTAAACCGCATTGAGCTGAAAGGCATTGACTTT AAAGAAGACGGCAATATCCTGGGCCATAAGCTGGAATAC AATTTTAACAGCCACAATGTTTACATCACCGCCGATAAA CAAAAAAATGGCATTAAAGCGAATTTTAAAATTCGCCAC AACGTGGAGGATGGCAGCGTGCAGCTGGCTGATCACTAC CAGCAAAACACTCCAATCGGTGATGGTCCTGTTCTGCTG CCAGACAATCACTATCTGAGCACGCAAAGCGTTCTGTCT AAAGATCCGAACGAGAAACGCGATCATATGGTTCTGCTG GAGTTCGTAACCGCAGCGGGCATCACGCATGGTATGGAT GAACTGTACAAATGATGA |
| lacI | CDS | Lactose repressor SEQ ID NO 11 | ATGAAACCAGTAACGTTATACGATGTCGCAGAGTATGCC GGTGTCTCTTATCAGACCGTTTCCCGCGTGGTGAACCAG GCCAGCCACGTTTCTGCGAAAACGCGGGAAAAAGTGGAA GCGGCGATGGCGGAGCTGAATTACATTCCCAACCGCGTG GCACAACAACTGGCGGGCAAACAGTCGTTGCTGATTGGC GTTGCCACCTCCAGTCTGGCCCTGCACGCGCCGTCGCAA ATTGTCGCGGCGATTAAATCTCGCGCCGATCAACTGGGT GCCAGCGTGGTGGTGTCGATGGTAGAACGAAGCGGCGTC GAAGCCTGTAAAACGGCGGTGCACAATCTTCTCGCGCAA CGCGTCAGTGGGCTGATCATTAACTATCCGCTGGATGAC CAGGATGCCATTGCTGTGGAAGCTGCCTGCACTAATGTT CCGGCGTTATTTCTTGATGTCTCTGACCAGACACCCATC AACAGTATTATTTTCTCCCATGAAGACGGTACGCGACTG GGCGTGGAGCATCTGGTCGCATTGGGTCACCAGCAAATC GCGCTGTTAGCGGGCCCATTAAGTTCTGTCTCGGCGCGT CTGCGTCTGGCTGGCTGGCATAAATATCTCACTCGCAAT CAAATTCAGCCGATAGCGGAACGGGAAGGCGACTGGAGT GCCATGTCCGGTTTTCAACAAACCATGCAAATGCTGAAT GAGGGCATCGTTCCCACTGCGATGCTGGTTGCCAACGAT CAGATGGCGCTGGGCGCAATGCGCGCCATTACCGAGTCC GGGCTGCGCGTTGGTGCGGATATCTCGGTAGTGGGATAC GACGATACCGAAGACAGCTCATGTTATATCCCGCCGTTA ACCACCATCAAACAGGATTTTCGCCTGCTGGGGCAAACC AGCGTGGACCGCTTGCTGCAACTCTCTCAGGGCCAGGCG GTGAAGGGCAATCAGCTGTTGCCCGTCTCACTGGTGAAA AGAAAAACCACCCTGGCGCCCAATACGCAAACCGCCTCT CCCCGCGCGTTGGCCGATTCATTAATGCAGCTGGCACGA CAGGTTTCCCGACTGGAAAGCGGGCAGTGA |
| t7rnap | CDS | T7 RNA Polymerase SEQ ID NO 12 | ATGAACACGATTAACATCGCTAAGAACGACTTCTCTGAC ATCGAACTGGCTGCTATCCCGTTCAACACTCTGGCTGAC CATTACGGTGAGCGTTTAGCTCGCGAACAGTTGGCCCTT GAGCATGAGTCTTACGAGATGGGTGAAGCACGCTTCCGC AAGATGTTTGAGCGTCAACTTAAAGCTGGTGAGGTTGCG GATAACGCTGCCGCCAAGCCTCTCATCACTACCCTACTC CCTAAGATGATTGCACGCATCAACGACTGGTTTGAGGAA GTGAAAGCTAAGCGCGGCAAGCGCCCGACAGCCTTCCAG TTCCTGCAAGAAATCAAGCCGGAAGCCGTAGCGTACATC ACCATTAAGACCACTCTGGCTTGCCTAACCAGTGCTGAC AATACAACCGTTCAGGCTGTAGCAAGCGCAATCGGTCGG GCCATTGAGGACGAGGCTCGCTTCGGTCGTATCCGTGAC CTTGAAGCTAAGCACTTCAAGAAAAACGTTGAGGAACAA CTCAACAAGCGCGTAGGGCACGTCTACAAGAAAGCATTT ATGCAAGTTGTCGAGGCTGACATGCTCTCTAAGGGTCTA CTCGGTGGCGAGGCGTGGTCTTCGTGGCATAAGGAAGAC TCTATTCATGTAGGAGTACGCTGCATCGAGATGCTCATT GAGTCAACCGGAATGGTTAGCTTACACCGCCAAAATGCT GGCGTAGTAGGTCAAGACTCTGAGACTATCGAACTCGCA CCTGAATACGCTGAGGCTATCGCAACCCGTGCAGGTGCG CTGGCTGGCATCTCTCCGATGTTCCAACCTTGCGTAGTT CCTCCTAAGCCGTGGACTGGCATTACTGGTGGTGGCTAT TGGGCTAACGGTCGTCGTCCTCTGGCGCTGGTGCGTACT CACAGTAAGAAAGCACTGATGCGCTACGAAGACGTTTAC ATGCCTGAGGTGTACAAAGCGATTAACATTGCGCAAAAC ACCGCATGGAAAATCAACAAGAAAGTCCTAGCGGTCGCC AACGTAATCACCAAGTGGAAGCATTGTCCGGTCGAGGAC |

TABLE 2-continued

VARIOUS SEQUENCES

| Name | Type | Description | SEQUENCE |
|---|---|---|---|
| | | | ATCCCTGCGATTGAGCGTGAAGAACTCCCGATGAAACCG<br>GAAGACATCGACATGAATCCTGAGGCTCTCACCGCGTGG<br>AAACGTGCTGCCGCTGCTGTGTACCGCAAGGACAAGGCT<br>CGCAAGTCTCGCCGTATCAGCCTTGAGTTCATGCTTGAG<br>CAAGCCAATAAGTTTGCTAACCATAAGGCCATCTGGTTC<br>CCTTACAACATGGACTGGCGCGGTCGTGTTTACGCTGTG<br>TCAATGTTCAACCCGCAAGGTAACGATATGACCAAAGGA<br>CTGCTTACGCTGGCGAAAGGTAAACCAATCGGTAAGGAA<br>GGTTACTACTGGCTGAAAATCCACGGTGCAAACTGTGCG<br>GGTGTCGATAAGGTTCCGTTCCCTGAGCGCATCAAGTTC<br>ATTGAGGAAAACCACGAGAACATCATGGCTTGCGCTAAG<br>TCTCCACTGGAGAACACTTGGTGGGCTGAGCAAGATTCT<br>CCGTTCTGCTTCCTTGCGTTCTGCTTTGAGTACGCTGGG<br>GTACAGCACCACGGCCTGAGCTATAACTGCTCCCTTCCG<br>CTGGCGTTTGACGGGTCTTGCTCTGGCATCCAGCACTTC<br>TCCGCGATGCTCCGAGATGAGGTAGGTGGTCGCGCGGTT<br>AACTTGCTTCCTAGTGAAACCGTTCAGGACATCTACGGG<br>ATTGTTGCTAAGAAAGTCAACGAGATTCTACAAGCAGAC<br>GCAATCAATGGGACCGATAACGAAGTAGTTACCGTGACC<br>GATGAGAACACTGGTGAAATCTCTGAGAAAGTCAAGCTG<br>GGCACTAAGGCACTGGCTGGTCAATGGCTGGCTTACGGT<br>GTTACTCGCAGTGTGACTAAGCGTTCAGTCATGACGCTG<br>GCTTACGGGTCCAAAGAGTTCGGCTTCCGTCAACAAGTG<br>CTGGAAGATACCATTCAGCCAGCTATTGATTCCGGCAAG<br>GGTCTGATGTTCACTCAGCCGAATCAGGCTGCTGGATAC<br>ATGGCTAAGCTGATTTGGGAATCTGTGAGCGTGACGGTG<br>GTAGCTGCGGTTGAAGCAATGAACTGGCTTAAGTCTGCT<br>GCTAAGCTGCTGGCTGCTGAGGTCAAAGATAAGAAGACT<br>GGGAGAGATTCTTCGCAAGCGTTGCGCTGTGCATTGGGTA<br>ACTCCTGATGGTTTCCCTGTGTGGCAGGAATACAAGAAG<br>CCTATTCAGACGCGCTTGAACCTGATGTTCCTCGGTCAG<br>TTCCGCTTACAGCCTACCATTAACACCAACAAAGATAGC<br>GAGATTGATGCACACAAACAGGAGTCTGGTATCGCTCCT<br>AACTTTGTACACAGCCAAGACGGTAGCCACCTTCGTAAG<br>ACTGTAGTGTGGGCACACGAGAAGTACGGAATCGAATCT<br>TTTGCACTGATTCACGACTCCTTCGGTACCATTCCGGCT<br>GACGCTGCGAACCTGTTCAAAGCAGTGCGCGAAACTATG<br>GTTGACACATATGAGTCTTGTGATGTACTGGCTGATTTC<br>TACGACCAGTTCGCTGACCAGTTGCACGAGTCTCAATTG<br>GACAAAATGCCAGCACTTCCGGCTAAAGGTAACTTGAAC<br>CTCCGTGACATCTTAGAGTCGGACTTCGCGTTCGCGTAA |
| Phy-<br>spank | Pro-<br>moter | IPTG-<br>inducible<br>promoter<br>SEQ ID NO 13 | GGTAAATGTGAGCACTCACAATTCATTTTGCAAAAGTTG<br>TTGACTTTATCTACAAGGTGTGGCATAATGTGTGTAATT<br>GTGAGCGGATAACAATTAAGCTTAGTCGACA |
| PT7lac | Pro-<br>moter | Hybrid T7<br>promoter with<br>lac operators<br>SEQ ID NO 14 | TAATACGACTCACTATAGGGGAATTGTGAGCGGATAACA<br>ATTCCCCT |
| PpenP | Pro-<br>moter | Promoter<br>driving<br>expression of<br>lacI<br>SEQ ID NO 15 | CGGTGGAAACGAGGTCATCATTTCCTTCCGAAAAAACGG<br>TTGCATTTAAATCTTACATATGTAATACTTTCAAAGACT<br>ACATTTGTAAGATTTG |
| MF001 | RBS | Synthetic RBS<br>in pMF35 SEQ<br>ID NO 16 | AAGCTTACATAAGGAGGAACTACT |
| MF002 | RBS | Slightly<br>modified<br>MF001<br>SEQ ID NO 17 | GCTAGCACATAAGGAGGAACTACT |
| penP | RBS | RBS driving<br>expression of<br>lacI SEQ ID<br>NO 18 | TTCAAACGGAGGGAGACGATTTTG |
| B0015 | Termi-<br>nator | Terminator<br>SEQ ID NO 19 | CCAGGCATCAAATAAAACGAAAGGCTCAGTCGAAAGACT<br>GGGCCTTTCGTTTTATCTGTTGTTTGTCGGTGAACGCTC<br>TCTACTAGAGTCACACTGGCTCACCTTCGGGGGGCCTTT<br>TCTGCGTTTATA |

TABLE 2-continued

| VARIOUS SEQUENCES | | | |
|---|---|---|---|
| Name | Type | Description | SEQUENCE |
| sfGFP | CDS | Codon optimized sfGFP SEQ ID NO 20. | ATGAGAAAAGGAGAAGAATTATTTACAGGAGTTGTTCCA ATTTTAGTGGAACTGGATGGTGATGTCAACGGTCATAAG TTTTCCGTGCGTGGCGAGGGTGAAGGTGACGCAACTAAT GGTAAACTGACGCTGAAGTTCATCTGTACTACTGGTAAA CTGCCGGTACCTTGGCCGACTCTGGTAACGACGCTGACT TATGGTGTTCAGTGCTTTGCTCGTTATCCGGACCATATG AAGCAGCATGACTTCTTCAAGTCCGCCATGCCGGAAGGC TATGTGCAGGAACGCACGATTTCCTTTAAGGATGACGGC ACGTACAAAACGCGTGCGGAAGTGAAATTTGAAGGCGAT ACCCTGGTAAACCGCATTGAGCTGAAAGGCATTGACTTT AAAGAAGACGGCAATATCCTGGGCCATAAGCTGGAATAC AATTTTAACAGCCACAATGTTTACATCACCGCCGATAAA CAAAAAAATGGCATTAAAGCGAATTTTAAAATTCGCCAC AACGTGGAGGATGGCAGCGTGCAGCTGGCTGATCACTAC CAGCAAAACACTCCAATCGGTGATGGTCCTGTTCTGCTG CCAGACAATCACTATCTGAGCACGCAAAGCGTTCTGTCT AAAGATCCGAACGAGAAACGCGATCATATGGTTCTGCTG GAGTTCGTAACCGCAGCGGGCATCACGCATGGTATGGAT GAACTGTACAAATAA |
| lacZ | CDS | β-galactosidase enzyme SEQ ID NO 21 | ATGACCATGATTACGGATTCACTGGCCGTCGTTTTACAA CGTCGTGACTGGGAAAACCCTGGCGTTACCCAACTTAAT CGCCTTGCAGCACATCCCCCTTTCGCCAGCTGGCGTAAT AGCGAAGAGGCCCGCACCGATCGCCCTTCCCAACAGTTG CGCAGCCTGAATGGCGAATGGCGCTTTGCCTGGTTTCCG GCACCAGAAGCGGTGCCGGAAAGCTGGCTGGAGTGCGAT CTTCCTGAGGCCGATACTGTCGTCGTCCCCTCAAACTGG CAGATGCACGGTTACGATGCGCCCATCTACACCAACGTG ACCTATCCCATTACGGTCAATCCGCCGTTTGTTCCCACG GAGAATCCGACGGGTTGTTACTCGCTCACATTTAATGTT GATGAAAGCTGGCTACAGGAAGGCCAGACGCGAATTATT TTTGATGGCGTTAACTCGGCGTTTCATCTGTGGTGCAAC GGGCGCTGGGTCGGTTACGGCCAGGACAGTCGTTTGCCG TCTGAATTTGACCTGAGCGCATTTTTACGCGCCGGAGAA AACCGCCTCGCGGTGATGGTGCTGCGCTGGAGTGACGGC AGTTATCTGGAAGATCAGGATATGTGGCGGATGAGCGGC ATTTTCCGTGACGTCTCGTTGCTGCATAAACCGACTACA CAAATCAGCGATTTCCATGTTGCCACTCGCTTTAATGAT GATTTCAGCCGCGCTGTACTGGAGGCTGAAGTTCAGATG TGCGGCGAGTTGCGTGACTACCTACGGGTAACAGTTTCT TTATGGCAGGGTGAAACGCAGGTCGCCAGCGGCACCGCG CCTTTCGGCGGTGAAATTATCGATGAGCGTGGTGGTTAT GCCGATCGCGTCACACTACGTCTGAACGTCGAAAACCCG AAACTGTGGAGCGCCGAAATCCCGAATCTCTATCGTGCG GTGGTTGAACTGCACACCGCCGACGGCACGCTGATTGAA GCAGAAGCCTGCGATGTCGGTTTCCGCGAGGTGCGGATT GAAAATGGTCTGCTGCTGCTGAACGGCAAGCCGTTGCTG ATTCGAGGCGTTAACCGTCACGAGCATCATCCTCTGCAT GGTCAGGTCATGGATGAGCAGACGATGGTGCAGGATATC CTGCTGATGAAGCAGAACAACTTTAACGCCGTGCGCTGT TCGCATTATCCGAACCATCCGCTGTGGTACACGCTGTGC GACCGCTACGGCCTGTATGTGGTGGATGAAGCCAATATT GAAACCCACGGCATGGTGCCAATGAATCGTCTGACCGAT GATCCGCGCTGGCTACCGGCGATGAGCGAACGCGTAACG CGAATGGTGCAGCGCGATCGTAATCACCCGAGTGTGATC ATCTGGTCGCTGGGGAATGAATCAGGCCACGGCGCTAAT CACGACGCGCTGTATCGCTGGATCAAATCTGTCGATCCT TCCCGCCCGGTGCAGTATGAAGGCGGCGGAGCCGACACC ACGGCCACCGATATTATTTGCCCGATGTACGCGCGCGTG GATGAAGACCAGCCCTTCCCGGCTGTGCCGAAATGGTCC ATCAAAAAATGGCTTTCGCTACCTGGAGAGACGCGCCCG CTGATCCTTTGCGAATACGCCCACGCGATGGGTAACAGT CTTGGCGGTTTCGCTAAATACTGGCAGGCGTTTCGTCAG TATCCCCGTTTACAGGGCGGCTTCGTCTGGGACTGGGTG GATCAGTCGCTGATTAAATATGATGAAAACGGCAACCCG TGGTCGGCTTACGGCGGTGATTTTGGCGATACGCCGAAC GATCGCCAGTTCTGTATGAACGGTCTGGTCTTTGCCGAC CGCACGCCGCATCCAGCGCTGACGGAAGCAAAACACCAG CAGCAGTTTTTCCAGTTCCGTTTATCCGGGCAAACCATC GAAGTGACCAGCGAATACCTGTTCCGTCATAGCGATAAC GAGCTCCTGCACTGGATGGTGGCGCTGGATGGTAAGCCG CTGGCAAGCGGTGAAGTGCCTCTGGATGTCGCTCCACAA GGTAAACAGTTGATTGAACTGCCTGAACTACCGCAGCCG GAGAGCGCCGGGCAACTCTGGCTCACAGTACGCGTAGTG CAACCGAACGCGACCGCATGGTCAGAAGCCGGGCACATC |

TABLE 2-continued

VARIOUS SEQUENCES

| Name | Type | Description | SEQUENCE |
|---|---|---|---|
| | | | AGCGCCTGGCAGCAGTGGCGTCTGGCGGAAAACCTCAGT<br>GTGACGCTCCCCGCCGCGTCCCACGCCATCCCGCATCTG<br>ACCACCAGCGAAATGGATTTTTGCATCGAGCTGGGTAAT<br>AAGCGTTGGCAATTTAACCGCCAGTCAGGCTTTCTTTCA<br>CAGATGTGGATTGGCGATAAAAAACAACTGCTGACGCCG<br>CTGCGCGATCAGTTCACCCGTGCACCGCTGGATAACGAC<br>ATTGGCGTAAGTGAAGCGACCCGCATTGACCCTAACGCC<br>TGGGTCGAACGCTGGAAGGCGGCGGGCCATTACCAGGCC<br>GAAGCAGCGTTGTTGCAGTGCACGGCAGATACACTTGCT<br>GATGCGGTGCTGATTACGACCGCTCACGCGTGGCAGCAT<br>CAGGGGAAAACCTTATTTATCAGCCGGAAAACCTACCGG<br>ATTGATGGTAGTGGTCAAATGGCGATTACCGTTGATGTT<br>GAAGTGGCGAGCGATACACCGCATCCGGCGCGGATTGGC<br>CTGAACTGCCAGCTGGCGCAGGTAGCAGAGCGGGTAAAC<br>TGGCTCGGATTAGGGCCGCAAGAAAACTATCCCGACCGC<br>CTTACTGCCGCCTGTTTTGACCGCTGGGATCTGCCATTG<br>TCAGACATGTATACCCCGTACGTCTTCCCGAGCGAAAAC<br>GGTCTGCGCTGCGGGACGCGCGAATTGAATTATGGCCCA<br>CACCAGTGGCGCGGCGACTTCCAGTTCAACATCAGCCGC<br>TACAGTCAACAGCAACTGATGGAAACCAGCCATCGCCAT<br>CTGCTGCACGCGGAAGAAGGCACATGGCTGAATATCGAC<br>GGTTTCCATATGGGGATTGGTGGCGACGACTCCTGGAGC<br>CCGTCAGTATCGGCGGAATTCCAGCTGAGCGCCGGTCGC<br>TACCATTACCAGTTGGTCTGGTGTCAAAAATAA |
| RiboJ | Non-coding RNA | Self-cleaving ribozyme<br>SEQ ID NO 22 | AGCTGTCACCGGATGTGCTTTCCGGTCTGATGAGTCCGT<br>GAGGACGAAACAGCCTCTACAAATAATTTTGTTTAA |

The invention claimed is:

1. An expression system for *Bacillus*, said system being in a *Bacillus* and having:
   a) at least 95% nucleotide identity to the sequence of SEQ ID NO 7, said 95% identity excluding an open reading frame (ORF) added thereto; and
   b) having at least 5,000 fold more expression of said ORF with Isopropyl β-D-1-thiogalactopyranoside (IPTG) induction than without IPTG induction.

2. A recombinant *Bacillus*, wherein said *Bacillus* is transformed with the system of claim 1.

3. A recombinant *Bacillus*, wherein said *Bacillus* is transformed with the expression system of claim 1, said expression system being integrated into a chromosome of said *Bacillus*.

4. A method of transforming *Bacillus subtilis*, comprising introducing the expression system of claim 1 to a population of *Bacillus subtilis* under conditions that allow transformation and integration of said expression system into a chromosome of said *Bacillus subtilis*, and selecting for transformed and integrated *Bacillus subtilis*.

5. A method of producing a target protein, comprising introducing the expression system of claim 1 to a population of *Bacillus subtilis* under conditions that allow integration of said expression system into a genome of said *Bacillus subtilis*, and selecting for integrated *Bacillus subtilis*, growing said integrated *Bacillus subtilis* in a growth medium until cells reach near saturation, adding IPTG to said growth medium in an amount sufficient to induce a lac operon, continuing culturing said integrated *Bacillus subtilis* until said ORF is expressed, and isolating a target protein encoded by said ORF from said growth medium or said transformed *Bacillus subtilis* or both.

6. A DNA molecule comprising SEQ ID NO. 7 plus an added open reading frame (ORF).

7. A recombinant *Bacillus*, wherein said *Bacillus* is transformed with the DNA molecule of claim 6.

8. A recombinant *Bacillus*, wherein said *Bacillus* is transformed with the DNA molecule of claim 6, said DNA molecule being integrated into a chromosome of said *Bacillus*.

9. A method of transforming *Bacillus subtilis*, comprising introducing the DNA molecule of claim 6 to a population of

*Bacillus subtilis* under conditions that allow transformation and integration of said DNA molecule into a chromosome of said *Bacillus subtilis*, and selecting for transformed and integrated *Bacillus subtilis*.

10. A method of producing a target protein, comprising introducing the DNA molecule of claim 6 to a population of *Bacillus subtilis* under conditions that allow integration of said DNA molecule into a genome of said *Bacillus subtilis*, selecting for integrated *Bacillus subtilis*, growing said integrated *Bacillus subtilis* in a growth medium until cells reach near saturation, adding IPTG to said growth medium in an amount sufficient to induce a lac operon, continuing culturing said integrated *Bacillus subtilis* until said ORF is expressed, and isolating a target protein encoded by said ORF from said growth medium or said transformed *Bacillus subtilis* or both.

* * * * *